Nov. 29, 1927.

R. E. PEOPLES 1,650,721

TESTING SYSTEM

Filed Dec. 19, 1925   24 Sheets-Sheet 1

Inventor:
Robert E. Peoples
by ~~~~ Atty.

Inventor:
Robert E. Peoples

Inventor:
Robert E. Peoples

Nov. 29, 1927.

R. E. PEOPLES 1,650,721

TESTING SYSTEM

Filed Dec. 19, 1925

Inventor:
Robert E. Peoples
by [signature] Att'y.

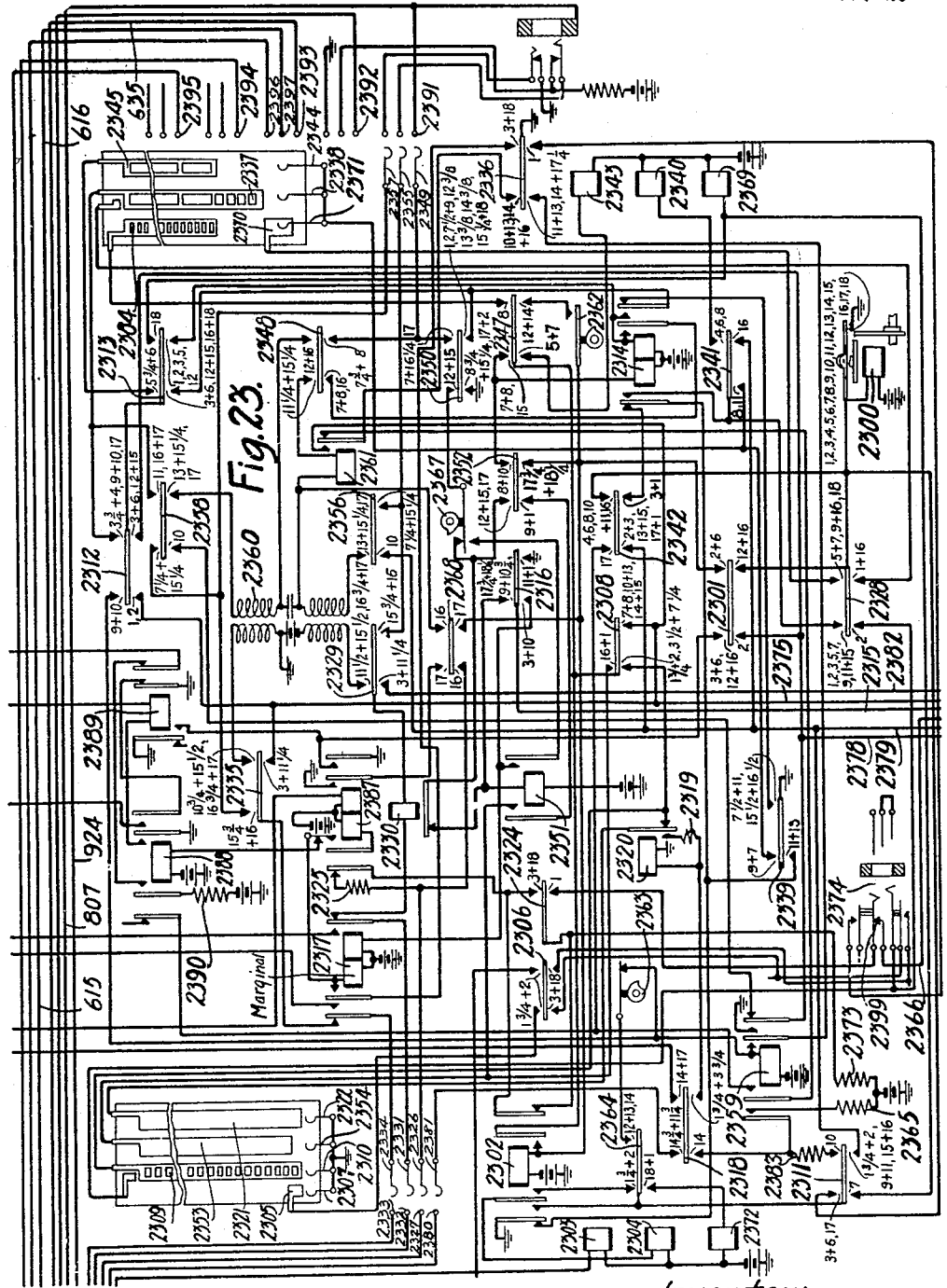

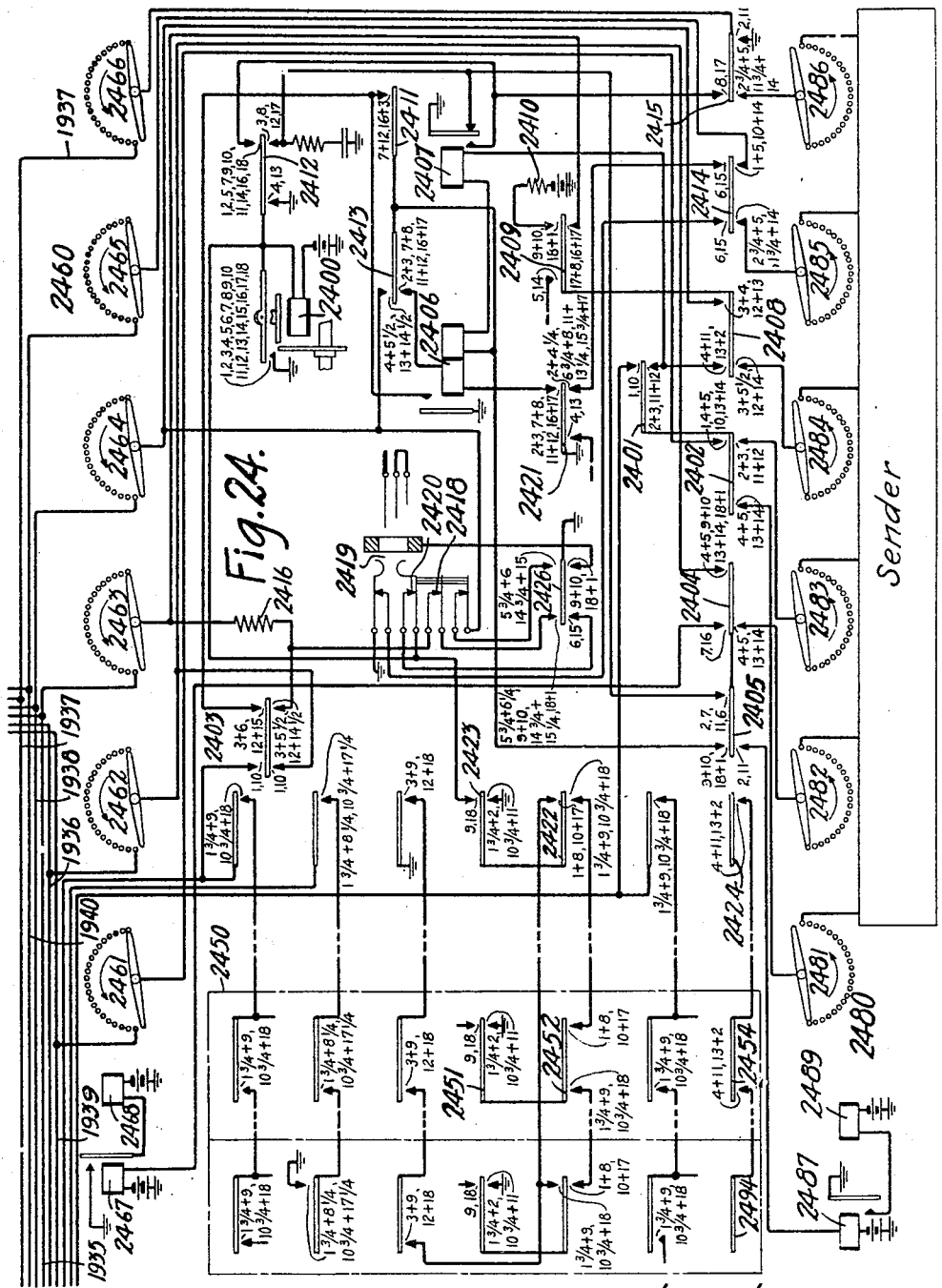

Patented Nov. 29, 1927.

1,650,721

UNITED STATES PATENT OFFICE.

ROBERT E. PEOPLES, OF VALLEY STREAM, NEW YORK, ASSIGNOR TO WESTERN ELECTRIC COMPANY, INCORPORATED, OF NEW YORK, N. Y., A CORPORATION OF NEW YORK.

TESTING SYSTEM.

Application filed December 19, 1925. Serial No. 76,367.

This invention relates to telephone exchange systems and more particularly to systems for testing the correct operation of automatic switching apparatus.

It is an object of the present invention to provide means for testing selector switches of a variety of types under a variety of conditions met with in commercial operation.

A feature of the invention lies in the provision of means for successively imposing any one or more of a plurality of test conditions upon the selector under test together with means for checking the accuracy of the operation of the selector.

Another feature of the invention lies in means for automatically passing by test conditions which are inapplicable to the type of selector under test.

An additional feature of the invention lies in the use of two counting relay circuits to test the operation of certain selector relays.

These and other features of the invention will be more apparent from a description of the operation of the system and from the appended claims.

The apparatus is especially intended to test that type of selector known as a district selector, which is associated directly with a line finder and is selected for operation by means of a link circuit. This type of district and link circuit is disclosed in U. S. Patent 1,575,336, granted to I. H. Henry, March 2, 1926.

In the drawings, Figs. 1 to 19 show the test circuit and apparatus. Figs. 16 to 19 show the connecting switches and so forth which serve to connect the testing apparatus with different portions of the apparatus to be tested. Figs. 11 to 15 show a plurality of relays and other apparatus for controlling the operation of the connector switches and the setting of the line finder associated with the district selector on the test line leading to the testing apparatus. Fig. 10 shows a sequence switch which controls these operations. Fig. 3 shows the district class sequence switch which is positioned in accordance with the type of district selector to be tested. Figs. 4, 5 and 9 show the apparatus and sequence switch employed in setting the district selector on the outgoing test line leading to the testing apparatus. Figs. 2, 6, 7 and 8 show the apparatus employed in making special tests on the district selector.

Fig. 23 shows a district selector to be tested which in this case is one serving lines having coin collecting apparatus associated therewith. Fig. 22 shows one of a plurality of coin circuits which are used in connection with this type of district. Figs. 20, 21 and 24 show line and trip circuits, start circuit and link circuit which are employed in connecting a subscriber's line to the district selector of Fig. 23.

Fig. 25 is a diagram showing the manner in which Figs. 1 to 24 inclusive should be arranged.

NORMAL OPERATION OF DISTRICT SELECTOR.

As set forth in detail in the above identified patent of I. H. Henry, the link circuits such as the link circuit shown in Fig. 24 are allotted in rotation one link circuit being normally in an allotted condition and a district selector associated therewith at all times. The initiation of a call by a subscriber causes the operation of line relay 2001 which in turn operates relay 2003. Relay 2003 closes a circuit through trip relay 2008 which locks in series with start relay 2101 of the start circuit. The operation of the trip relay 2008 operates the trip magnet 2303 of the line finder circuit and also causes the operation of relay 2302. Relay 2302 in operating causes the line finder to move upward in search of the calling line. In its upward movement the line finder causes brush 2307 to momentarily engage commutator segment 2305 which holds start relay 2101 operated and shunts the trip relay 2008 thus releasing relays 2008 and 2101 in turn. When the line finder encounters the calling line, battery over the brush 2381 operates relay 2320 which opens the locking circuit of relay 2302 and permits that relay to release stopping the line finder on the calling line.

The release of relay 2302 advances the district selector to position 3. Selections now take place, brush selection occurring in position 4, group selection in position 6 and trunk hunting in position 8. When the outgoing trunk has been found sequence switch 2300 will be in position 9. At this time relay 2351 is operated from the sender and closes the operating circuit for relay 2314 which advances the sequence switch to position 10 in which position subsequent selections are made. Following the completion of selections the sender increases the resistance in series with relay 2351 sufficiently to cause that relay to release and in turn release relay 2314 to advance the switch to position 12.

In position 12 a circuit for starting talking selection is completed and switch 2300 advances out of position 12 into the talking position corresponding to the type of line to which the call has been extended. Position 13 corresponds to lines for which no charge is made. Position 14 is the one normally used and is that corresponding to lines for which charge is made. Position 15 is the first stopping position for calls to an operator but when the operator answers the switch is advanced to position 16 in which talking takes place. The advance of the sequence switch to talking position causes the operation of relay 2330. When the calling subscriber hangs up relay 2330 releases and after an interval relay 2351 is operated under the control of interrupter 2367, in turn operating relay 2317.

The operation of relay 2317 extends the talking conductors to the coin circuit of Fig. 22 which operates to supply coin collect or coin refund battery according to whether the call has been successfully completed or not. The operation of the coin circuit causes the operation of relay 2387 which advances the sequence switch to position 17. This relay also causes the operation of relay 2302 which advances the switch to position 18 in which position the line finder and district selectors are restored to normal and the switch is then advanced to position 1.

The link circuit hunts for an idle sender and associates it with the district selector before selections take place. After the completion of talking selection the sender connects battery to the circuit of relays 2406 and 2407 so that relay 2407 operates and advances the link sequence switch. The advance of the link circuit sequence switch causes the link to disconnect from the district and to hunt for an idle district.

BRIEF DESCRIPTION OF THE OPERATION OF THE TEST CIRCUIT.

In order to start a complete routine test of all the district selectors in the office, test keys 700 to 708 may be depressed after which start key 1800 will be operated. The operation of start key 1800 causes the advance of sequence switch 1000 to position 2.

In passing from position 1 to position 2 sequence switch 1000 closes the circuit of the master selector stepping magnet 1917 of the master selector 1910. In order to insure the complete stepping of the master selector switch before advancing sequence switch 1000, a shunt is maintained around the winding of relay 1504 over the front contact of magnet 1917 until that magnet attracts its armature sufficiently to step the switch whereupon relay 1504 operates and advances switch 1000 to position 3. With the selector 1910 engaging its first off-normal terminals, relays 1200, 1201 and 1202 are operated provided group selectors 1610, 1630, 1710 and 1730 are engaging corresponding terminals. Relay 1507 operates and advances switch 1000 to position 4.

In position 4 the group selectors are advanced to their first off-normal terminals and switch 1000 advances to position 5. The district selector class sequence switch 300 is now advanced to a position corresponding to the type of district to be tested and the sequence switch 1000 advanced to position 6. The connector switch 1920 is now stepped to its first off-normal terminals in a manner similar to the other stepping operations. The district is tested to determine whether or not it is busy. Except in the case of a district awaiting selection by a link circuit, the link circuit is dismissed by simulating a wipe out call as will be described later. If the district is busy the test circuit awaits its return to normal and prevents the reselection of the district by a link circuit.

After the district has been associated with the test circuit the start circuit which serves the group of districts is blocked while the district selector is operated to find a test line on the line finder frame. The district is then operated under the control of the counting relays of Fig. 5 to select the test line at the district frame or to select an outgoing trunk to an office selector which in turn selects a test line. In the present disclosure the test line has been shown connected to the district selector. Following the selection of the test line the selector relays are tested under various conditions.

Keys 700 to 708 control the type of call to be simulated in the operation of the district selector. With a particular key operated the test condition corresponding to that key is imposed upon the district selector in accordance with the following table:

700—Call to an operator.
701—Non-charge call to subscriber.
702—Charge call to busy subscriber.
703—Charge call to an absent subscriber.
704—Charge call—false ground on two party line.
705—Charge call completed—second party registration.
706—District goes to overflow.
707—Call abandoned before district brush selection.
708—Call abandoned after district brush selection.

Cooperating with these keys is the sequence switch 800. With any one of these keys normal sequence switch 800 will pass by the corresponding position. Means are also provided, however, for automatically passing certain positions where the calls are inapplicable to the type of district being tested. The selector is reset for each test call but is maintained busy by the test circuit to prevent its reselection by a link circuit.

DETAILED DESCRIPTION.

Figure 1:
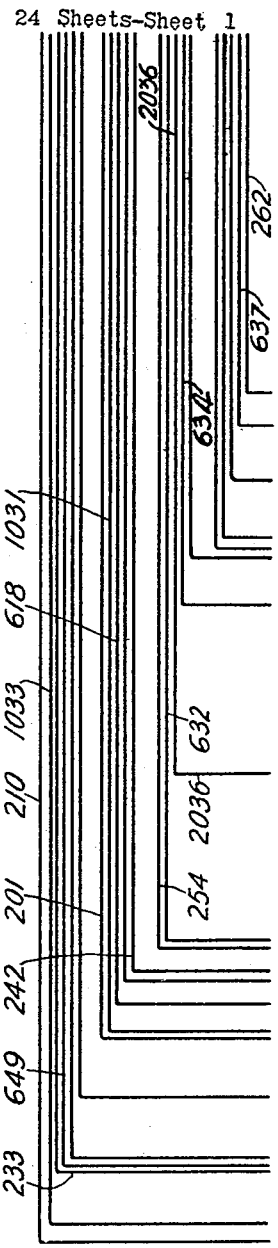
Figure 2:
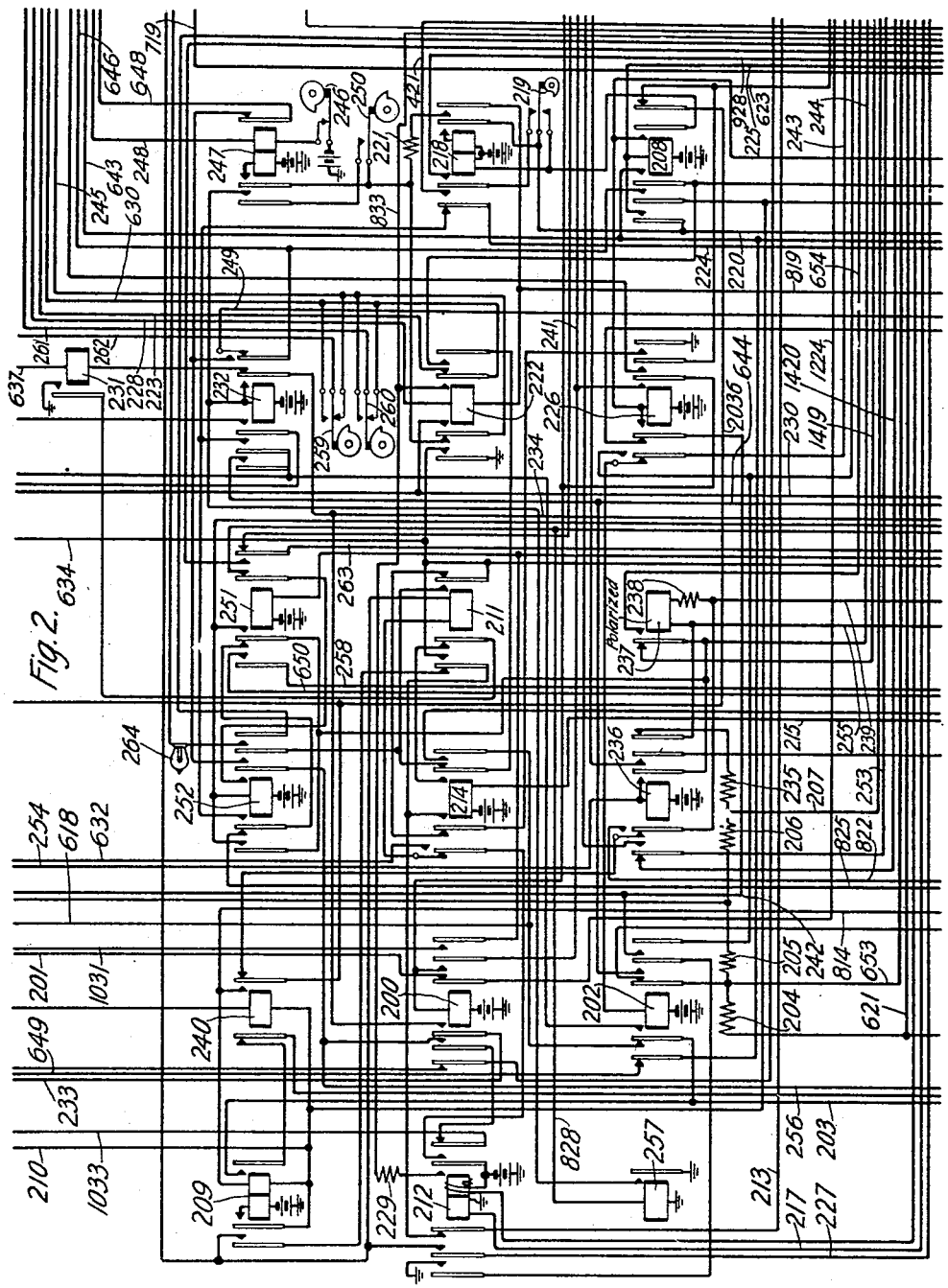
Figure 3:
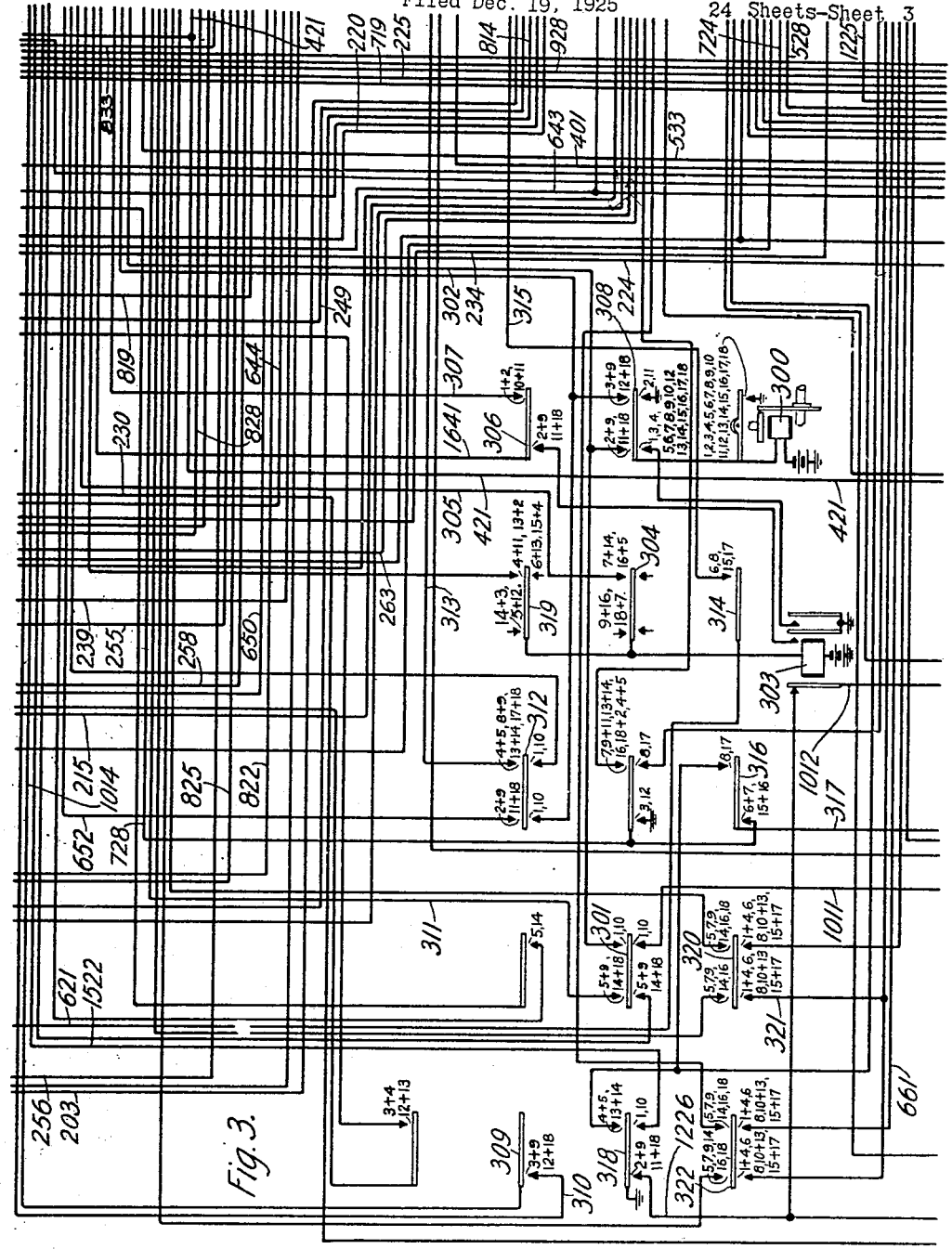
Figure 4:
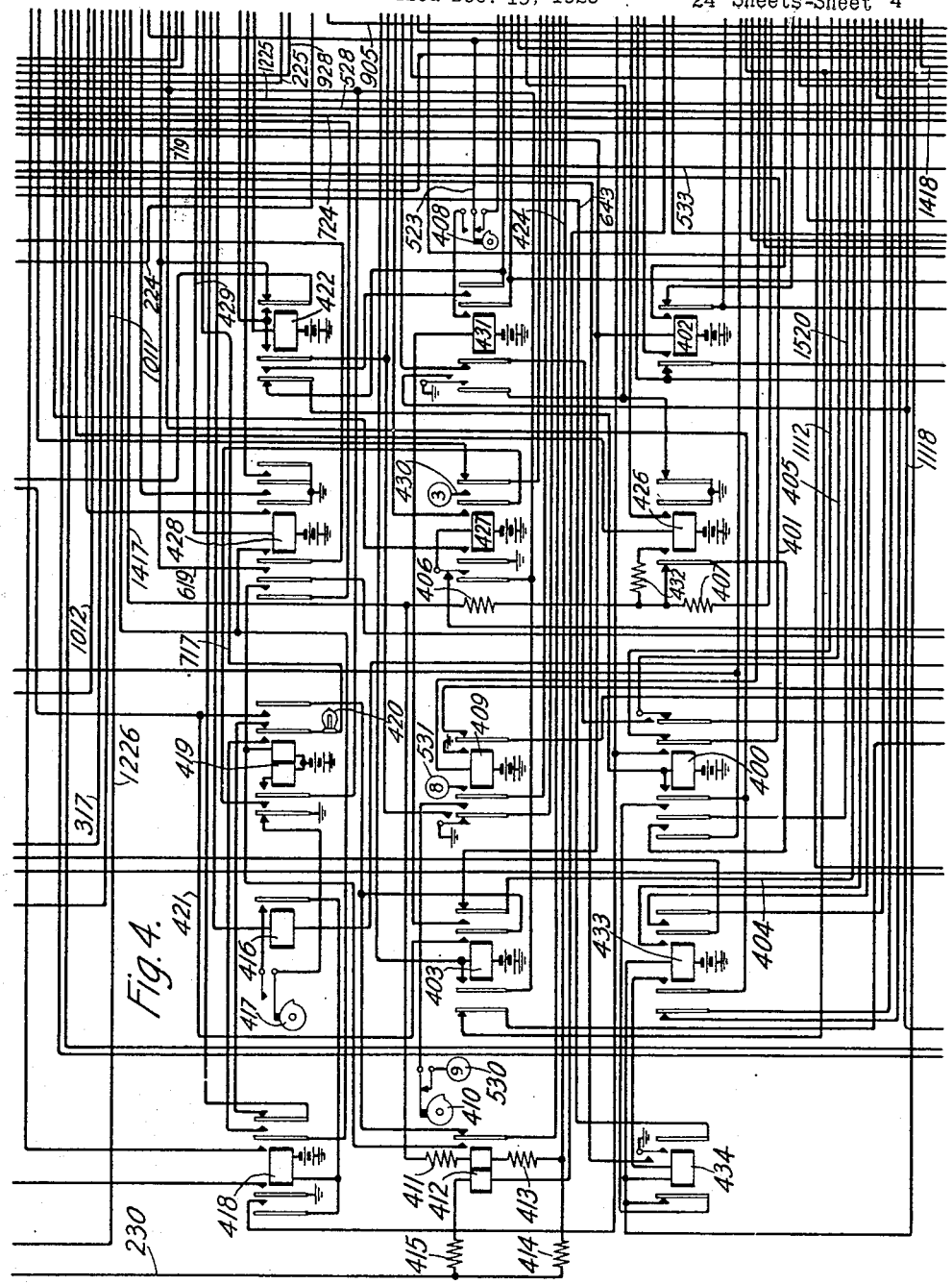
Figure 5:
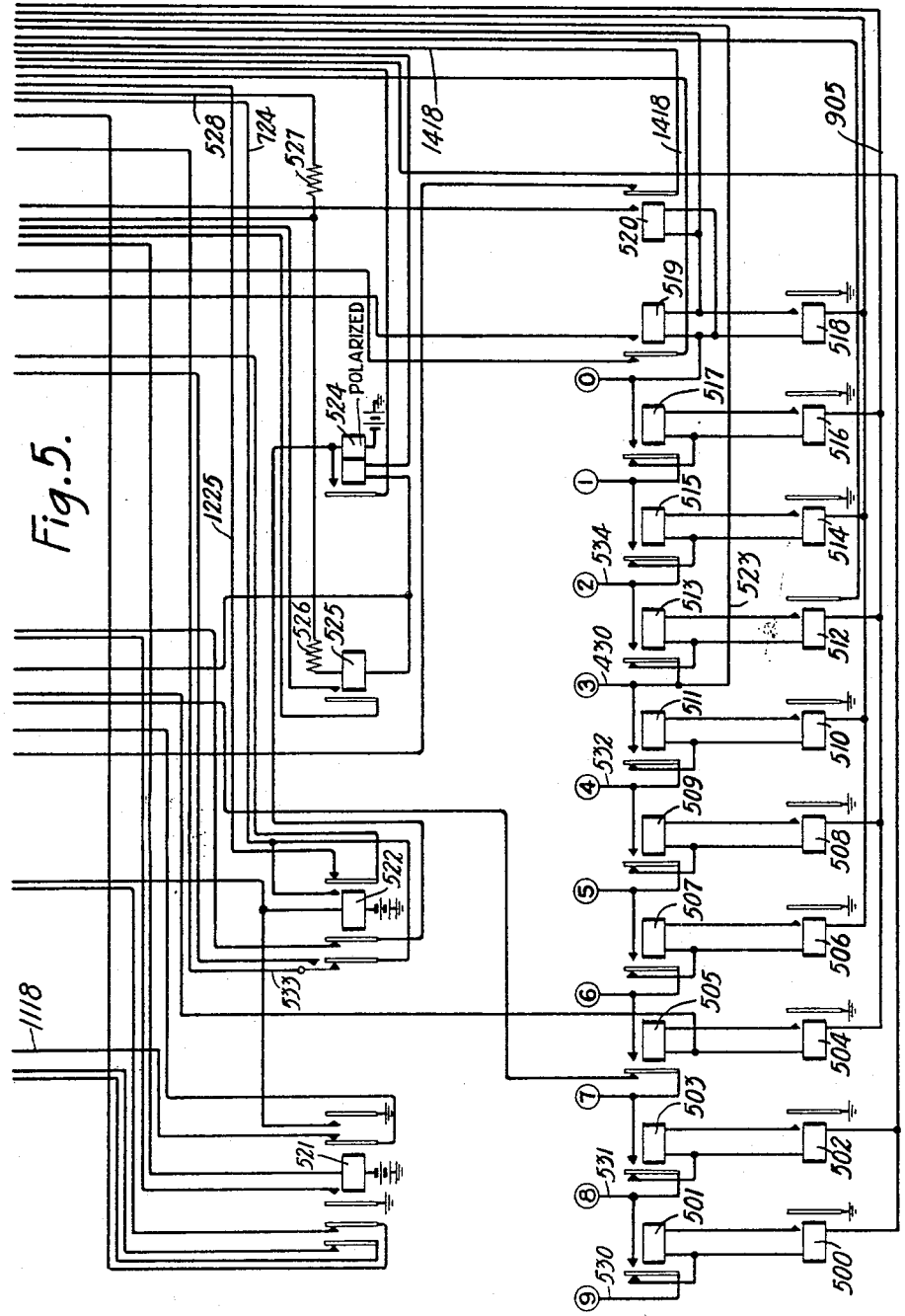
Figure 6:
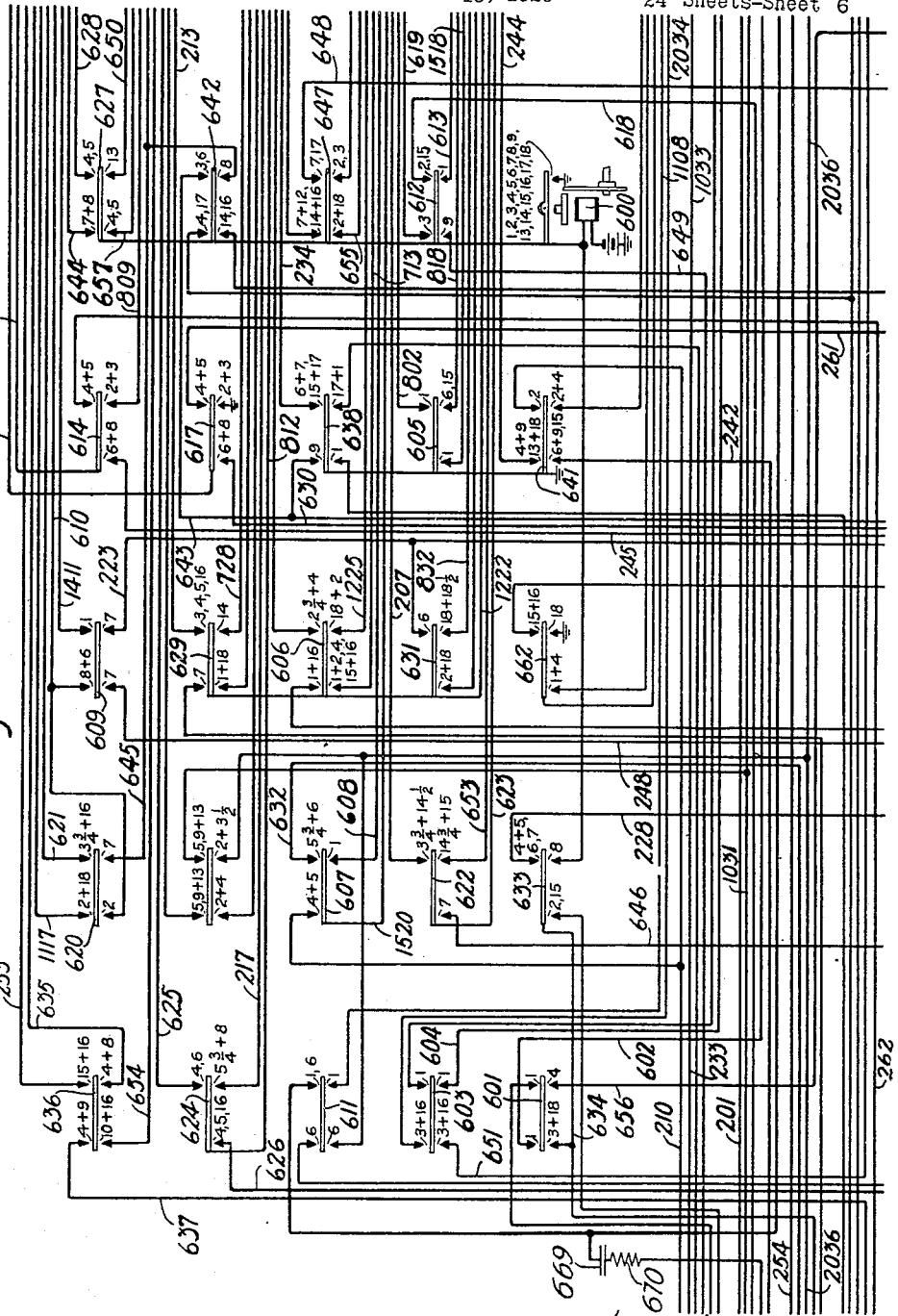
Figure 7:
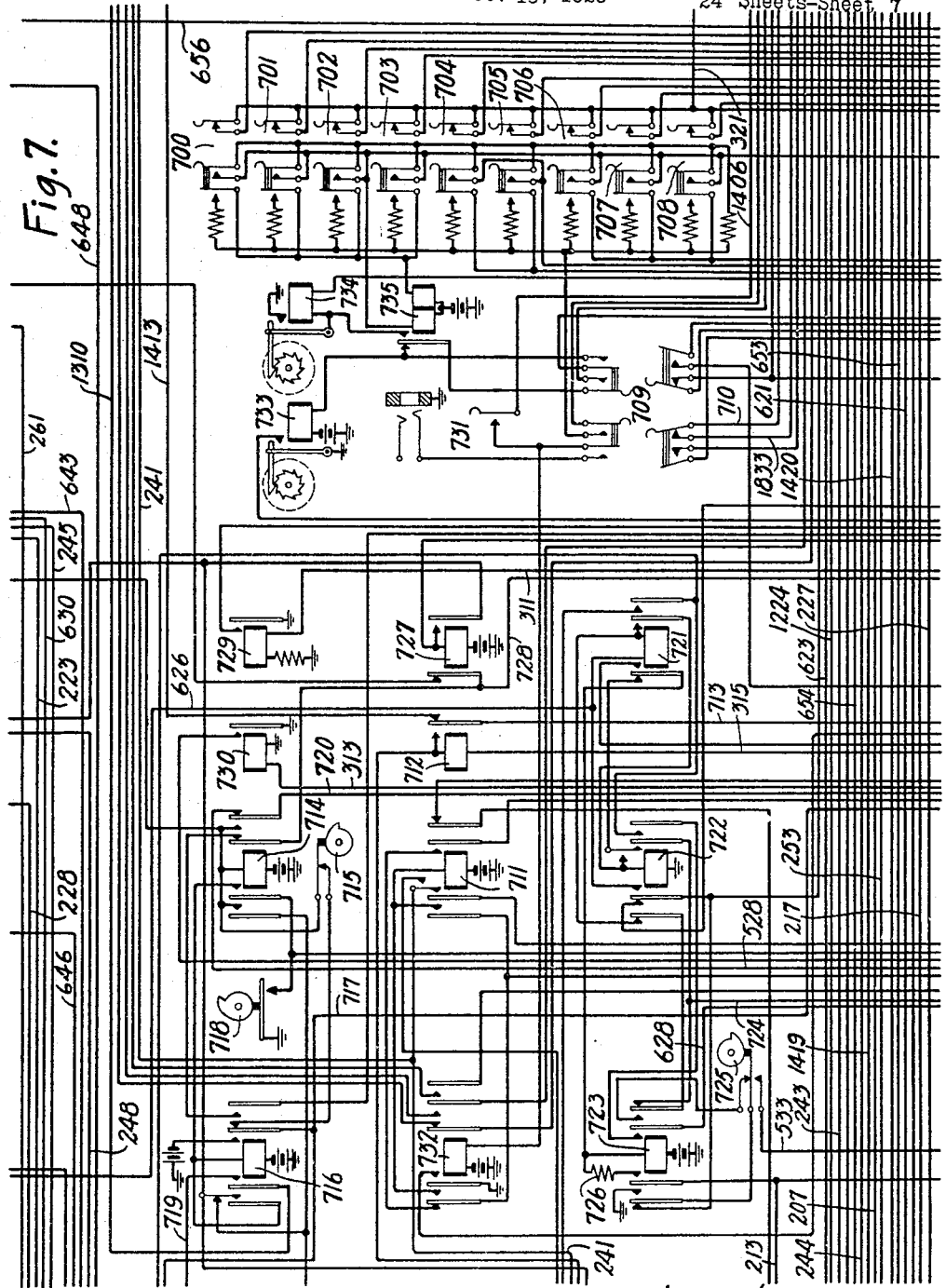
Figure 8:
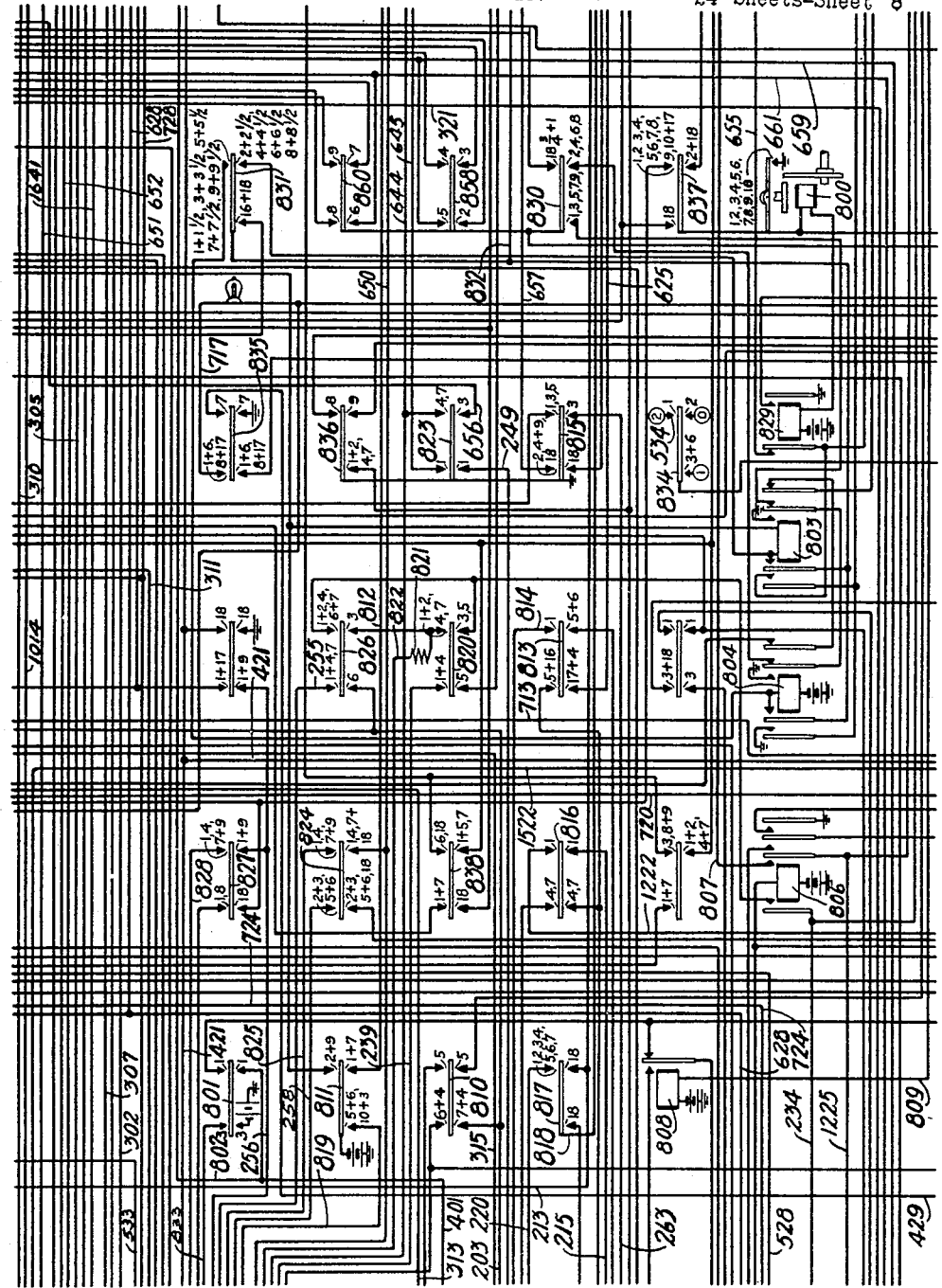
Figure 9:
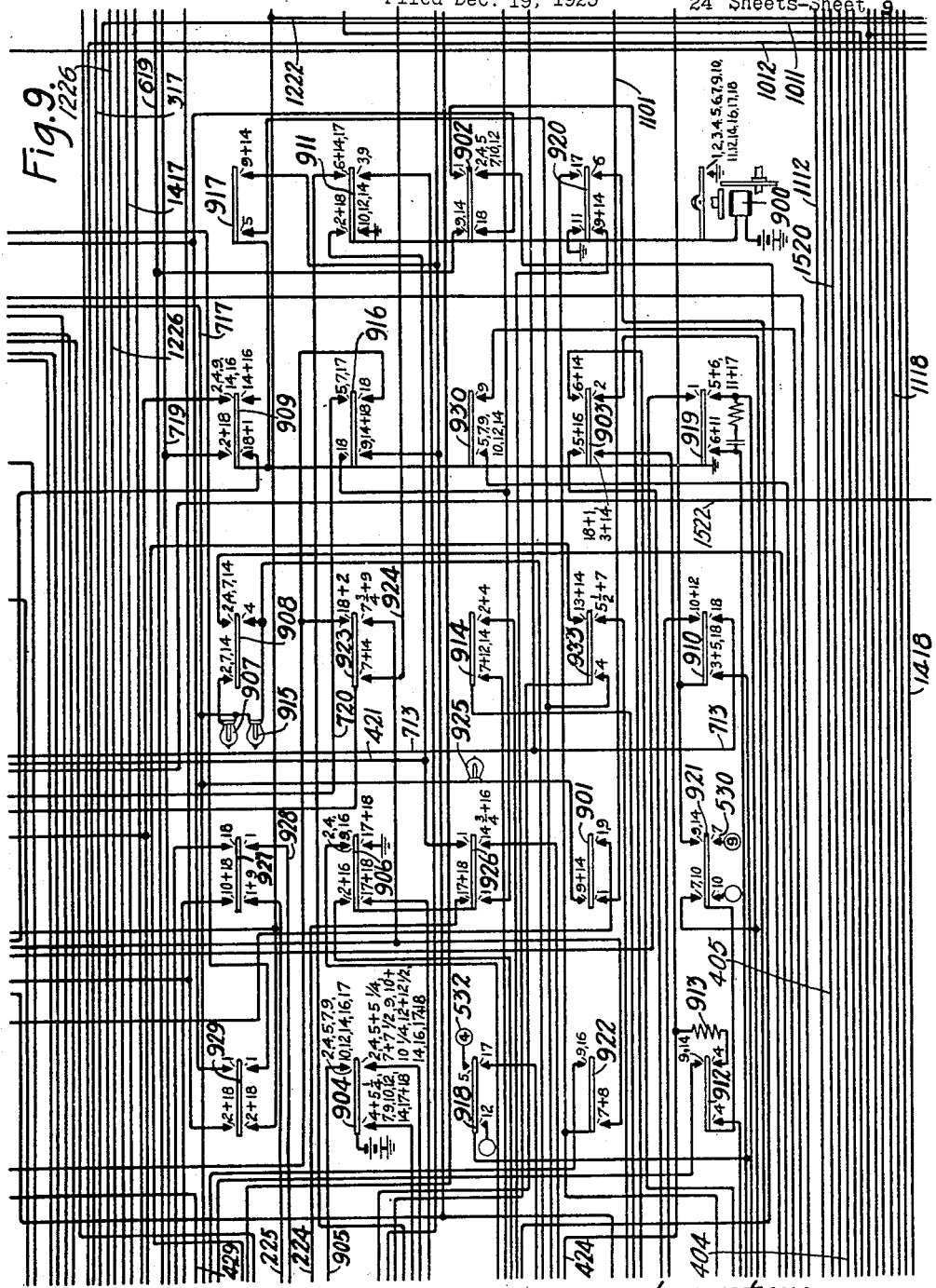
Figure 10:
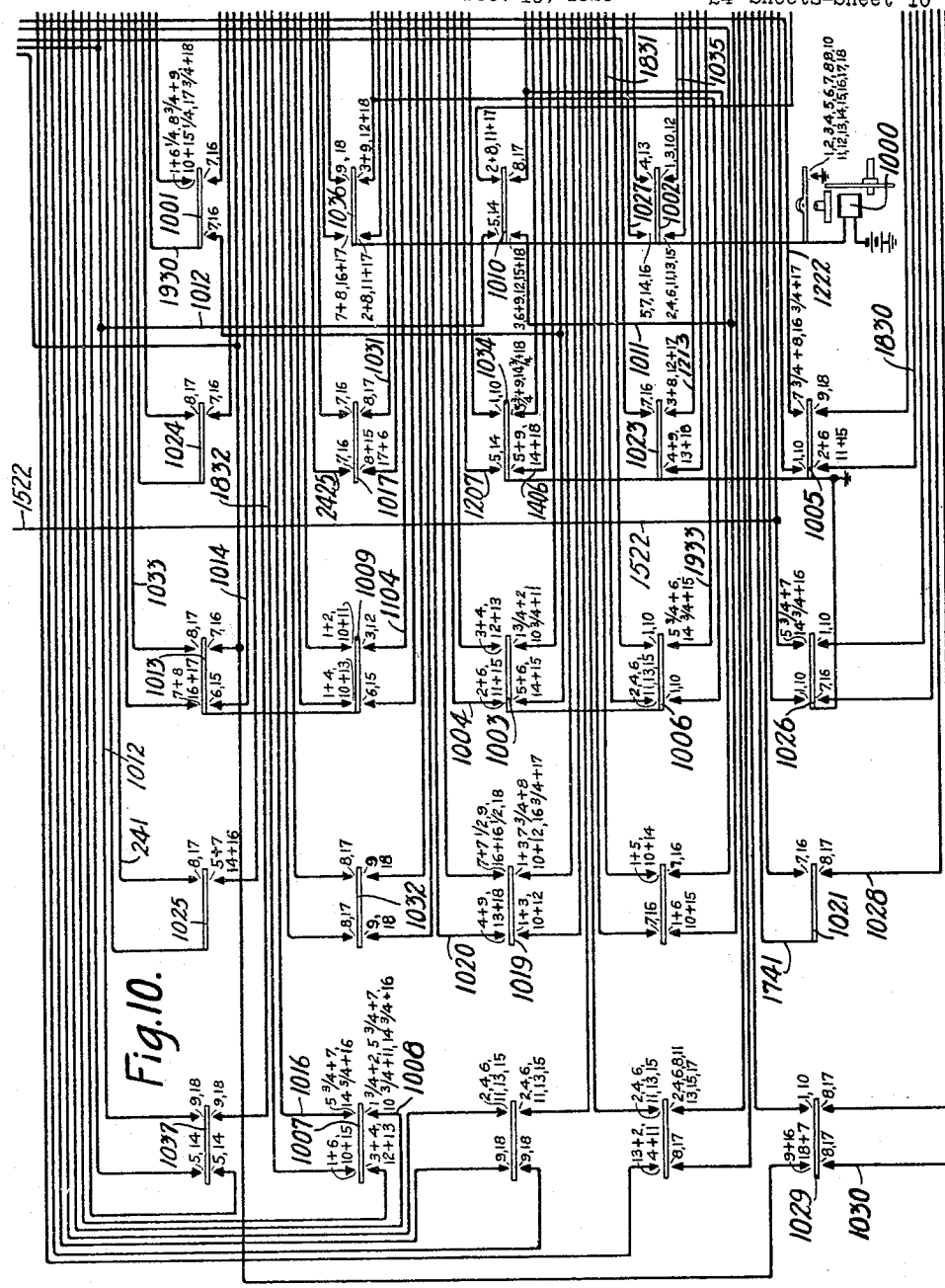
Figure 11:
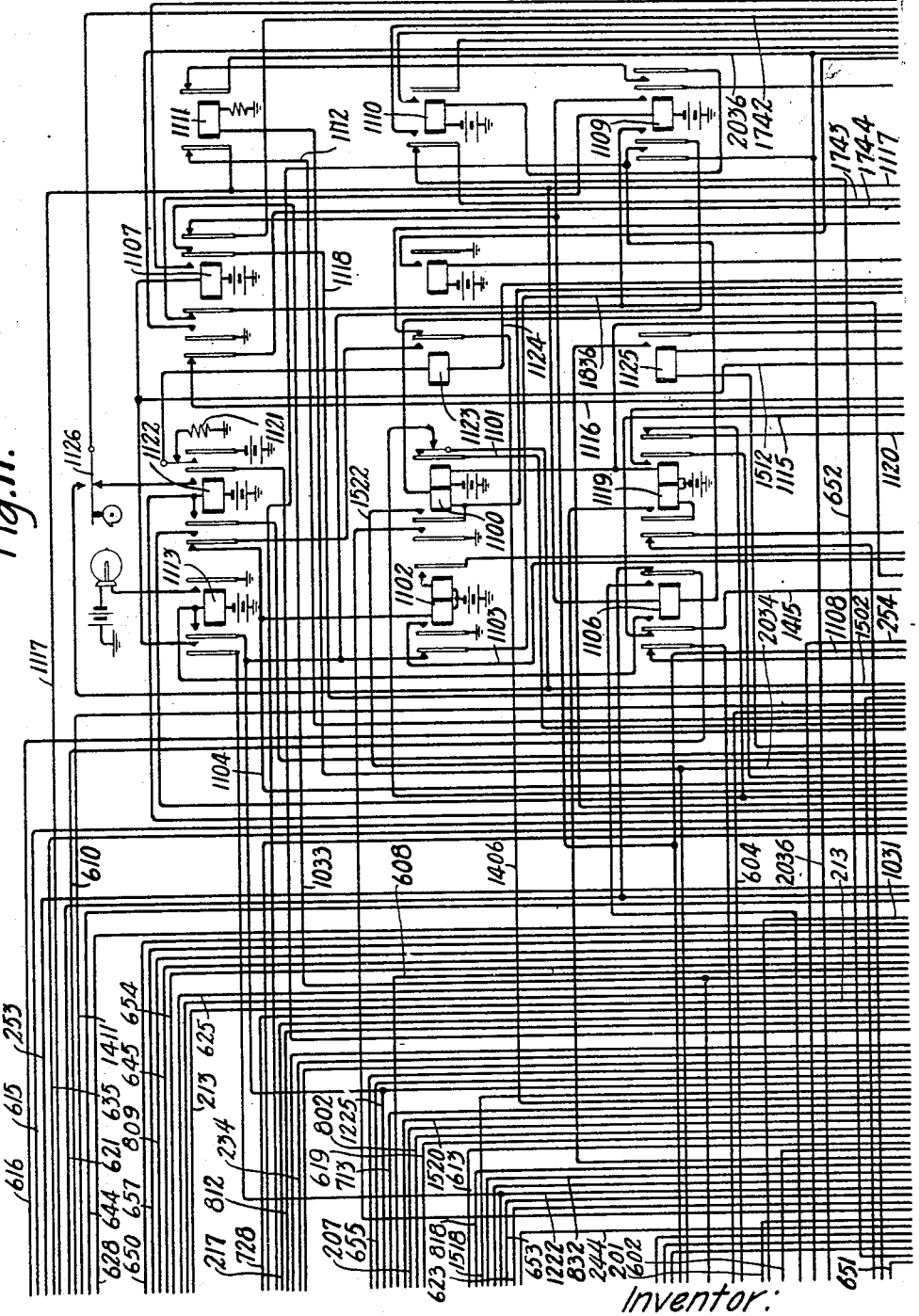
Figure 12:
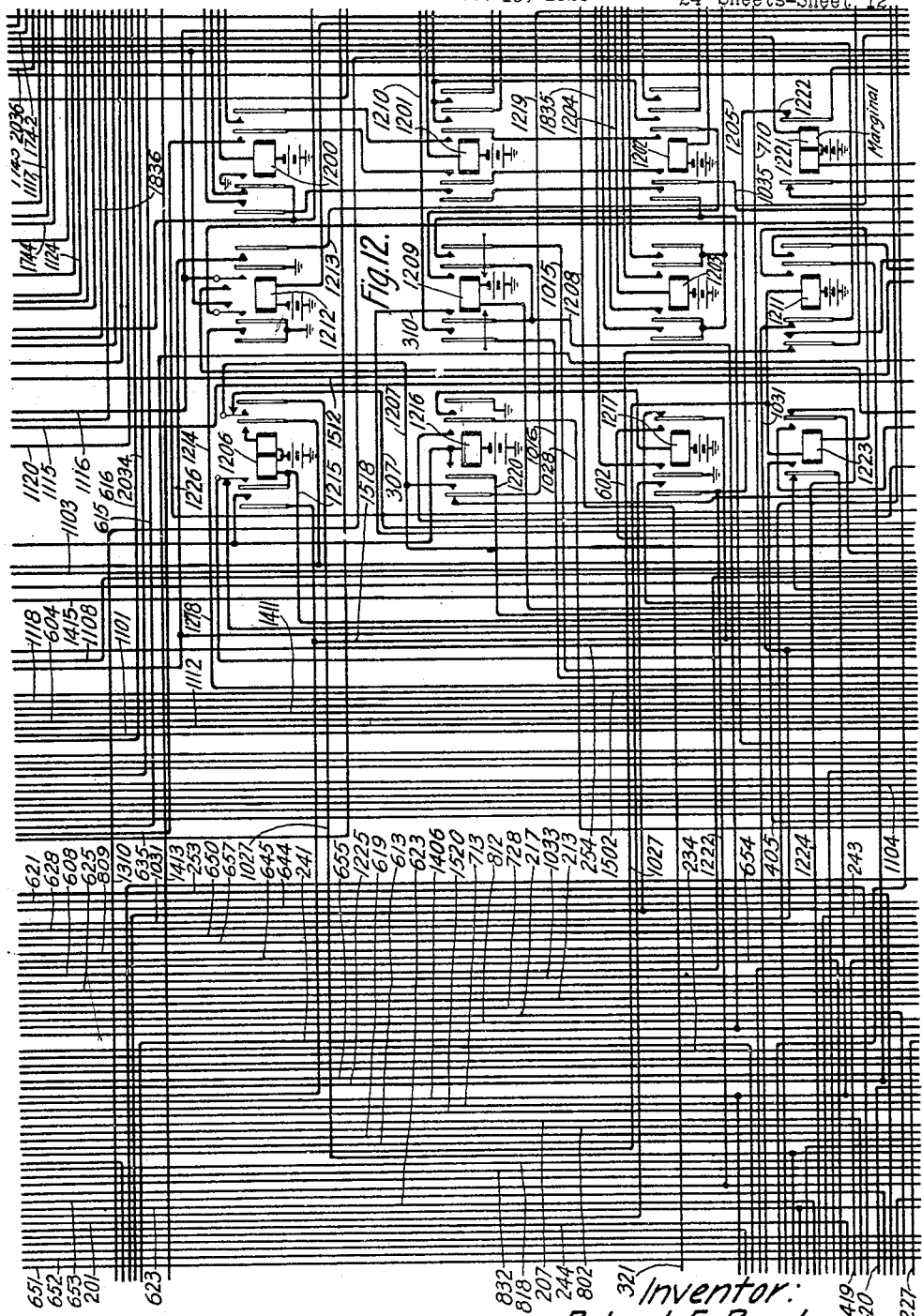
Figure 13:
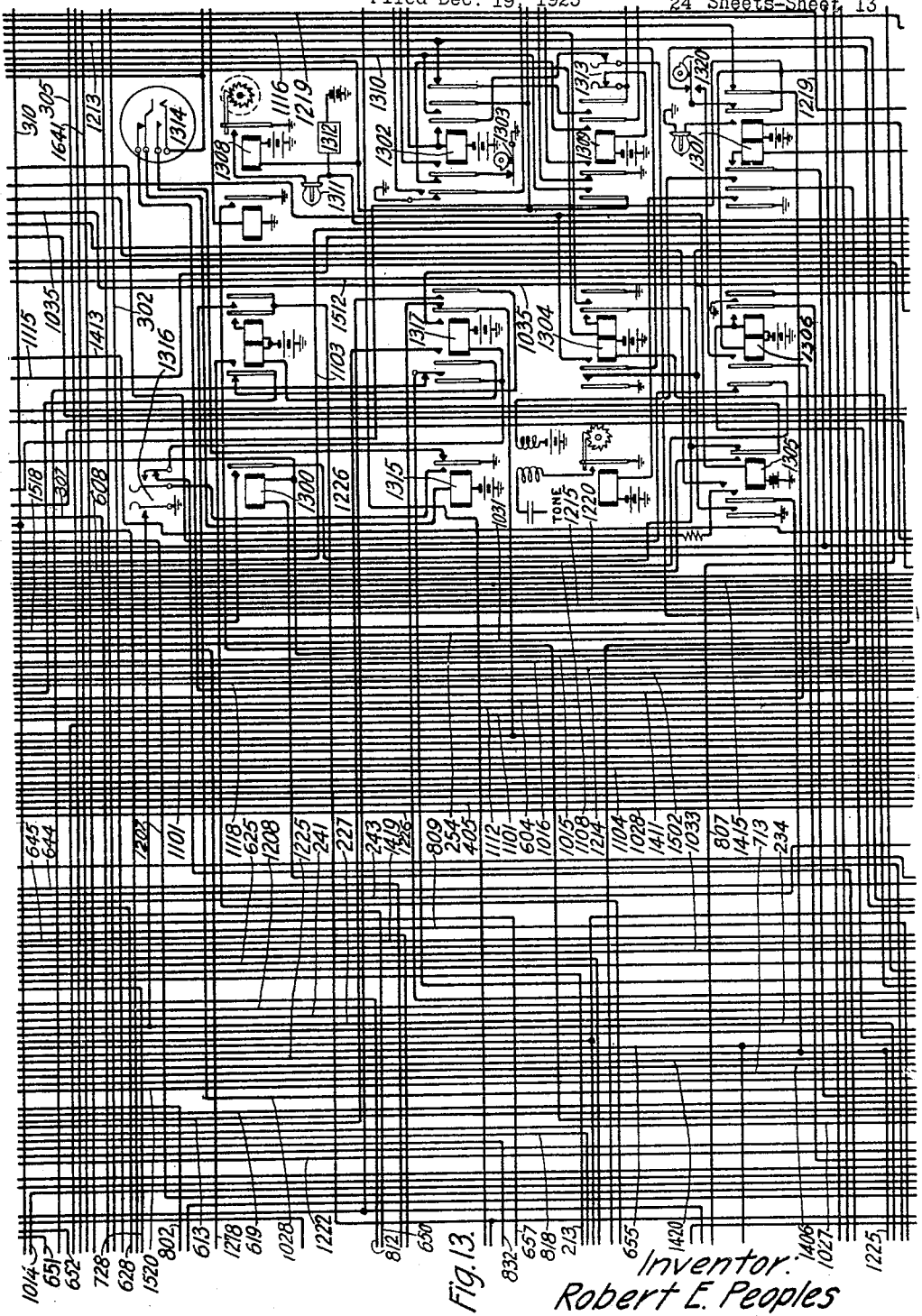
Figure 14:
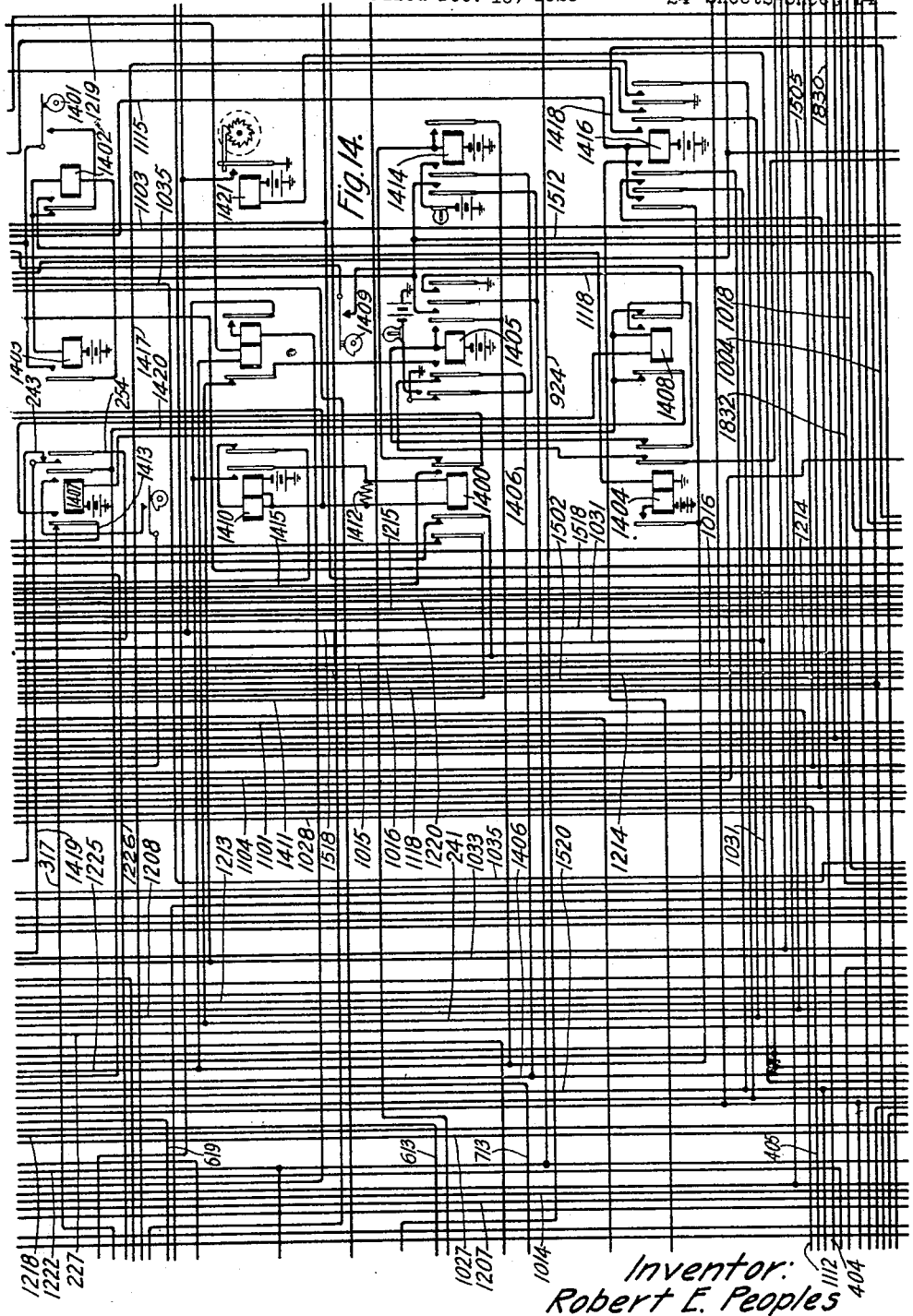
Figure 15:
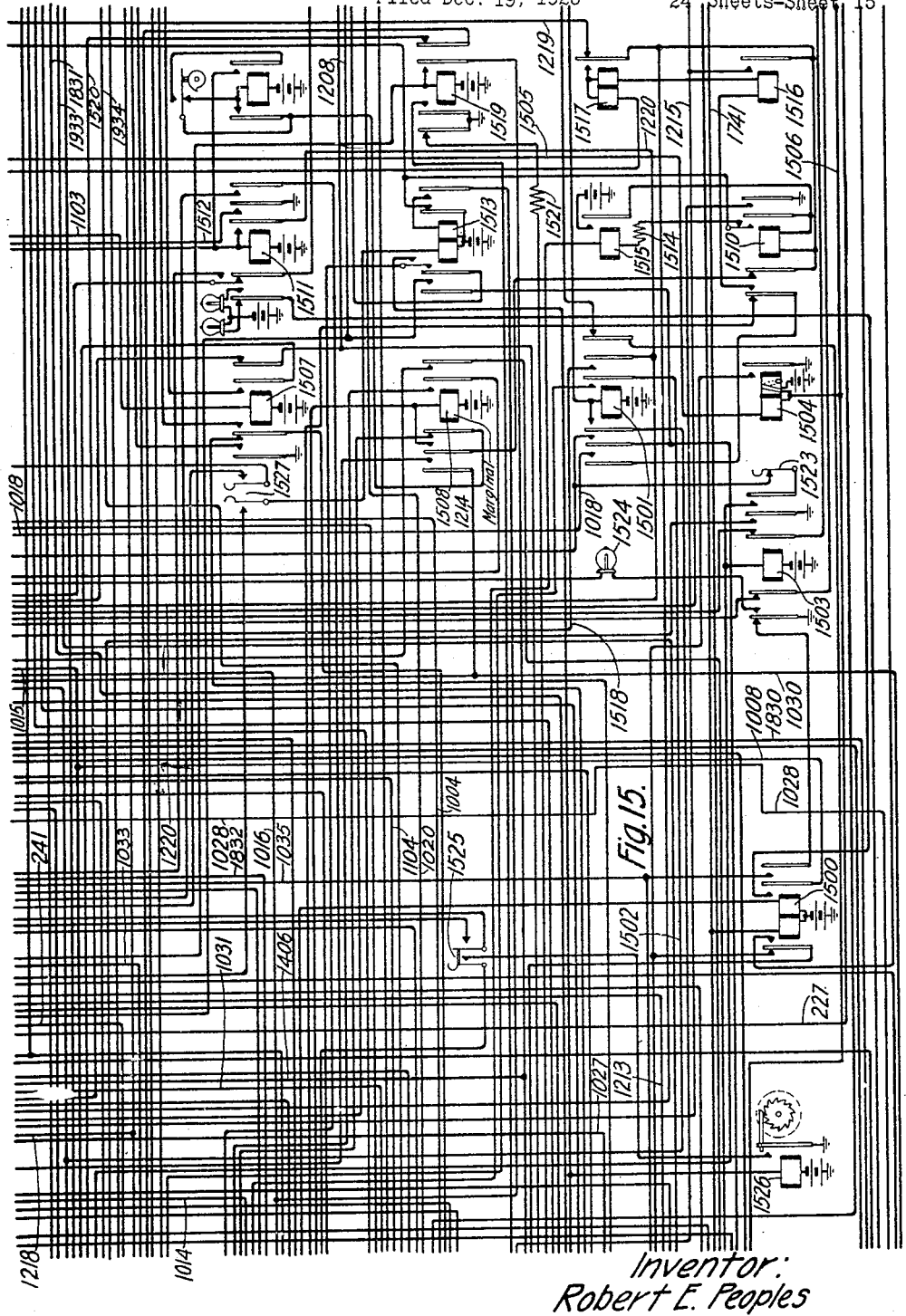
Figure 16:
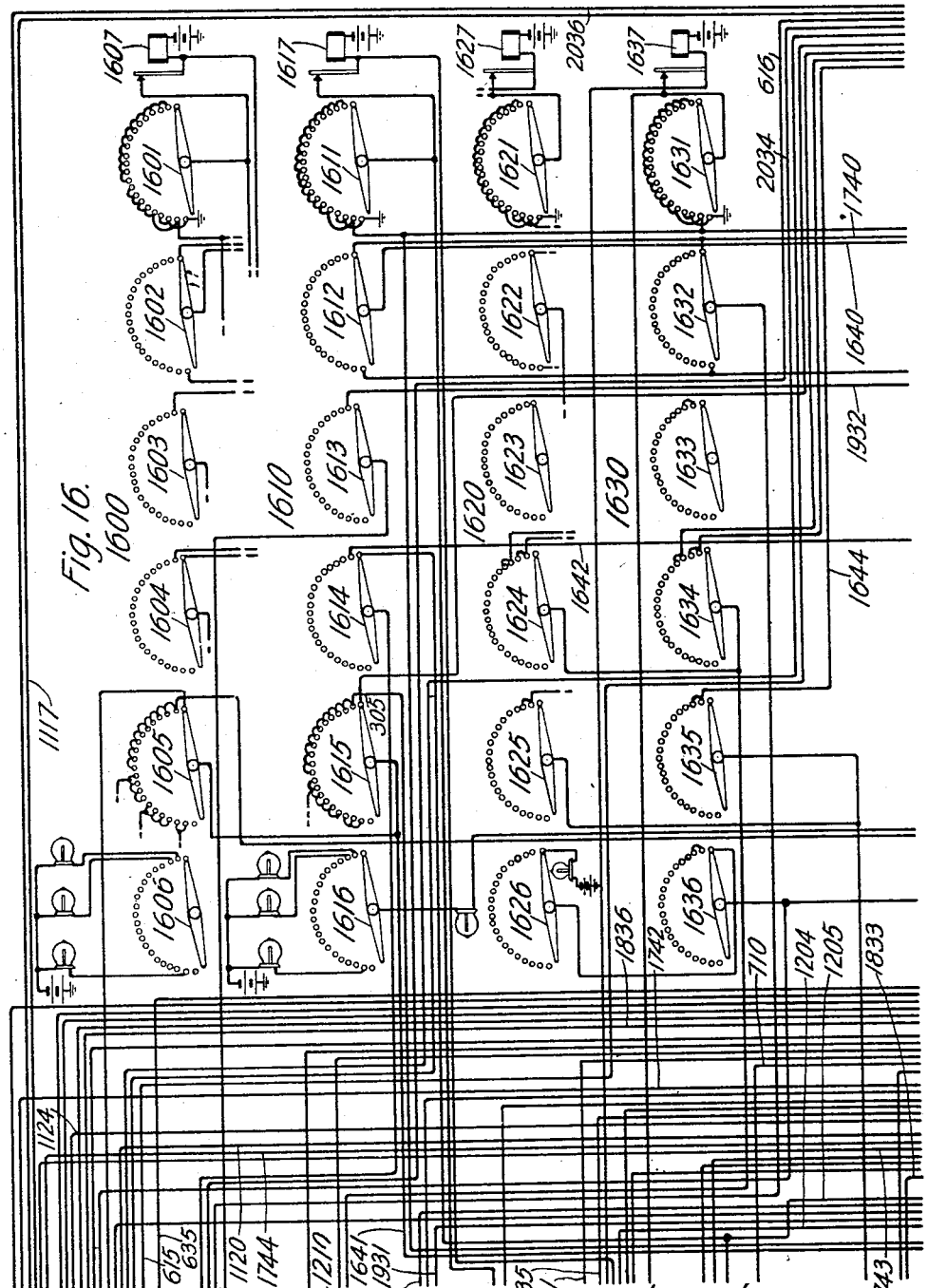
Figure 17:
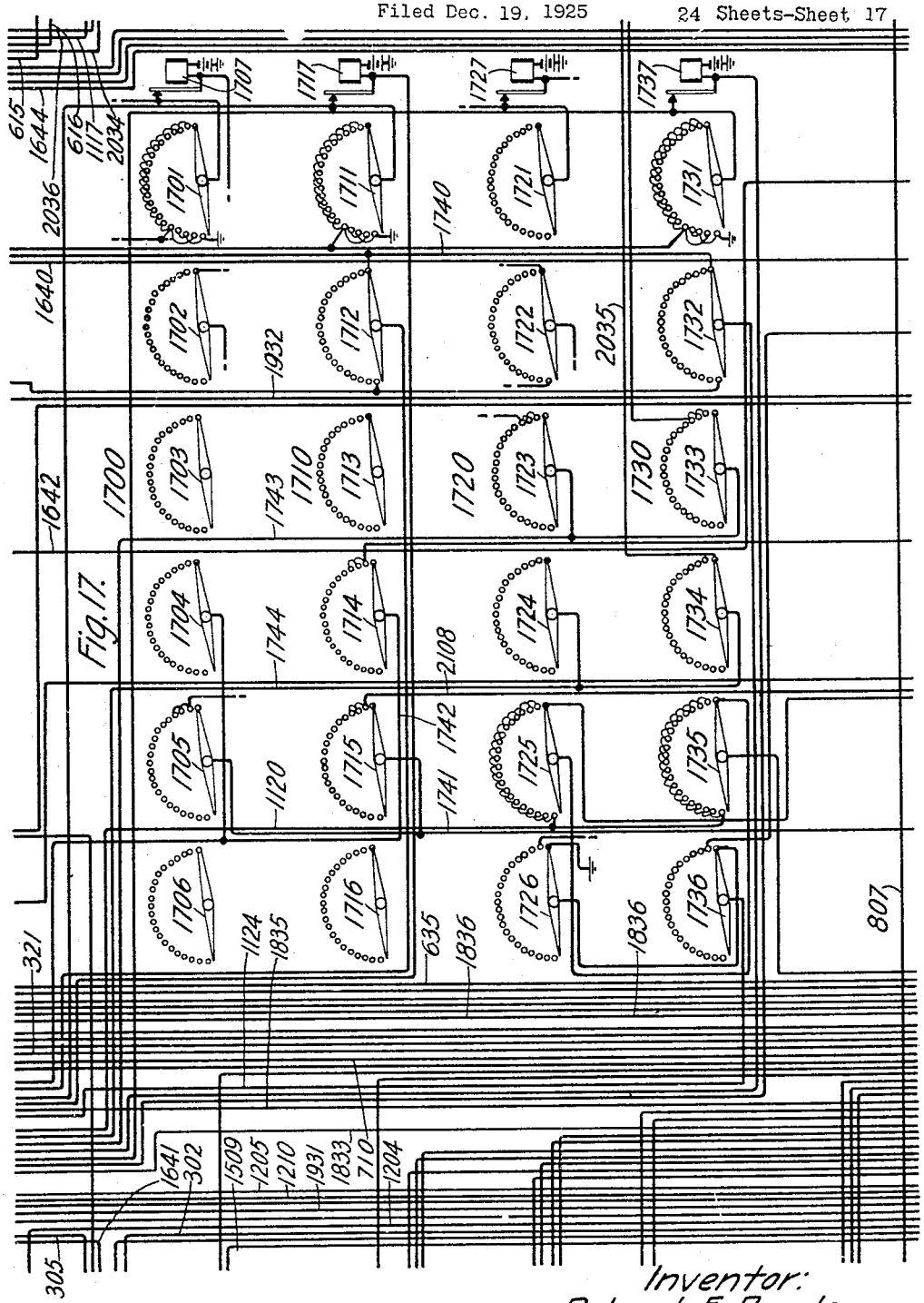
Figure 18:
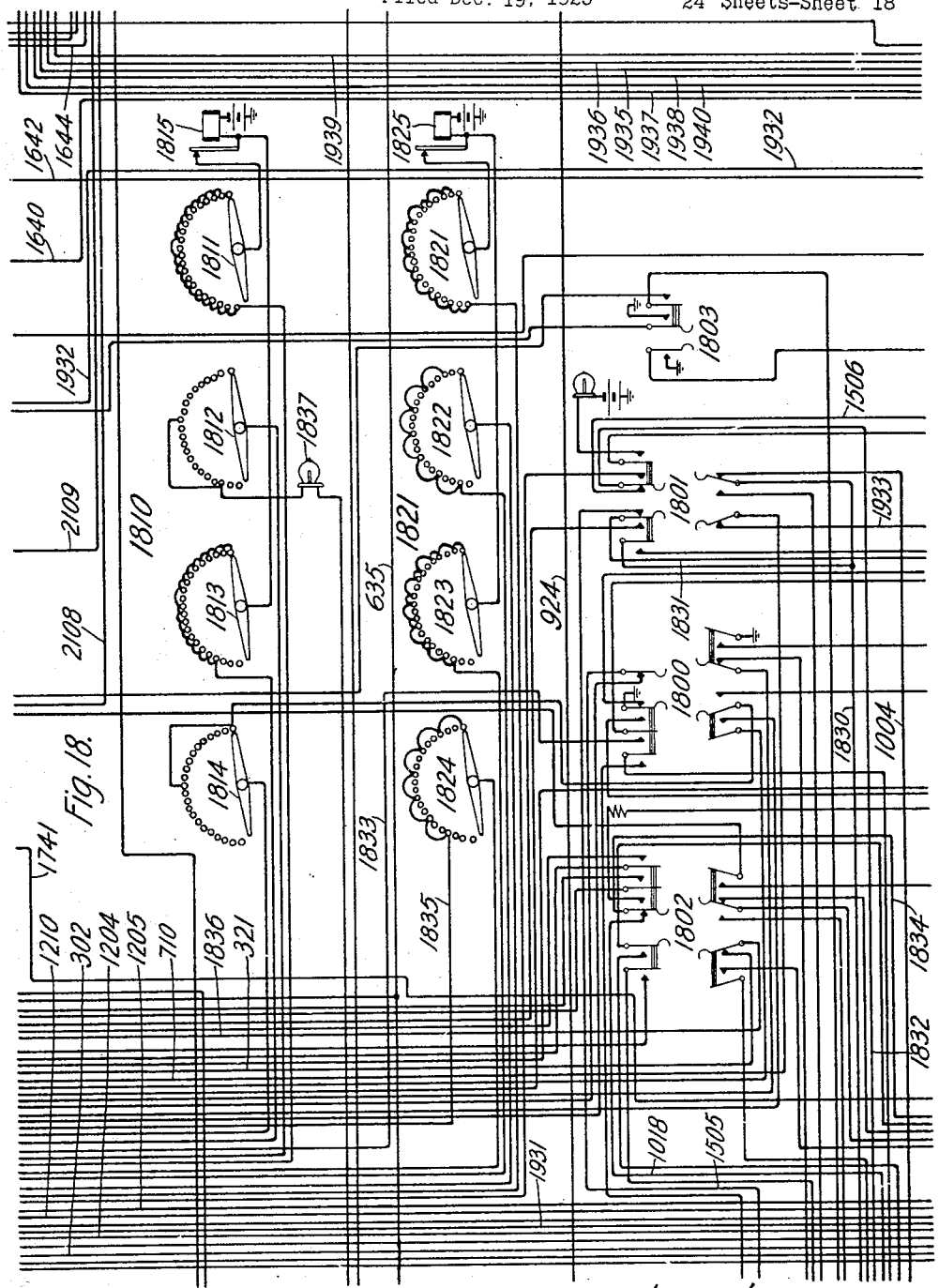
Figure 19:
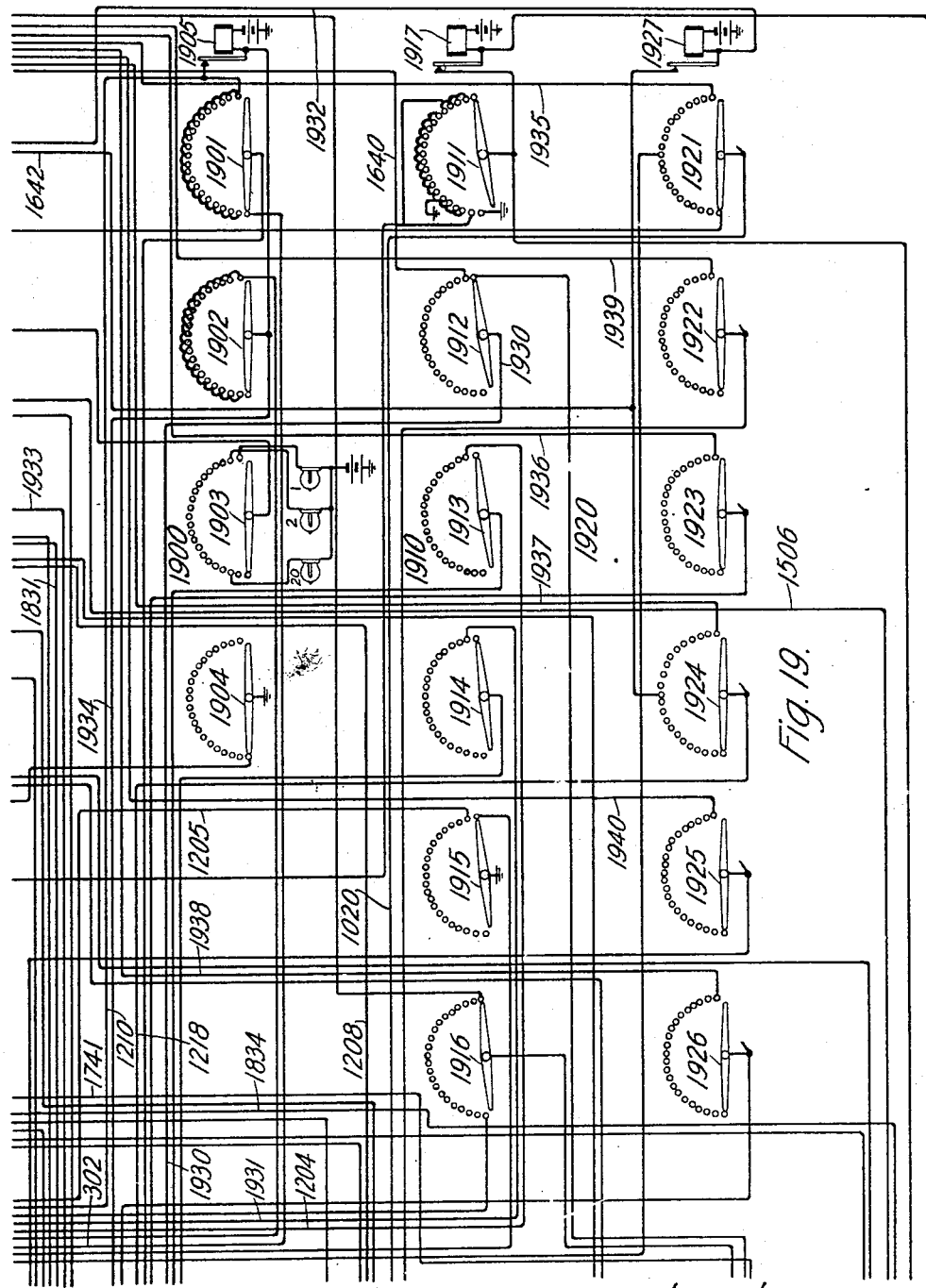
Figure 20:
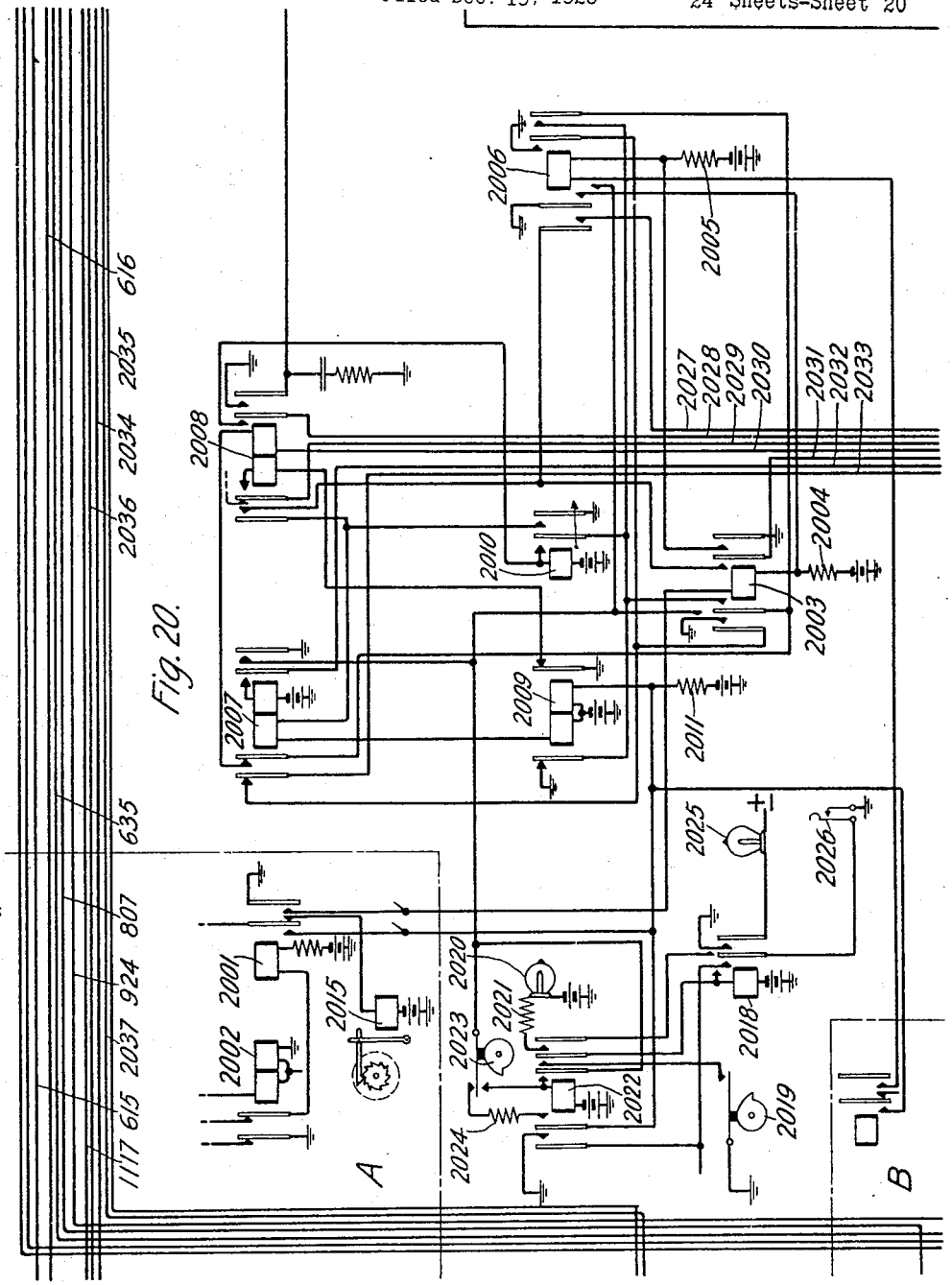

Connection with selector to be tested.

Assume that all of the keys 700 to 708 are operated as well as start key 1800. The operation of key 1800 closes a circuit from battery through the winding of relay 1501, innermost left operated contact of key 1800, to ground. Relay 1501 operates and prepares a locking circuit for itself, over its innermost left front contact and the lower right contact of cam 1034 to ground which circuit is completed when sequence switch 1000 reaches position 5¾ to prevent the mutilation of a test should key 1800 be restored while a test is in progress.

The closure of key 1800 also closes a circuit from battery through the winding of relay 1309, left normal contact of key 1313, normal terminal of busy timing switch brush 1814, inner left lower contact of key 1800, lower contacts of cam 1019, resistance 1521, to ground at the left back contact of relay
1519. Relay 1309 operates and locks through key 1313, outer right front contact of relay 1309, right back contact of relay 1302, conductor 1213, lower right contact of cam 1023 to ground. The operation of relay 1309 closes a circuit from battery through the winding of magnet 1815 of the busy timing switch, brush 1813 and its strapped terminals, inner right front contact of relay 1309, inner left back contact of relay 1302, contact of interrupter 1303 to ground. Magnet 1815 is intermittently operated to advance switch 1810 to time the interval elapsing until the district selector is ready for test.

With relay 1501 operated a circuit is closed from battery through the left winding of relay 1500, normal contact of master selector brush 1912, conductor 1930, upper contact of cam 1001, inner right front contact of relay 1501, conductor 1502, right back contact of relay 1100, conductor 1101, lower contacts of cam 901, right contacts of cam 801, conductor 802, upper contact of cam 605 to ground. With relay 1500 operated sequence switch 1000 is advanced to position 2 in a circuit which may be traced from battery, through the winding of sequence switch magnet 1000, lower right contact of cam 1002, conductor 1035, outer right front contact of relay 1500 to ground at the outer left back contact of relay 1503. When sequence switch 1000 reaches position 2 a circuit is closed from battery through the winding of master selector stepping magnet 1917, left front contact of relay 1500, lower right and upper left contacts of cam 1003, conductor 1004, lower right normal contact of key 1801, conductor 1830, lower left contact of cam 1005 to ground. At the same time a circuit is closed from battery, through the non-inductive winding of relay 1504 and the inductive winding of relay 1504 in series, conductor 1505, inner upper left normal contact of key 1801, conductor 1831, upper left contact of cam 1006, upper left contact of cam 1003, conductor 1004 and thence as traced for the magnet 1917 to ground at the lower left contact of cam 1005.

At the same time a shunt circuit is closed from battery through the non-inductive winding of relay 1504, conductor 1506, inner upper right normal contact of key 1801, conductor 1832, upper left and lower right contacts of cam 1007, conductor 1008, inner right front contact of relay 1500, back contact of magnet 1917 and thence over the operating circuit of magnet 1917 to ground at the lower left contact of cam 1005. As long as this shunt circuit is maintained around the inductive winding of relay 1504 this relay is not able to operate. Magnet 1917 operates, however, and in attracting its armature opens the shunt circuit and permits relay 1504 to operate. The operation of relay 1504 closes a circuit from battery through the winding of sequence switch magnet 1000, lower left contact of cam 1002, front contact of relay 1504 to ground, advancing sequence switch 1000 to position 3. When switch 1000 leaves position 2 the energizing circuit of magnet 1917 is opened and that magnet releases advancing the brushes to their first off-normal terminals. In this position circuits are prepared for controlling the operation of the first set of group selectors. The advance of master selector 1910 from its normal terminals also opens the circuit of relay 1500 and that relay releases.

With master selector 1910 on its first terminals, circuits are closed for relays 1200, 1201 and 1202 which may be traced from battery through the winding of relay 1200, brush 1632 of group selector 1630, to conductor 1740; battery through the winding of relay 1201, brush 1712, of group selector 1710 to conductor 1740; battery through the winding of relay 1202, brush 1732 of group selector 1730 to conductor 1740. The circuit then extends over the corresponding contact of brush 1612 of group selector 1610, conductor 1640, first terminal of brush 1912, conductor 1930, upper contact of cam 1001, inner right front contact of relay 1501, conductor 1502, and thence as traced for the circuit of relay 1500 to ground. With relays 1200, 1201 and 1202 operated, a circuit is closed from battery through the winding of relay 1102, conductor 1104, lower right and upper left contacts of cam 1009, outer left front contacts of relays 1202, 1201 and 1200, group selector brush 1614 and its normal contact, conductor 1205, first terminal of master selector brush 1915 to ground. Relay 1102 closes a circuit from battery through the winding of relay 1507, conductor 1103, left front contact of relay 1102 to ground. Relay 1507 closes a circuit from battery through the winding of sequence switch magnet 1000, lower left contact of cam 1010, conductor 1011, right contacts of cam 301, conductor 302, normal contact of brush 1901 of the locating selector, outer left front contact of relay 1507 to ground. Sequence switch 1000 advances to position 4 in this circuit.

With sequence switch 1000 in position 4 a circuit is closed from battery through the winding of relay 1203, conductor 1204, No. 1 terminal of master selector brush 1913, inner left front contact of relay 1507, upper contacts of cam 1003, conductor 1004, lower right normal contact of key 1801, conductor 1830, lower left contact of cam 1005 to ground. The operation of relay 1203 completes the operating circuits for magnets 1617, 1637, 1717 and 1737 of the respective group selector switches. These circuits may be traced from the winding of the above mentioned magnets to a front contact of relay 1203 and thence over conductor 1205, No. 1 terminal of master selector brush 1915 to ground. The previously traced circuit for relay 1504 is again closed. The shunt circuit is also closed, extending at this time from battery through the non-inductive winding of relay 1504, conductor 1506, inner upper right normal contact of key 1801, conductor 1832, left contacts of cam 1007, inner right front contact of relay 1507, master selector brush 1914 and its No. 1 terminal, conductor 1931 and thence in parallel over the outer right front contact of relay 1201 to the back contact of magnet 1617; over the middle right front contact of relay 1201 to the back contact of magnet 1717; over the middle right front contact of relay 1202 to the back contact of magnet 1737; and over the middle and outer right front contacts of relay 1202 to the back contact of magnet 1637. The shunt circuit is completed over the operating circuits of the four magnets. It is therefore necessary for all four stepping magnets to open their back contacts before relay 1504 can operate and advance the sequence switch 1000 to position 5.

From the foregoing it is apparent that the four group switches 1610, 1630, 1710 and 1730 can only be operated if all four switches are standing on corresponding terminals and that the test can only be advanced when all four switches have been stepped to their next terminals.

Group selector 1610 (and 1600) form the connecting link between the test circuit and the connector switches such as switch 1920. Group selectors 1630 and 1710 (1620 and 1700) connect the test circuit with the start circuit serving the district selectors reached through the corresponding connectors. Group selector 1730 (and 1720) connects the test circuit with the trip magnet and the hunting terminal of the test line on the line finder frame served by the district selectors reached through the corresponding connector. The other terminals of the line finder test lines on all frames are multipled together and are connected directly to the test circuit.

Setting of selector class switch.

With sequence switch 1000 in position 5 district selector class sequence switch 300 is advanced to a position corresponding to the type of district under test. District selectors may be classified according to the type of line which they serve and there are positions on sequence switch 300 corresponding to each type as follows:

|  | Positions. |
|---|---|
| Flat rate lines | 3 and 12. |
| Message rate, individual lines | 4 and 13. |
| Message rate, two-party lines | 5 and 14. |
| Coin lines | 6 and 15. |
| Coin, two-party lines | 7 and 16. |
| Message rate and coin, individual lines | 8 and 17. |
| Message rate and coin, two-party lines | 9 and 18. |

Since district selectors of any one type are grouped in service and are served by the same link and start circuits, all districts reached through a particular position of the group selectors will be of the same type. Therefore the group selector has been used in controlling the position taken by sequence switch 300. This is brought about by the operation of relay 303 in a circuit extending over cam 304 or 319 and brush 1615 of group selector 1610. In the present case this circuit may be traced from battery through the winding of relay 303, upper right contact of cam 304, conductor 305, first terminal of brush 1615, conductor 1641, upper contact of cam 306, conductor 307, right normal contact of relay 1206, conductor 1207, upper left contact of cam 1034 to ground. Relay 303 operates in this circuit and closes an obvious circuit for moving sequence switch 300 out of position 1.

As soon as switch 300 reaches position 2 a locking circuit for relay 303 is closed which may be traced as before to conductor 1641 and thence over the lower contact of cam 306, to ground at the inner right front contact of relay 303. Relay 303 therefore remains operated as long as the upper contact of cam 304 remains closed and continues to move switch 300 until that cam opens which in the present case is position 6. When relay 303 releases, sequence switch 300 comes to rest in position 6 which corresponds as above noted to individual coin lines. When relay 303 releases with switch 300 off-normal, a circuit is closed from battery through the winding of sequence switch magnet 1000, upper left contact of cam 1010, conductor 1012, left back contact of relay 303, lower left contact of cam 318 to ground.

When sequence switch 1000 left position 3, relay 1102 released in turn releasing relay 1507. With relay 1507 released a circuit was closed as soon as switch 1000 reached position 5 from battery through the winding of relay 1209, right back contact of relay 1507, left contacts of cam 1003, conductor 1004, lower right normal contact of key 1801, conductor 1830 to ground at the lower left contact of cam 1005. With relay 1209 operated and sequence switch 1000 in position 6 circuits are closed for advancing the connector switch 1920 and the locating selector 1900. The circuit of the stepping magnet 1927 of the connecting selector extends from battery through the winding of stepping magnet 1927 of the connecting selector, conductor 1932, brush 1613 of group selector 1610 and its corresponding terminal, outer right contact of relay 1200, inner right contacts of relays 1201 and 1202, inner right contact of relay 1209, conductor 1208, middle upper left operated contact of start key 1800, conductor 1833, lower left normal contact of key 709, conductor 710, lower left normal contact of key 1801, conductor 1933, lower right contact of cam 1006, upper left contact of cam 1003, conductor 1004, and thence as previously traced to ground at the lower left contact of cam 1005. The circuit of magnet 1905 of the locating selector 1900 may be traced through the winding of that magnet, conductor 1934, lower left contact of cam 1009, lower left contact of cam 1013, conductor 1014, contact of cam 309, conductor 310, inner left contact of relay 1209, conductor 1208 and thence as traced for magnet 1927 to ground.

The previously traced circuit for relay 1504 is also completed. The shunt circuit for this relay extends in the present case as before traced to the upper left contact of cam 1007 but now extends in parallel over conductors 1008 and 1015, outer right contact of relay 1209, outer left front contacts of relays 1202, 1201 and 1200, over group selector brush 1614 and its corresponding terminal, conductor 1642, back contact of magnet 1927, to the energizing circuit of magnet 1927; and over conductor 1016, outer left front contact of relay 1209, conductor 1210, back contact of magnet 1905 to the energizing circuit of that magnet. Magnets 1927 and 1905 operate stepping their corresponding selectors to their first set of terminals and on opening their back contacts, permit relay 1504 to operate and advance sequence switch 1000 to position 7.

The connector switches such as switch 1920 serve to associate the test circuit with the control conductors over which normally the sender exercises its control over the selector. The locating selector is operated in parallel with each connector switch to indicate the district selector which is under test. Lamps connected to the terminals of group selector brush 1616 (or 1606) and to the brush itself as well as to the terminals of locating selector brush 1903 are lighted upon the operation of key 1803 and completely identify the district selector under test.

*Busy test of selector.*

With sequence switch 1000 in position 7 a test is made to determine the busy or idle condition of the district selector. The condition of the district selector and link circuit is indicated by battery and ground appearing on conductors 2366 and 2315. The following table indicates the condition of these conductors for the various positions of the district selector and link circuits.

| Position of district. | Position of link. | Conductor 2366. | Conductor 2315. | |
|---|---|---|---|---|
| 2 | 9 (18) | Ground through 10 ohms. | Open | Idle; awaiting allotment. |
| 2 | 1 (10) | Ground through 10 ohms. | Open | Idle; awaiting call. |
| 2 | 2 (11) | Open | Open | Busy; link hunting sender. |
| 2 | 3 (12) | Ground through 10 ohms. | Open | Busy; sender found district hunting calling line. |
| 3 to 10¾ | 5 (14) | Open | Battery through 650 ohms or battery through 650+750 in parallel. | Busy; cut through. |
| 11+talking position. | 5+6 (14+15) or no link. | Ground through 10 ohms. | Ground | Busy; disconnecting link. |
| Talking position to 1. | No link | Open | Ground | Talking and restoring. |
| 1 | 7 (16) | Battery through 150 ohms. | Ground | District just found by link. |

The circuits which are used to determine the condition of the district selector and link circuit are as follows: A circuit extends from battery through the winding of marginal test relay 1508, upper contacts of cam 1017, conductor 2425, outer left back contact of relay 1510, outer left front contact of relay 1501, conductor 1018, innermost upper right normal contact of key 1802, conductor 1834, upper contacts of cam 1019, conductor 1020, connector brush 1921, and its corresponding contact, conductor 1935 to conductor 2366. Another circuit is prepared from battery over the inner right back contact of relay 1513, right normal contact of relay 1510, resistance 1514, winding of relay 1515, lower contact of cam 1025, connector brush 1926 and its corresponding contact, conductor 1938, to conductor 2315.

When conductor 2366 is open or battery through 150 ohms is connected to that conductor relay 1508 cannot operate but when ground through 10 ohms is connected thereto it will operate. Therefore, relay 1508 will only operate when the district selector is in position 2 or in positions 11 to 1. Likewise relay 1515 can only operate when direct ground is connected to conductor 2315, due to the presence of resistance 1514 in the circuit of that relay. It will therefore operate only when the district is in position 11 to the talking position. It will be noted that the circuit of relay 1515 is prepared as soon as switch 1000 reaches position 5 and therefore this relay will have an opportunity to operate before relay 1508, the circuit of which is not prepared until switch 1000 reaches position 7. The operation of relay 1515 prepares a circuit for relay 1510 which is fast to operate and which controls the circuit of relay 1508. From a consideration of the foregoing table it will therefore be apparent that relay 1508 can only operate when the district selector is standing in its normal idle condition, that is, associated with a link and ready to receive a call.

*Disconnection of selector from link circuit.*

Figure 21:
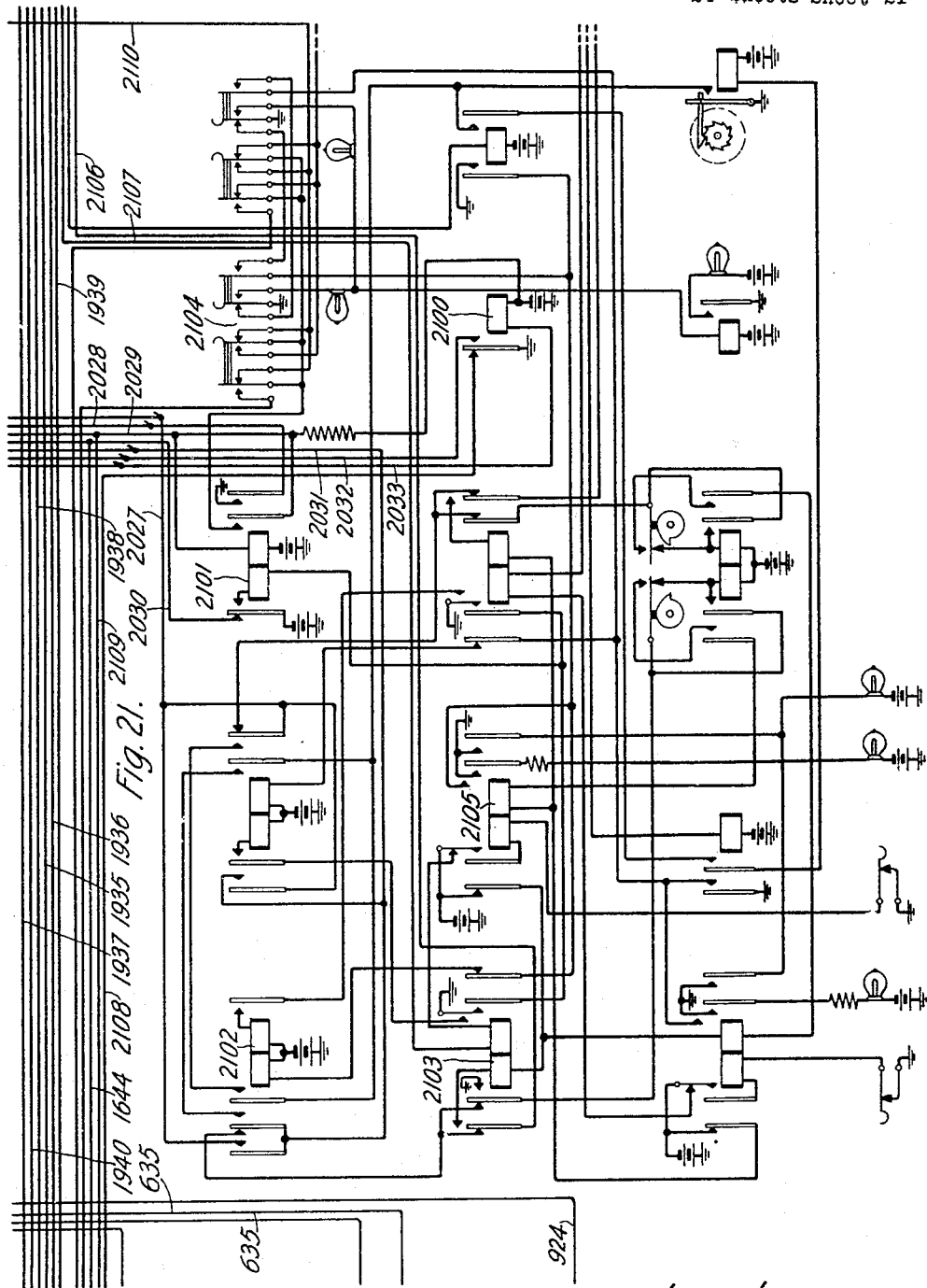

Let us assume that the district selector is in its normal idle condition. Relay 1508 will operate and lock over its middle left front contact, inner left back contact of relay 1510, upper contact of cam 1023 to ground. If the start and trip circuit associated with the district to be tested is not in use, a circuit is closed from battery over the back contact of relay 2101, conductors 2030 and 1644, group selector brush 1635 and its corresponding contact, outer left back contact of relay 1211, conductor 602, upper contacts of cam 601, outer left back contact of relay 200, right back contact of relay 711, outer right back contact of relay 804, outer right back contact of relay 803, winding of relay 1300, outer right front contact of relay 1508, upper contact of cam 1021, conductor 1741, group selector brush 1715 and its corresponding contact, conductor 2108, to ground at the back contact of relay 2100. The completion of this circuit by means of the relays in the start circuit insures that no calls in these groups will be mutilated by the test of the district selector. Relay 1300 operates in this circuit and closes a circuit from battery through the winding of relay 1212, outer right back contact of relay 1301, conductor 604, right contacts of cam 603, outer left back contact of relay 1106, contact of relay 1300, inner left back contact of relay 1400, outer right front contact of relay 1508, upper contact of cam 1021 and thence over the energizing circuit of relay 1300 to ground at the back contact of relay 2100. Relay 1212 operates and locks in a circuit extending as previously traced over the outer left back contact of relay 1106, outer right front contact of relay 1212, conductor 1213, lower right contact of cam 1023 to ground. The operation of relay 1212 closes a circuit from battery through the left winding of start relay 2101 of the start circuit, conductors 2029 and 2109, group selector brush 1714 and its corresponding contact, conductor 1742, outer right back contact of relay 1107, conductor 1108, right back contact of relay 1305, innermost right front contact of relay 1212 to ground. This circuit prevents the trip relays such as 2008 of the trip circuits served by the start circuit of Fig. 21 from locking and hence prevents the extension of a call during the time that the link circuit is being dismissed.

The operation of relay 1212 also closes a circuit from battery, through resistance 2410, upper contact of cam 2409, upper left contact of cam 2408, winding of relay 2407, right winding of relay 2406, upper left contact of cam 2405, upper right contact of cam 2404, brush 2462 and its associated contact, conductor 1936, brush 1923 and its corresponding contact, lower contact of cam 1024, outer left front contact of relay 1508, conductor 1214, outer left front contact of relay 1212 to ground. Relay 2407 operates in series with the low resistance winding of relay 2406 and advances switch 2400 from position 1 or 10 to position 2 or 11.

With sequence switch 2400 in position 2 a circuit is closed from battery through the right winding of relay 2314, lower right contact of cam 2313, lower left contact of cam 2312, conductor 2375, brush 2466 and its corresponding contact, lower right contact of cam 2415 to ground. Relay 2314 operates and closes a circuit from battery, through the winding of sequence switch magnet 2300, upper left contact of cam 2328, left front contact of relay 2314, left back contact of relay 2302 to ground advancing sequence switch 2300 to position 3.

With sequence switch 2400 in position 2, switch 2480 is operated to find an idle sender in the manner described in the above identified patent to I. H. Henry. Relays 2406 and 2407 release on the advance of the link circuit and are reoperated from battery over brush 2483 when an idle sender is found. The operation of these relays advances sequence switch 2400 to position 3. With sequence switch 2400 in position 3 ground through a high resistance relay in the sender is connected to brush 2484, lower right and upper left contacts of cam 2408, brush 2464 and its corresponding contact, conductor 2315, lower left contact of cam 2316, right winding of relay 2317 to battery. Relay 2317 being marginal does not operate but the sender relay operates, initiating the operation of the sender timing circuit which after an interval substitutes a low resistance ground for the high resistance ground connected to brush 2484 and causes the operation of relay 2317. Relay 2317 operated locks in a circuit through its left winding and inner left front contact to ground at the upper right contact of cam 2336. It also extends this locking ground through the left normal contact of relay 2387, winding of relay 2388 to battery. Relay 2388 initiates the operation of the coin circuit as will be described in more detail later.

When the coin circuit connects with the district selector relay 2389 operates and connects ground over its left contact, upper contacts of cam 2301, winding of relay 2302 to battery, operating relay 2302. The operation of relay 2302 closes a circuit from battery, through the winding of sequence switch magnet 2300, upper left contact of cam 2311, outer left front contact of relay 2302, to ground, advancing sequence switch 2300 to position 7.

Since the district selector has not been moved upward a circuit is closed at this time from battery through the winding of sequence switch magnet 2300, upper right contact of cam 2328, normal commutator segment 2370, brush 2371 to ground at the upper left contact of cam 2339, advancing the sequence switch 2300 to position 8.

Sequence switch 2300 is advanced from position 8 to position 9 in a circuit over the right contacts of cam 2342, left back contact of relay 2314 to ground at the back contact of relay 2302, which relay released when sequence switch 2300 left position 6. Sequence switch 2300 is now advanced to position 17 over the normal commutator segment 2370. In position 17 relay 2302 is again operated over the lower right and upper left contacts of cam 2368 to ground at the inner right front contact of relay 2387 provided the coin circuit has completed its operation. Relay 2302 closes a circuit for advancing sequence switch 2300 to position 18 over its outer left front contact. Sequence switch 2300 is advanced to position 1 by means of a commutator segment 2370.

The operation of the sender relay which initiates the sender timing operation also causes the removal of battery from the terminal of brush 2483, permitting relays 2406 and 2407 to release and advance sequence switch 2400 to position 4. Switch 2400 is advanced locally to position 5 in which position the conductors connecting the district and the sender are cut through. As soon as sequence switch 2300 reached position 11 a circuit was completed from ground over the lower right contact of cam 2316, conductor 2315, brush 2464, upper contact of cam 2413, right winding of relay 2406, winding of relay 2407, left contacts of cam 2408, brush 2484, to battery in the sender circuit which is substituted for the above mentioned ground during release. Relays 2406 and 2407 operate and advance sequence switch 2400 to position 7. Relay 2467 is operated, in turn operating magnet 2468 which causes the district finder switch 2460 to hunt for an idle district. The link circuit is now dismissed, and the district, associated with the test circuit, is standing in position 1.

At the time relay 1212 operated, starting the dismissal of the link circuit, it also closed a circuit from battery through the winding of relay 1403, left back contact of relay 1402, contact of interrupter 1401, middle left contact of relay 1212 to ground. Relay 1403 operates when interrupter 1401 closes its contact and closes a locking circuit for itself through the winding of relay 1402, front contact of relay 1403 to ground at the middle left contact of relay 1212. Relay 1402 operates when interrupter 1401 opens the energizing circuit of relay 1403, and closes a circuit from ground at the middle left contact of relay 1212, through interrupter 1401, front contact of relay 1402 through the winding of relay 1511 to battery. Should this circuit be maintained until interrupter 1401 again closes its contact, relay 1511 would operate and close a circuit from ground over its middle right contact, conductor 1512, to the winding of relay 1107, which would release the start circuit and cause an alarm to be sounded.

When the link advanced to position 2 connecting ground to the winding of relay 2314 as previously described this ground is also connected over conductor 1937, connector brush 1924, conductor 1215, upper left and lower right contacts of cam 1013, inner right front contact of relay 1508, right winding of relay 1301 to battery. Relay 1301 operates and closes a locking circuit for itself from battery over the right back contact of relay 1513, left winding and inner left front contact of relay 1301, middle left front contact of relay 1501, upper right contact of cam 1026 to ground. The operation of relay 1301 opens the locking circuit of relay 1212 and relay 1212 releases, opens the blocking circuit to the start circuit of Fig. 21.

When the district selector reaches position 11 ground is connected from the lower right contact of cam 2316, to conductor 2315. It also completes a circuit over conductor 1938 to the winding of relay 1515 as previously described. Relay 1515 operated closes a circuit from battery over its contact through the winding of relay 1510, upper contact of cam 1023 to ground. Relay 1510 in operating opens the circuit of relay 1515 but closes a holding circuit for itself by means of its make-before-break contact from battery over the back contact relay 1513.

If the test circuit finds the district selector while conversation is in progress, relay 1515 will operate in the manner described and, since the link circuit has already been dismissed, the operation of relays 1508, 1300 and 1212 for the purpose of blocking the start circuit will not be necessary.

When the district selector reaches position 1 a circuit is closed from battery through resistance 2373, over the lower contact of cam 2324, contact 2399 of jack 2374, conductors 2366 and 1935, connector brush 1921 and its corresponding contact, conductor 1020, upper contacts of cam 1019, conductor 1834, innermost upper right normal contact of key 1802, conductor 1018, outer left front contact of relay 1501, left front contact of relay 1510, winding of relay 1516, windings of relay 1517, inner right contact of relay 1404, inner left back contact of relay 1405, conductor 1406, lower left contact of cam 1034 to ground. Relay 1517 operates and closes a shunt around its high resistance winding to ground at the upper contact of cam 1023 permitting relay 1516 to operate. Relay 1516 in operating closes a circuit from ground at the upper contact of cam 1023, front contact of relay 1516, conductor 1215, left winding of relay 1206 to battery. Relay 1206 operates and locks through its right winding and inner right front contact, middle left front contact of relay 1501, to ground at the upper right contact of cam 1026. Relay 1206 in turn closes a circuit for operating relay 1216 over its outer left front contact, conductor 1518, to ground at the left contact of cam 605. Relay 1216 also locks over its inner left front contact, conductor 1220, outer right front contact of relay 1501 to conductor 1518. Relay 1216 closes an obvious circuit for relay 1217.

The ground through relays 1516 and 1517 which is connected to conductor 2366 prevents the seizure of the district selector by another link circuit. Relay 1206 in operating extends ground from conductor 1215 over its inner left front contact, conductor 1278, lower right and upper left contacts of cam 1013, conductor 1218, connector brush 1924 and its corresponding contact, conductors 1937 and 2375, lower left contact of cam 2312, lower right contact of cam 2313, right winding of relay 2314 to battery. Relay 2314 operates and advances sequence switch 2300 to position 2.

When sequence switch 2300 leaves position 1, relays 1516 and 1517 release. With relay 1517 released a circuit is closed from battery through the winding of sequence switch magnet 1000, upper left contact of cam 1002, conductor 1027, outer right front contact of relay 1206, outer left front contact of relay 1216, conductor 1219, back contact of relay 1517, to ground at the upper contact of cam 1023, advancing sequence switch 1000 to position 8 in which all tests are made.

The operation of relay 1217 closes a circuit from battery through the winding of relay 1302, trouble timing switch brush 1824 in a normal position, conductor 1835, inner left front contact of relay 1217 to ground. Relay 1302 operates and locks over its inner right front contact, contact of key 1313, inner left back contact of relay 1503, lower left contact of cam 629, conductor 1222, to ground at the upper right contact of cam 1005. The operation of relay 1302 closes a circuit from battery through the winding of stepping magnet 1825 of trouble timing switch 1820, brush 1823 and its strapped contacts, inner left front contact of relay 1302, contact of interrupter 1303 to ground. Switch 1820 is advanced under the control of interrupter 1303 to time the testing operation. The operation of relay 1302 also opens the locking circuit of relay 1309 and the actuating circuit of magnet 1815 of the busy timing switch. Switch 1810 is restored to normal by means of a circuit from battery through the winding of magnet 1815, back contact of magnet 1815, strapped off-normal terminals of brush 1811 to ground at the left back contact of relay 1309.

*Finding line finder test line.*

When sequence switch 100 reaches position 8 the circuit of relay 1300 is reclosed extending from battery over the left back contact of relay 2101 over the circuit previously traced through the winding of relay 1300, inner right front contact of relay 1216, conductor 1028, lower contact of cam 1021, conductor 1741, group selector brush 1715 and its corresponding contact and thence to ground at the back contact of relay 2100. Relay 1300 causes the operation of relay 1212 as previously described. The operation of relay 1212 closes a circuit from battery through the left winding of relay 1304, lower contacts of cam 1029, conductors 1030 and 1214, outer left front contact of relay 1212 to ground. Relay 1304 operates and closes a locking circuit for itself from battery through the right winding of relay 2101, conductor 2109, group selector brush 1714 and its corresponding contact, conductor 1742, outer right back contact of relay 1107, conductor 1108, inner right contact and right winding of relay 1304, right back contact of relay 1221, conductor 1222 to ground at the upper right contact of cam 1005. Relay 1304 simulates trip relay 2008 of the trip circuit. Relay 2101 operates in this circuit and extends a branch of its operating circuit over its inner right front contact, outer left normal contact of key 2104, conductor 2110, upper contacts of cam 2306, to commutator segment 2305.

Relay 1304 in operating closes a circuit from battery through the winding of relay 1305, inner left front contact of relay 1304, inner left front contact of relay 1212 to ground. It also closes a circuit from battery through the winding of relay 1407, right back contact of relay 1408, interrupter 1409, outer left front contact of relay 1304 to ground. This circuit is also completed to ground at the outer left front contact of relay 1305. Relay 1407 operates at the first closure of interrupter 1409 and closes a locking circuit for itself through the winding of relay 1408, left front contact of relay 1407, conductor 1413, back contact of relay 712, conductor 713, lower left contact of cam 606 to grounded conductor 1222. Relay 1408 operates when interrupter 1409 opens the energizing circuit of relay 1407 and prepares a circuit for relay 1405 extending over the back contact of relay 1404, front contact of relay 1408, to interrupter 1409. If relay 1404 does not operate at the correct time as will be described later, relay 1405 will be permitted to operate and lock blocking the test.

The operation of relay 1305 opens the circuit which exists over its left back contact to ground at the inner front contact of relay 1212 which would prevent the locking relay 1304. Relay 1305 closes a circuit from battery through the winding of relay 1109, inner left back contact of relay 1107, right front contact of relay 1305 to ground at the inner right front contact of relay 1212. Relay 1109 operates and locks in a circuit over the inner left back contact of relay 1107, inner left front contact of relay 1109, conductor 1225, lower right contact of cam 606 to grounded conductor 1222. Relay 1109 closes a circuit from battery through the winding of relay 1110, outer right front contact of relay 1109, right back contact of relay 1111, outer left front contact of relay 1109, winding of relay 1106, left back contact of relay 1111, conductor 1112, inner right back contact of relay 400, conductor 401, conductor 802, upper contact of cam 605 to ground. Relays 1110 and 1106 operate in this circuit. Relay 1110 closes a circuit from battery through the right winding of relay 1221, left front contact of relay 1110, conductor 1743, group selector, brush 1733 and its corresponding contact, conductor 2037 to terminal 2380.

Relay 1110 in operating also closes a circuit from battery through the winding of relay 2302, upper right and lower left contacts of cam 2301, conductors 2378 and 1939, connector brush 1922 and its corresponding contact, lower contacts of cam 1017, conductor 1031, inner left back contact of relay 1211, right front contact of relay 1110, inner left front contact of relay 1212 to ground. Relay 2302 operates and closes the circuit of updrive magnet 2304 over its left front contacts and the upper left contact of cam 2364.

In the meantime the operation of relay 1212 closes a circuit through the winding of trip magnet 2303, conductor 2035, group selector brush 1734 and its corresponding contact, conductor 1744, outer left back contact of relay 1107, conductor 1116, to ground at the middle right front contact of relay 1212. Therefore, when the brush rod of the line finder moves upward under the control of updrive magnet 2304 the set of brushes serving the group of lines in which the test line appears, will be tripped.

Relay 2302 also closes a circuit from battery through the winding of relay 1211, conductor 201, right back contact of relay 200, conductor 1224, right back contact of relay 1223, left back contact of relay 1306, conductor 608, lower contact of cam 607, conductor 1520, right back contact of relay 1519, upper contact of cam 1024, connector brush 1923 and its corresponding contact, conductor 1936, lower right contact of cam 2311, outer left front contact of relay 2302 to ground. Relay 1211 operates in this circuit and closes a locking circuit for itself through the winding of relay 1223, inner right front contact of relay 1211, conductor 1225, lower right contact of cam 606 to grounded conductor 1222. The operation of relay 1211 opens the previously traced circuit for relay 2302 but that relay is locked over its inner right front contact, lower left contact of cam 2308, back contact of relay 2320 to ground over commutator strip 2321 and brush 2322 as soon as the line finder starts upward.

In preparation for testing the closure of the K segment 2305 of the line finder, which functions in service to release the trip circuit and the start circuit, two circuits are closed as soon as sequence switch 1000 reaches position 8, one of which extends from battery through the windings of relay 1410 and its back contact, over the left back contact of relay 1223 to ground by way of conductor 1406 and the lower left contact of cam 1034; the second circuit of which extends from battery through the right winding of relay 1410, over the outer right front contact of relay 1211, outer left back contact of relay 1400, conductor 1411, upper contacts of cam 609, conductor 610, right front contact of relay 1106, right contacts of cam 611, conductor 1108, right winding and right front contact of relay 1304, right back contact of relay 1221 to grounded conductor 1222.

The combined effect of these two circuits with the differential winding of relay 1410 is to hold that relay deenergized. It will be remembered that the second circuit for the right winding only of relay 1410 is in parallel with the circuit through the right winding of relay 2101. When, now, brush 2307 makes contact with segment 2305 it connects ground to the winding of relay 2101 holding that relay operated. This ground shunts battery from the right winding of relay 1304 and that relay releases. Since this ground is connected to the right winding of relay 1410 in shunt of the winding of relay 1304 there is a sufficient increase in current through that winding to operate relay 1410. Relay 1410 operated opens the circuit through the two windings, and closes a locking circuit for itself through the winding of relay 1400, inner right contact of relay 1410, conductor 1225, lower right contact of cam 606 to grounded conductor 1222. When the line finder leaves segment 2305 relay 1400 operates in this locking circuit.

If there should be a defect in the circuit from segment 2305 so that no ground is connected thereto, or that ground therefrom does not extend to the start circuit or to the testing circuit, the line finder will continue to hunt for the line and on finding it the district selector will be advanced to position 3 at which time the energizing circuit of relay 1211 will be opened and relay 1223 will operate in the locking circuit thereof. The operation of relay 1223 closes a circuit from battery through the winding of relay 1414, right back contact of relay 1400, right front contact of relay 1223, left back contact of relay 1306, conductor 608, lower contact of cam 607, conductor 1520, right back contact of relay 1519, upper contact of cam 1024, connector brush 1923 and its corresponding contact, conductors 1936 and 2379, lower contacts of cam 2342, back contact of relay 2314, back contact of relay 2302 to ground. Relay 1414 locks to grounded conductor 1225 and prevents the completion of the test, sounding an alarm.

If the test is not blocked as above described, when the line finder finds the test line and brush 2381 encounters terminal 2380 to which, it will be remembered, battery was connected through the winding of relay 1221 by the operation of relay 1010, the circuit of relay 1221 will be completed over brush 2381, upper left and lower right contact of cam 2318, through the winding of relay 2320 to ground. Relay 2320 shunts its winding with resistance 2319 to ground over commutator strip 2321 and brush 2322. This reduces the resistance in the circuit of relay 1221 sufficiently to permit that relay to operate.

Relay 2320 also opens the locking circuit of relay 2302 and that relay releases. The release of relay 2302 opens the circuit of up-drive magnet 2304 and brings the line finder to rest on the terminals outgoing to the test circuit. The release of relay 2302 also completes a circuit from battery through resistance 2373, back contact of relay 2302, left back contact of relay 2387, resistance 2325, brush 2326, terminal 2327, conductor 2034, winding of relay 1111 to battery. Relay 1111 operates in the above traced circuit and releases relays 1110 and 1106.

The release of relay 2302 also permits the operation of relay 1223 in the locking circuit of relay 1211 as above described, but due to the operation of relay 400, the circuit of relay 1414 is opened and the test proceeds. The operation of relay 1223 closes a circuit for again operating relay 2314 extending as previously traced to cam 1013, over the upper contacts of that cam, conductor 1033, inner right back contact of relay 1107, conductor 1118, right back contact of relay 521, outer right back contact of relay 400, conductor 405, left front contact of relay 1223, conductor 1406, lower left contact of cam 1034 to ground. With relay 2314 operated a circuit is closed from battery through the winding of sequence switch magnet 2300, upper left contact of cam 2328, left front contact of relay 2314 to ground on the back contact of relay 2302 advancing sequence switch 2300 to position 3.

When sequence switch 2300 reaches position 3 ground is connected to conductor 2379, over the lower contacts of cam 2342, left back contact of relay 2314, left back contact of relay 2302. This ground completes a circuit which may be traced from conductor 2379, over conductor 1936, connector brush 1923 and its corresponding contact, upper contact of cam 1024, right back contact of relay 1519, conductor 1520, lower contact of cam 607, conductor 608, left back contact of relay 1306, to the right armature of relay 1223. This circuit is a test for the correct operation up to this time and the circuit extends to one of four relays depending on the point at which progress was unstandard. If the K segment 1305 did not close, relay 1400 will not have operated and this circuit will extend over the front contact of relay 1223, back contact of relay 1400 to the winding of relay 1414. If battery is not connected to the sleeve conductor operating relay 1111 and releasing relays 1110 and 1106, the circuit will extend over the front contact of relay 1223, right front contact of relay 1400, conductor 1415, left front contact of relay 1106, winding of relay 1113 to battery. If progress is normal and relay 1106 is released at this time, the circuit will extend over the inner left back contact of that relay, conductor 1115, through the winding of relay 1416 to battery. If the district selector fails to advance at all, the relays 1407 and 1408 operate under the control of interrupter 1409 as above described, in turn bringing relay 1405 under the control of interrupter 1409 so that relay 1405 operates if the district selector sequence switch is not advanced within a reasonable length of time.

If relay 2101 of the start circuit is properly released due to the closure of the K commutator segment it closes a circuit from battery over its left back contact, conductor 1644, group selector brush 1635 and its corresponding contact, left front contact of relay 1211, right winding of relay 1404 to ground. Relay 1404 operates and locks over its left contact to grounded conductor 1225. The operation of this relay opens the circuit of relay 1405 preventing its operation in the case of a properly completed call. Relay 1221 which operated when the line was found, opens the circuit of relay 1305 at one point and the release of relay 1304 opens it at another point, so that relay 1305 releases after the line has been found and the K commutator segment has shunted the trip circuit properly.

Assuming that the operation has been correct, relay 1416 is operated and locks to grounded conductor 1225. The operation of this relay closes a local circuit from battery through the left winding of relay 1306, middle right contact of relay 1416 to ground. It also extends certain of the conductors of the district through to the apparatus which will control the selecting operations. These circuits are as follows: conductor 2382 is extended over conductor 1940, connector brush 1925 and its corresponding contact, upper contacts of cam 1032 to the middle right armature of relay 1416. Conductor 2375 extends over conductor 1937, connector brush 1924, upper contacts of cam 1013, to conductor 1033. Conductor 2315 is extended over conductor 1938, connector brush 1926 and its corresponding contact, upper contact of cam 1025, to conductor 241 and the outer right armature of relay 1416. Conductor 2366 is used only when the district is in position 1 and will not be traced since it is not of interest at the present time. Conductor 2379 is extended over conductor 1936, connector brush 1923 and its corresponding contact, upper contact of cam 1024, back contact of relay 1519 to conductor 1520 and the inner left armature of relay 1416. Conductor 2378 is extended over conductor 1939, connector brush 1922 and its corresponding contact, lower contacts of cam 1017 to conductor 1031 and the inner right armature of relay 1416. For simplicity, as long as sequence switch 1000 remains in position 8, which it does throughout the tests, these circuits will be traced as though connected directly to the armatures of relay 1416.

With relay 1416 operated and district selector sequence switch 2300 in position 3 a circuit is closed from battery through the winding of relay 402, right back contact of relay 403, conductor 404, middle left contact of relay 1416, to conductor 2382, lower left contact of cam 2329, winding of relay 2330, right back contact of relay 2317, line finder brush 2331, terminal 2332, conductor 2036, outer left contact of relay 1109, winding of relay 1106, conductor 1117, terminal 2333, line finder brush 2334, left back contact of relay 2317, lower contact of cam 2335, conductor 2375 to conductor 1033, inner right back contact of relay 1107, conductor 1118, right back contact of relay 521, outer right back contact of relay 400, conductor 405, left front contact of relay 1223, conductor 1406, lower left contact of cam 1034 to ground. This circuit tests the proper location of the brushes on the terminals of the test line. Relay 402 operates in this circuit and closes a circuit from battery through the winding of sequence switch magnet 900, upper right contact of cam 902, left front contact of relay 402, right back contact of relay 522 to ground on conductor 1225.

*Non-operate test of selector relay.*

With sequence switch 900 in position 2 a non-operate test of relay 2317 is made. A circuit is closed from battery through the right winding of relay 2317, lower left contact of cam 2316, conductor 2315 to the outer right front contact of relay 1416, conductor 1417, resistances 406 and 407, lower right contact of cam 903 to ground. Resistances 406 and 407 are of such value as to make the current flowing through relay 2317 just insufficient to operate that relay.

At the same time a circuit is closed from battery, over the upper contact of cam 904, conductor 905, through the winding of counting relay 512, back contact of relay 513, conductor 523, lower contact of interrupter 408, upper contacts of cam 906, back contact of relay 519 to ground at the outer right contact of relay 1306. Each time that interrupter 408 closes its lower contact one of the counting relays is operated and when it breaks its lower contact the prime counting relay is operated in the locking circuit thereof. The locking circuit of all the counting relays with the exception of relays 512 and 513 is completed directly to ground while that of relay 512 and 513 extends over the normal contact of relay 716, and the upper left contact of cam 606 to grounded conductor 1222.

If relay 2317 is properly adjusted and therefore does not operate at this time, as soon as the counting relays have completed their operation so that relay 519 operates, a circuit is closed from battery through the winding of sequence switch magnet 900, lower right contact of cam 902, right front contact of relay 402, over the front contact of relay 519 to ground at the outer right contact of relay 1306, advancing sequence switch 900 to position 3.

If relay 2317 should operate falsely on this current, it will open the circuit of relay 402 and the operation of relay 519 will close a circuit from battery through the winding of relay 714, contact of interrupter 715, right back contact of relay 716, conductor 717, through lamp 907, upper contacts of cam 908, right back contact of relay 402 to ground over the front contact of relay 519. Relay 714 operates in this circuit and closes a circuit for operating relay 716 as soon as interrupter 718 closes its contact. The operation of relay 716 connects battery over its inner right front contact, to lamp 907, causing that lamp to light. It also closes a circuit from battery through trouble meter 1308, middle right front contact of relay 1302, conductor 1310, inner left front contact of relay 716, conductor 719 to ground at the upper left contact of cam 909. The operation of meter 1308 lights lamp 1311 and actuates alarm 1312.

If relay 2317 is not operated and switch 900 is advanced to position 3 a circuit is then closed from battery through the winding of relay 409, left contact of cam 910, inner left contact of relay 1416 to conductor 2379, lower contacts of cam 2342, left back contact of relay 2314, back contact of relay 2302 to ground. Relay 409 in operating closes a circuit from battery through the winding of sequence switch magnet 900, lower right contact of cam 911, outer left contact of relay 409 to ground, advancing sequence switch 900 to position 4. If the district fails to connect ground as above traced to conductor 2315, sequence switch 900 will not be advanced out of position 3 and the timing circuit will sound an alarm.

With sequence switch 900 in position 4 a non-operate test is made of relay 2314 the circuit of which may be traced from battery through the right winding of that relay, lower right contact of cam 2313, lower right contact of cam 2312, conductor 2378, to the inner right contact of relay 1416, conductor 1418, back contact of relay 520, left back contact of relay 403, lower contacts of cam 912, resistance 913, lower left contact of cam 903 to ground.

At the same time the previously described counting relay circuit extending through relay 512 is closed and the counting relays operated to measure an interval of time during which relay 2314 should not operate. Should relay 2314 operate in this circuit, it opens the connection of ground to conductor 2379 and causes the release of relay 409. With relay 409 released and sequence switch 900 in position 4 a circuit is closed from battery through the winding of relay 403, left contact of cam 913, left back contact of relay 409 to ground. Relay 403 operates and locks over its inner left front contact, conductor 719, upper left contact of cam 909 to ground. The operation of relay 403 opens the circuit of relay 402 which releases and permits the closure of a circuit from battery through the winding of relay 714, contact of interrupter 715, right back contact of relay 716, conductor 717, lamp 915, left contacts of cam 908, right back contact of relay 402 to ground over the front contact of relay 519 when that relay operates in the counting relay circuit above mentioned. The operation of relay 716 operates the trouble meter 1308, and the lighting of lamp 915 together with the alarm sounded by the meter informs the attendant that the trunk relay 2314 is improperly adjusted.

*Selection of district selector test line.*

With relay 2314 properly adjusted relay 402 remains operated until relay 519 is operated in the counting relay circuit and a circuit is closed from battery through the winding of sequence switch magnet 900, lower right contact of cam 902, right front contact of relay 402 to ground over the front contact of relay 519. With sequence switch 900 in position 5 the circuit of relay 2314 extends as previously traced to the left back contact of relay 403 and thence through the left winding of relay 524, winding of stepping relay 525, resistances 526 and 527, conductor 528, outer right back contact of relay 714, conductor 720, upper right contact of cam 916 to ground. The resistances 526 and 527 are arranged to provide the minimum operating current for relay 2314 and that relay operates as well as relay 525. The direction of current is such as not to operate relay 524.

Relay 2314 in operating locks over its outer right front contact, lower left contact of cam 2313, to the circuit above traced. The operation of relay 2314 closes a circuit from battery through the winding of sequence switch magnet 2300, upper left contact of cam 2328, left front contact of relay 2314, to ground at the left back contact of relay 2302 advancing sequence switch to position 4. With the sequence switch 2300 in position 4 a circuit is closed for updrive magnet 2340 over the upper contact of cam 2341, left front contact of relay 2314 to ground at the left back contact of relay 2302, relay 2314 being held energized in its locking circuit in position 4. The district selector is moved upward under the control of the updrive magnet in a brush selecting operation. Each time that brush 2338 encounters a conducting segment of commutator strip 2337, a circuit is closed from ground over the upper left contact of cam 2339, brush 2338, commutator strip 2337, to the upper right contact of cam 2312 which holds relay 2314 operated and shunts the stepping relay 525 of the test circuit.

When relay 525 operates it closes a circuit from battery over the lower right contact of cam 904, winding of relay 510, back contact of relay 511, conductor 532, upper contact of cam 918, contact of relay 525, lower right contact of cam 919 to ground. When brush 2338 closes the holding circuit for relay 2314 and shunts relay 525 for the first time, relay 511 is operated in the locking circuit of relay 510 and transfers the energizing circuit to the winding of relay 512. The relays 512, 513, 514, 515, 516, 517, 518, 519 and 520 are successively operated in the usual manner. When relay 520 operates it opens the circuit of relays 525 and 2314 causing these relays to release. The operation of relay 519 closes a circuit from ground over its front contact, right front contact of relay 402, lower right contact of cam 902 to the winding of sequence switch magnet 900 and battery advancing sequence switch 900 to position 6. The release of relay 2314 opens the circuit of updrive magnet 2340 bringing the district selector to rest in position to select the fifth set of brushes. It also closes a circuit from battery through the winding of sequence switch magnet 2300, left contacts of cam 2342, left back contact of relay 2314, left back contact of relay 2302 to ground advancing sequence switch 2300 to position 5.

The operation of relay 2314 in the fundamental circuit as traced through relay 525 is checked by means of a circuit extending from battery over the left contact of cam 904, through the winding of relay 500, back contact of relay 501, conductor 530, interrupter 410, outer left front contact of relay 409, left contact of cam 917, to ground. At the first closure of interrupter 410 relay 500 operates and locks. At the first opening of interrupter 410 relay 501 operates in the locking circuit of relay 500 and extends the circuit over conductor 530 to the winding of relay 502. The second closure of the interrupter causes the operation of relay 502 and the second opening of the interrupter permits relay 503 to operate in the locking circuit of relay 502. If at this time relay 409 is still operated, a circuit will be closed from battery through the winding of relay 714 to conductor 717 as previously traced, through lamp 915, inner left front contact of relay 409, conductor 531, front contact of relay 503, back contact of relay 505 to ground at the inner right front contact of relay 409. Lamp 915 is lighted in this circuit and the test blocked as in the other cases. Since the circuit of relay 409 depends upon the back contact of relay 2314 the operation of relay 2314 in the fundamental circuit including stepping relay 525 causes the release of relay 409 and the opening of the timing circuit just described.

Sequence switch 900 is advanced from position 6 to position 7 in a circuit over the lower right contact of cam 920 to ground at the right back contact of relay 426. With sequence switch 2300 in position 5 and sequence switch 900 in position 7 the fundamental circuit previously described is reestablished and relays 2314 and 525 reoperated. With switch 2300 in positions 5 to 7 a circuit is closed from battery through the trip magnet 2343, lower left contact of cam 2347, lower left contact of cam 2308, back contact of relay 2320, commutator strip 2321, brush 2322 to ground. Relay 2314 operates and locks as previously described and advances sequence switch 2300 to position 7 in which position relay 2314 is held operated. Updrive magnet 2340 is again energized and a shunt circuit for relay 525 is prepared extending in the present case over the upper left contact of cam 2313, commutator strip 2345, brush 2344, to ground at the upper left contact of cam 2339. As before, each time brush 2344 encounters a conducting segment of strip 2345, relay 525 is shunted and released. The operation of relay 525 at this time closes a circuit from battery, upper contact of cam 904, through the winding of counting relay 500, back contact of relay 501, conductor 530, lower right and upper left contacts of cam 921, front contact of relay 525, lower left contact of cam 919 to ground. Group selection takes place in the same manner as did brush selection and with counting relays 519 and 520 operated the fundamental circuit is opened, and a circuit closed from ground, front contact of relay 519, front contact of relay 402, lower right contact of cam 902, to the winding of sequence switch magnet 900, advancing that sequence switch to position 9. The release of relay 2314 following the opening of the fundamental circuit opens the circuit of the updrive magnet bringing the brush set to rest on the lowest terminal of the tenth group. It also advances the sequence switch 2300 to position 7.

In position 7, relay 2314 is operated in a circuit through its left winding, upper left contact of cam 2347, to ground over commutator strip 2321. It prepares a locking circuit for itself through its inner right front contact, lower contacts of cam 2348 to sleeve brush 2349. Terminal 2391 on which this brush is assumed to be now resting is connected to ground over conductor 924, left contact of cam 923 to ground at the right front contact of relay 806. Relay 806 was operated by the operation of relay 519 following group selection in a circuit which may be traced through the winding of relay 806, lower contact of cam 922 to ground over the front contact of relay 519. Relay 806 locks over the lower right contact of cam 923 to ground at its outer right front contact and is therefore held operated when switch 900 reaches position 9.

The operation of relay 2314 advances sequence switch 2300 to position 8 and since ground is connected to terminal 2391, relay 2314 remains locked in position 8 energizing updrive magnet 2340 to hunt for an idle trunk. Sleeve terminal 2392 of the second trunk is also connected to ground over conductor 807, inner right front contact of relay 806 to grounded conductor 1225. Relay 2314 therefore passes the second trunk. No ground is connected to terminal 2393, and hence the locking circuit of relay 2314 is opened when that trunk is reached and relay 2314 releases in turn releasing the updrive magnet and advancing sequence switch 2300 to position 9. Ground is connected to the sleeve brush 2349 as soon as relay 2314 releases over the right contacts of cam 2350, right back contact of relay 2314 to ground at the right contact of cam 2339. This ground is replaced by direct ground over the lower left and upper right contacts of cam 2350 as soon as sequence switch 2300 reaches position 8¾.

When the district selector sequence switch reaches position 9 relay 2351 is connected to conductor 2315 over the upper left contact of cam 2316. The circuit of this relay may be further traced to the outer right front contact of relay 1416, conductor 1417, resistance 411, right winding of relay 412, resistance 413, conductor 424, lower left contact of cam 903 to ground. A second circuit extends from resistance 413, through resistances 414 and 415, left winding of relay 411, upper left contact of cam 903 to ground. The current in these parallel circuits is the minimum current for operating relay 2351. When this relay operates, it closes a circuit from battery through the left winding of relay 2314, upper right and lower left contact of cam 2352, left contact of relay 2351 to ground through commutator segment 2353 and brush 2354. The operation of relay 2314 advances sequence switch 2300 to position 10, in which position selections beyond the district selector take place. With sequence switch 2300 in position 10 a circuit is closed similar to that employed in testing outgoing trunks for the purpose of testing the continuity of the fundamental circuit through the selector and the contact between the brushes and their terminals. When sequence switch 900 reached position 9 a circuit was closed from battery through the winding of sequence switch magnet 600, lower right contact of cam 612, conductor 613, lower left contact of cam 916 to ground, advancing sequence switch 600 to position 2. At the same time the circuit of relay 412 was established, the previously traced circuit through counting relay 512 was closed over the upper contacts of cam 906, and the counting relays are operated as previously described. When relay 519 operates it connects ground over its front contact, upper contact of cam 922, back contact of relay 418, back contact of relay 419, lamp 420, conductor 717 and relay 714 provided relay 2351 is not operated.

If relay 2351 has operated and switch 2300 advanced to position 10 the trunk test circuit is established from battery through the winding of relay 808, conductor 809, lower right contact of cam 614, conductor 615 of the test line, terminal 2396, district selector brush 2357, left contacts of cam 2358, right back contact of relay 2359, conductor 2378 to the inner right contact of cam 1416, conductor 1418, back contact of relay 520, left back contact of relay 403, left winding of relay 524, winding of relay 416, upper contact of cam 912, upper right contact of cam 921, inner left front contact of relay 416, to conductor 2379, lower contacts of cam 2356, brush 2355, terminal 2397, conductor 616 of the test line, lower right contact of cam 617, to ground. Relays 416 and 808 operate in this circuit if the brush contacts, etc., are normal. Relay 416 closes a circuit from battery through the winding of relay 418, front contact of relay 416, contact of interrupter 417, left back contact of relay 419 to ground. Relay 418 operates and locks over its left contact, to ground at the lower left contact of cam 916 or the lower right contact of cam 917.

The joint operation of relays 418 and 808 closes a circuit from ground at the inner left contact of relay 418, over the front contact of relay 808, right back contact of relay 422, conductor 619, upper left contact of cam 902 to the winding of sequence switch magnet 900. Switch 900 advances to position 10 in this circuit. It is then advanced through positions 10, 11, 12, 13, 14 and 15 to position 16 by direct cam cuttings. Since the test line is more conveniently located at the office frame in some cases, these positions which are here passed by are employed in controlling office selections for offices where the test line is there located.

If there has been a wrong selection and the district selector has not engaged the test line, battery and ground will appear upon the outgoing trunk selector and relay 416 will be operated but relay 808 will not be operated in that case. The operation of relay 418 will close a circuit from ground over its inner left front contact, back contact of relay 808, lower right and upper left contacts of cam 901, through lamp 925, to conductor 717 and relay 714 to block the test as previously described.

With sequence switch 900 in position 16 a release test is made of relay 2351. The circuit for making this test is the same as that previously traced as far as resistance 411 and then extends through the right winding of relay 412, resistances 413, 414 and 415, left winding of relay 412, upper left contact of cam 903 to ground. This brings resistances 411, 413, 414 and 415 in series with the windings of relay 412 instead of in parallel as in the case of the operate test of that relay. Relay 2351 releases in this circuit in turn releasing relay 2314 and advancing sequence switch 2300 to position 12.

When sequence switch 900 reached position 14¾ in advancing from position 9 to position 16, it closed a circuit from battery, through the right winding of relay 419, front contact of relay 412, lower right contact of cam 926, upper left contact of cam 906, to ground over the back contact of relay 519. Relay 419 operates and locks through its left winding and inner left front contact, to ground at the upper left contact of cam 909. With relay 412 released due to the advance of the district selector, a circuit is closed from battery through the winding of sequence switch magnet 900, upper left contact of cam 911, conductor 421, outer right front contact of relay 419, back contact of relay 412, lower right contact of cam 926, upper left contact of cam 906 to ground over the back contact of relay 519.

As soon as sequence switch 900 leaves position 16 this circuit is opened at both cams 926 and 906 so that the sequence switch comes to rest in position 17. Should relay 412 fail to release due to the failure of the district selector to advance, the counting relay circuit through relay 512 which is reestablished in position 16 closes a circuit from battery through relay 714, as previously traced to conductor 717, lamp 420, inner right front contact of relay 419, outer right front contact of relay 418, upper contact of cam 922, to ground over the front contact of relay 519.

*Talking selection—test call No. 1 to operator.*

With sequence switch 2300 in position 12 and switch 900 in position 17, the fundamental circuit for talking selection is established, which may be traced from battery through the right winding of relay 2314, lower right contact of cam 2313, lower right contact of cam 2312, conductor 2378, to the inner right contact of relay 1416, conductor 1418, back contact of relay 520, right back contact of relay 403, left winding of relay 524, winding of relay 525, resistances 526 and 527, conductor 528, outer right back contact of relay 714, conductor 720, upper left contact of cam 916 to ground. Relays 2314 and 525 operate. Relay 2314 locks in usual manner and advances sequence switch 2300 out of position 12. As switch 2300 passes through positions 12⅜, 13⅜ and 14⅜ ground is connected over the lower contacts of cam 2350, to the fundamental circuit, holding relay 2314 operated and shunting the stepping relay 505.

Relay 505 in operating closes a circuit from battery, over the lower right contact of cam 904, through the winding of relay 514, back contact of relay 515, conductor 534, upper contact of cam 834, right back contact of relay 427, lower right contact of cam 918, front contact of relay 525, lower right contact of cam 919 to ground. When sequence switch 2300 passes position 12⅜ relays 514 and 515 operate. When it passes position 13⅜ relays 516 and 517 operate. When it passes position 14⅜ relays 518, 519 and 520 are operated. Relay 520 in operating opens the fundamental circuit and causes the release of relay 2314 bringing switch 2300 to rest in position 15. The operation of relay 519 closes a circuit from battery through the winding of magnet 900, upper right contact of cam 920, over the front contact of relay 519, to ground, advancing sequence switch 900 to position 18 in which position relays 518, 519 and 520 are held operated.

When sequence switch 900 reaches position 18, a circuit is closed from battery through the winding of sequence switch magnet 600, upper right contact of cam 612, conductor 618, inner left back contact of relay 202, conductor 203, left contacts of cam 810, lower right contact of cam 916 to ground. Sequence switch 600 is advanced to position 3 in this circuit. The continuity of the circuit of relay 2361 is now tested by means of a circuit from battery through the winding of relay 808, conductor 809, lower right contact of cam 614, conductor 615, terminal 2396, brush 2357, upper left and lower right contacts of cam 2358, upper right winding of repeating coil 2360, upper contacts of cam 2348, winding of relay 2361, lower right winding of repeating coil 2360, upper left and lower right contacts of cam 2356, brush 2355, terminal 2397, conductor 616, lower right contact of cam 617 to ground. If the circuit is complete relay 808 operates, but the current is not in the right direction to operate polarized relay 2361. The operation of relay 808 closes a circuit from battery through the winding of sequence switch magnet 600, upper left contact of cam 612, conductor 619, right back contact of relay 422, front contact of relay 808, inner left contact of relay 418 to ground. Sequence switch 600 is advanced to position 4 in this circuit.

*Operate test of relay 2330.*

With sequence switch 600 in positions 4 and 5, a circuit is established for relay 2330 supplying the minimum current thereto and testing its ability to operate. As soon as switch 600 reaches position 4 a circuit is closed from battery over the lower right contact of cam 811, conductor 812, upper contact of cam 624, conductor 625, lower left and upper right contacts of cam 813, conductor 814, right winding of relay 209, conductor 210, left contact of cam 607, conductor 1520, and thence as previously traced to conductor 2379, at the district selector, lower contacts of cam 2342, left back contact of relay 2314 to ground at the left back contact of relay 2302. Relay 209 operates and locks in a circuit from battery through its left winding and inner left front contact to conductor 210. The operation of relay 209 prepares a circuit for testing the continued operation of relay 2330 as will be shown hereafter. The circuit of relay 2330 may be traced as follows: battery through the lower left winding of repeating coil 2360, upper left contact of cam 2329, winding of relay 2330, right back contact of relay 2317, brush 2331, terminal 2332, conductor 2036, right back contact of relay 208, conductor 623, upper right contact of cam 622, conductor 207, resistances 206, 205 and 204, conductor 621, upper contacts of cam 620, conductor 1117, terminal 2333, brush 2334, left back contact of relay 2317, upper right contact of cam 2335, upper left winding of repeating coil 2360 to ground. This circuit is maintained for a period measured by the operation of relays 723, 722 and 721.

The operation of timing relays 723, 722 and 721 is a follows: When sequence switch 600 reaches position 4 a circuit is closed from battery over the lower right contact of cam 811, conductor 812, lower left contact of cam 624, conductor 626, winding of relay 721, outer left back contact of relay 722, right back contact of relay 723, conductor 724, outer left back contact of relay 522, conductor 533, lower contact of interrupter 725, left back contact of relay 723, inner left back contact of relay 722, to ground at the upper right contact of cam 815. When interrupter 725 closes its lower contact, relay 721 operates and locks over its inner right front contact and the winding of relay 722 to ground. When interrupter 725 opens its bottom contact relay 722 operates in this locking circuit. At the second closure of the bottom contact of interrupter 725 a circuit is closed from battery as previously traced to conductor 626, over the inner left front contact of relay 722, left back contact of relay 723, over the lower contact of interrupter 725, conductor 533, back to conductor 724, inner right front contacts of relay 722, to the winding of relay 722. This circuit holds relay 722 operated and shunts relay 721 so that relay 721 releases. The release of relay 721 closes a circuit from battery through the winding of relay 723, left back contact of relay 721, inner right contacts of relay 722 to the ground through the winding of relay 722. As soon as interrupter 725 opens its bottom contact relay 723 operates in this circuit and closes a circuit from battery through the winding of sequence switch magnet 600, upper right contact of cam 627, conductor 628, inner right front contact of relay 723, outer right front contact of relay 722, outer left front contact of relay 209, outer left back contact of relay 211, inner left back contact of relay 212, conductor 213, upper right contact of cam 629 to grounded conductor 1222. Sequence switch 600 advances in this circuit to position 5.

Sequence switch 600 in passing from position 4 to position 5 opens both the battery and ground connections to the relays 721, 722 and 723 so that these relays release. On reaching position 5 battery and ground are reconnected to these relays and the above described cycle of operations is repeated and as before the operation of relay 723 closes a circuit for sequence switch magnet 600, advancing that sequence switch to position 6.

If relay 2330 fails to operate or releases during this time interval, a circuit is closed from battery through the winding of relay 2351, back contact of relay 2330, contact of interrupter 2367, left contacts of cam 2350 to ground. Relay 2351 operates when interrupter 2357 closes its contact. It closes a circuit from battery through the right winding of relay 2317, right front contact of relay 2351, lower contact of interrupter 2367, to ground over the left contacts of cam 2350. Relay 2317 operates when the interrupter closes its lower contact. Relay 2317 locks over its inner left front contact to ground at the upper right contact of relay 2326. It also extends this ground to the winding of relay 2388 causing the coin circuit to select a district, and advancing the district selector sequence switch to position 17. When sequence switch 2300 leaves position 15 ground is disconnected from conductor 2379, and relay 209 releases. The release of relay 209 opens the above traced circuit for advancing sequence switch 600 out of position 4 or position 5 and hence blocks the test. If relay 2330 operates, the district selector sequence switch remains in position 15 and sequence switch 600 is advanced to position 6 as above described.

*Non-operate test of relay 2361.*

With sequence switch 600 in position 6, a non-operate polarity test of relay 2361 is made. With sequence switch 800 in position 1 a circuit is closed from battery through the winding of relay 214, conductor 215, right contacts of cam 816 to grounded conductor 1222 when sequence switch 1000 reaches position 8. When sequence switch 600 reaches position 6 a circuit is closed from ground through the left winding of relay 212, conductor 217, lower right contact of cam 624, conductor 812, lower right contact of cam 811 to battery. With sequence switch 600 in position 6 a circuit is also closed from battery, left winding of relay 218, lower contact of interrupter 219, conductor 220, upper contact of cam 817, conductor 818, lower right contact of cam 605 to ground. Relay 218 operates at the first closure of the lower contact of interrupter 219, and locks through its right winding, inner right front contact to conductor 220 independent of interrupter 219. It also advances sequence switch 900 to position 1 in a circuit which may be traced from battery through the winding of magnet 900, upper left contact of cam 911, conductor 421, outer left front contact of relay 218, conductor 224, upper right contact of cam 926, lower left contact of cam 906 to ground. The operation of relay 218 closes a circuit for relay 2361. This circuit may be traced from battery over the left contact of cam 811, conductor 819, outer right front contact of relay 218, resistance 221, left back contact of relay 222, conductor 245, left contact of cam 614, conductor 615, terminal 2396, brush 2357, upper right and lower left contacts of cam 2358, upper right winding of repeating coil 2360, upper contacts of cam 2348, winding of relay 2361, lower right winding of repeating coil 2360, upper left and lower right contacts of cam 2356, brush 2355, terminal 2397, conductor 616, left contact of cam 617, conductor 630, right back contact of relay 222, conductor 223, upper contact of cam 631 to grounded conductor 1222.

With sequence switch 600 in position 6, the ground on conductor 2379 which operated relay 209, is extended over conductor 632, outer left front contact of relay 214, winding of relay 211, middle left front contact of relay 212, conductor 227, to battery through the non-inductive winding of relay 1504. The operated contacts of relay 211 are used to check the non-operation of relay 2361 in the circuit traced above, since the false operation of relay 2361 would operate relay 2314 and thus release relay 211.

When interrupter 219 closes its upper contact a circuit is closed from battery through the winding of relay 208, conductor 225, lower contacts of cam 927, conductor 928, inner left contact of relay 218, upper contact of interrupter 219, conductor 220, upper contact of cam 817, conductor 818, lower right contact of cam 605 to ground. Relay 208 operates in this circuit and locks over its outer left front contact to conductor 220. When interrupter 219 next closes its lower contact a circuit is closed from battery through the winding of relay 226, inner right front contact of relay 208, lower contact of interrupter 219 to ground over conductor 220. Relay 226 locks over its inner left front contact, conductor 242, to ground over the lower left contact of cam 641. The operation of relay 226 closes a circuit from battery, left contact of cam 811, conductor 819, winding of relay 222, conductor 228, upper contact of cam 633, conductor 634, outer left front contact of relay 211, inner left front contact of relay 214 to ground at the outer right front contact of relay 226.

*Operate test of relay 2361.*

The operation of relay 222 opens the previously traced circuit of relay 2361 and closes a circuit, the resistance of which is such as to permit the operation of relay 2361 as is also the direction of current therein. This circuit may be traced from battery over the inner right front contact of relay 212, through low resistance 229, inner right front contact of relay 222, conductor 630, and thence as previously traced through the winding of relay 2361, back to conductor 245, inner left front contact of relay 222, conductor 230, resistance 414, conductor 424 to ground at the lower left contact of cam 903.

It will be noted that in this circuit the connection of battery and ground is the reverse of that in the circuit first traced for relay 2361, and simulates the response of an operator to a call to her position. Relay 2361 should operate in this circuit and in so doing closes a circuit from battery through the left winding of relay 2314, upper left contact of cam 2347, lower right contact of cam 2308, front contact of relay 2361, upper left contact of cam 2336 to ground. Relay 2314 operates and advances sequence switch 2300 to position 16.

When sequence switch 2300 leaves position 15 the energizing circuit of relay 2314 is opened but as soon as sequence switch 2300 reaches position 15¼ a locking circuit for relay 2314 is closed over its outer right front contact, right contacts of cam 2350 to sleeve brush 2349. There is sufficient overlap between the closure of cams 2347 and 2350 to permit the closure of this circuit before the actual breaking of the energizing circuit. This locking circuit further extends over terminal 2393, conductor 635, lower right and upper left contacts of cam 636, conductor 637, winding of relay 231, inner right back contact of relay 232, conductor 234, upper right contact of cam 638 to ground. Relay 231 operates in this circuit supplying ground to the inner left armature of relay 211. The operation of relay 2314 removes ground from conductor 2379 and causes the release of relay 211.

*Preliminary disconnect.*

When relay 208 operated, it altered the circuit previously traced for relay 2330 to increase the resistance thereof to the point where relay 2330 should release. This altered circuit extends as previously traced over conductor 2036, right back contact of relay 240, inner left back contact of relay 233, resistance 238, winding of relay 237, right back contact of relay 236, resistances 235. 206, 205, 204. conductor 621, upper contacts of cam 620, to conductor 1117 and back to ground as previously traced. The earlier traced circuit over the back contact of relay 208 is in shunt around resistances 238 and 235 and relay 237.

As soon as relay 226 operates it closes another shunt around these resistances which may be traced from conductor 2036, over the left contacts of cam 611, middle right front contact of relay 226, conductor 623, upper contact of cam 622. conductor 207, resistances 206, 205, 204, conductor 621. upper contacts of cam 620 to conductor 1117. The period during which resistances 235 and 238 and the winding of relay 237 are included in the circuit of relay 2330, simulates the accidental depression of the switchhook during conversation. A branch from the second operating circuit of relay 2330 extends over the upper right contact of cam 611, through condenser 669 and resistance 670 to a point between resistances 205 and 206 and aids in the quick reoperation of relay 2330. The district selector should not wipe out the call during so short a release of relay 2330. The release of relay 2330 would permit the operation of relay 2351 under the control of interrupter 2367 as previously described. The operation of relay 2351 in turn causes the operation of relay 2317 under the control of interrupter 2367. The district selector is thereupon released under the control of relay 2317 and the coin circuit. The above operation of interrupter 2367 should not occur within the time between the operation of relays 208 and 226 and hence switch 2300 should be advanced to position 16 before the closure of the circuit for relay 2317.

The operation of relay 226 as previously described closes a circuit from battery, winding of relay 200, inner right contact of relay 226, conductor 241, as previously traced to conductor 2315, lower right contact of cam 2316 to ground. Relay 200 operates and locks over its middle right contact to conductor 241. The release of relay 211, due to the removal of ground from conductor 2379 by the advance of sequence switch 2300, closes a circuit from battery through the winding of sequence switch magnet 600, upper right contact of cam 642, conductor 643, inner left front contact of relay 208, outer right front contact of relay 222, inner right front contact of relay 214, inner left back contact of relay 211, front contact of relay 231 to ground advancing sequence switch 600 to position 7. The advance of sequence switch 600 prevents the reclosure of the circuit of relay 211.

If the district selector sequence switch 2300 should be advanced, due to the release of relay 2330, and relay 2317 operated during the time that the circuit of relay 2330 extends through relay 237, the operation of relay 2317 will open the circuit of relay 237 and that relay will release closing a circuit from battery through the winding of relay 202, outer left back contact of relay 226, conductor 243, right back contact of relay 1407, conductor 1419, back contact of relay 237, conductor 244, upper left contact of cam 641 to ground. The subsequent operation of relay 226 closes a locking circuit for relay 202 over the left alternate contact of relay 226, outer right front contact of relay 202, conductor 242, to ground over the lower left contact of cam 641. Sequence switch 600 is advanced to position 7 by the release of relay 211, whereupon the operation of relay 202 closes a circuit from battery through the winding of sequence switch magnet 600, upper left contact of cam 627, conductor 644, middle right front contact of relay 202, outer left front contact of relay 212 to ground, advancing sequence switch 600 to position 9 where the test is blocked.

*Cut through.*

Assume that the selector has operated correctly and that sequence switch 600 is advanced to position 7. In this position the advance of the selector to cut through position and the continuity of the talking conductors are tested. The continuity of the talking conductors is tested by means of the operating and locking circuits of relay 247. The energizing circuit for this relay starts from battery, contact of interrupter 246, right winding of relay 247, conductor 248, lower contacts of cam 609, conductor 223, right back contact of relay 222, (relay 222 having released when sequence switch 600 moved from position 6 to position 7), conductor 630, left contact of cam 617, conductor 616, terminal 2397, brush 2355, right contact of cam 2329, winding of relay 2330, right back contact of relay 2317, brush 2331, terminal 2332, conductor 2036, right back contact of relay 208, conductor 623, left contact of cam 622, conductor 646, outer right back contact of relay 232, conductor 249, lower left contact of cam 823 to ground. If the ring conductor through the district is continuous, relay 247 will operate when interrupter 246 closes its contact. If the tip conductor of the district selector is continuous, relay 247 will lock in a circuit extending from battery through its left winding, inner left front contact, left back contact of relay 222, conductor 245, left contact of cam 614, conductor 615, terminal 2396, brush 2357, left contact of cam 2335, left back contact of relay 2317, brush 2334, terminal 2333, conductor 1117, upper left and lower right contacts of cam 620, conductor 645, to ground at the upper left contact of cam 823.

When interrupter 250 closes its contact, the locking ground of relay 247 is extended over interrupter 250, outer left contact of relay 247, winding of relay 232 to battery. Interrupters 246 and 250 operate on the same shaft so as to provide a measured interval between the closure of their contacts.

Relay 232 operates and locks over its inner right front contact, conductor 234 to ground at the upper right contact of cam 638. Relay 232 in operating disconnects ground from sleeve terminal 2303 permitting relay 2314 to release and advance sequence switch 2300 to position 17. The advance of switch 2300 out of position 16 opens the circuit of relay 247. With relay 247 released and relay 232 operated a circuit is closed from battery through the winding of sequence switch magnet 600, upper right contact of cam 647, conductor 648, back contact of relay 247, right alternate contact of relay 232, conductor 249, lower left contact of cam 823 to ground. Sequence switch 600 advances to position 8 in this circuit and on leaving position 7 opens the locking circuit of relay 232 and that relay releases. Sequence switch 600 is advanced out of position 8 by means of a circuit through its winding, lower right contact of cam 642, conductor 645, upper left contact of cam 823 to ground. The switch is now advanced to position 10 in a circuit over the lower left contact of cam 612, conductor 649, outer left contact of relay 202, conductor 643, upper left contact of cam 638 to ground. It will be noted that this circuit extends over the back contact of relay 202 so that, should this relay have operated and locked as previously mentioned, switch 600 would not advance out of position 9. Sequence switch 600 is advanced directly to position 13 by means of ground over its master cam.

*Test for false registration.*

The circuit for advancing switch 600 out of position 13 is a test for the possible false operation of charge relay 2359. When sequence switch 2300 comes to rest in the charge position, that is position 14, relay 2359 will be operated as will be described in connection with a subsequent call. It is sufficient for the present purpose to note that the operation of relay 2359 connects ground over its outer right front contact, to conductor 2378. If relay 2359 should operate falsely and ground conductor 2378, a circuit will be completed from ground on conductor 2378, conductor 1939, brush 1922, and its corresponding contact, lower contacts of cam 1017, conductor 1031, outer right front contact of relay 200, winding of relay 251 to battery. The operation of relay 251 opens the circuit for advancing sequence switch 600 out of position 13. Assuming that relay 251 has not been operated, sequence switch 600 will be advanced to position 14 in a circuit through the winding of the sequence switch magnet, lower right contact of cam 627, conductor 650, right contacts of cam 824, conductor 825, inner left back contact of relay 252, inner left back contact of relay 251, conductor 244, to ground on the upper left contact of cam 641.

Sequence switch 600 is advanced out of position 14 in a circuit from battery through its winding, lower left contact of cam 642, back contact of relay 727, conductor 728, lower right contact of cam 629 to grounded conductor 1222. Position 14 is reserved for checking the correct registration in the case of message register districts, but since this district selector does not operate message registers this position becomes practically a pass-by position.

*Release of relay 2330.*

When sequence switch 600 reaches position 15 relay 2330 is released by similar means to those employed for the preliminary disconnect test previously described. With sequence switch 600 in position 15 the previously traced circuit for relay 218 is closed when interrupter 219 closes its lower contact. Relay 218 operates and locks as before and closes the previously traced circuit for operating relay 208 as soon as interrupter 219 closes its upper contact. As before the operation of relay 208 removes the shunt around the winding of relay 237 and resistances 235 and 238. It also closes the previously traced circuit for operating relay 226 when interrupter 219 closes its lower contact and relay 226 locks as before. Relay 237 operates and closes a circuit from battery through the winding of relay 1407, left back contact of relay 1408, conductor 1420, outer left back contact of relay 236, conductor 253, upper right and lower left contacts of cam 636, conductor 654, front contact of relay 237, conductor 244 to ground at the upper left contact of cam 641. Relay 1407 operates and closes a locking circuit for itself through the winding of relay 1408, inner left front contact of relay 1407 and thence over the conductor 1413, back contact of relay 712, conductor 713, lower left contact of cam 606 to grounded conductor 1222. Relay 1408 does not operate in this circuit until relay 237 releases.

Figure 22:
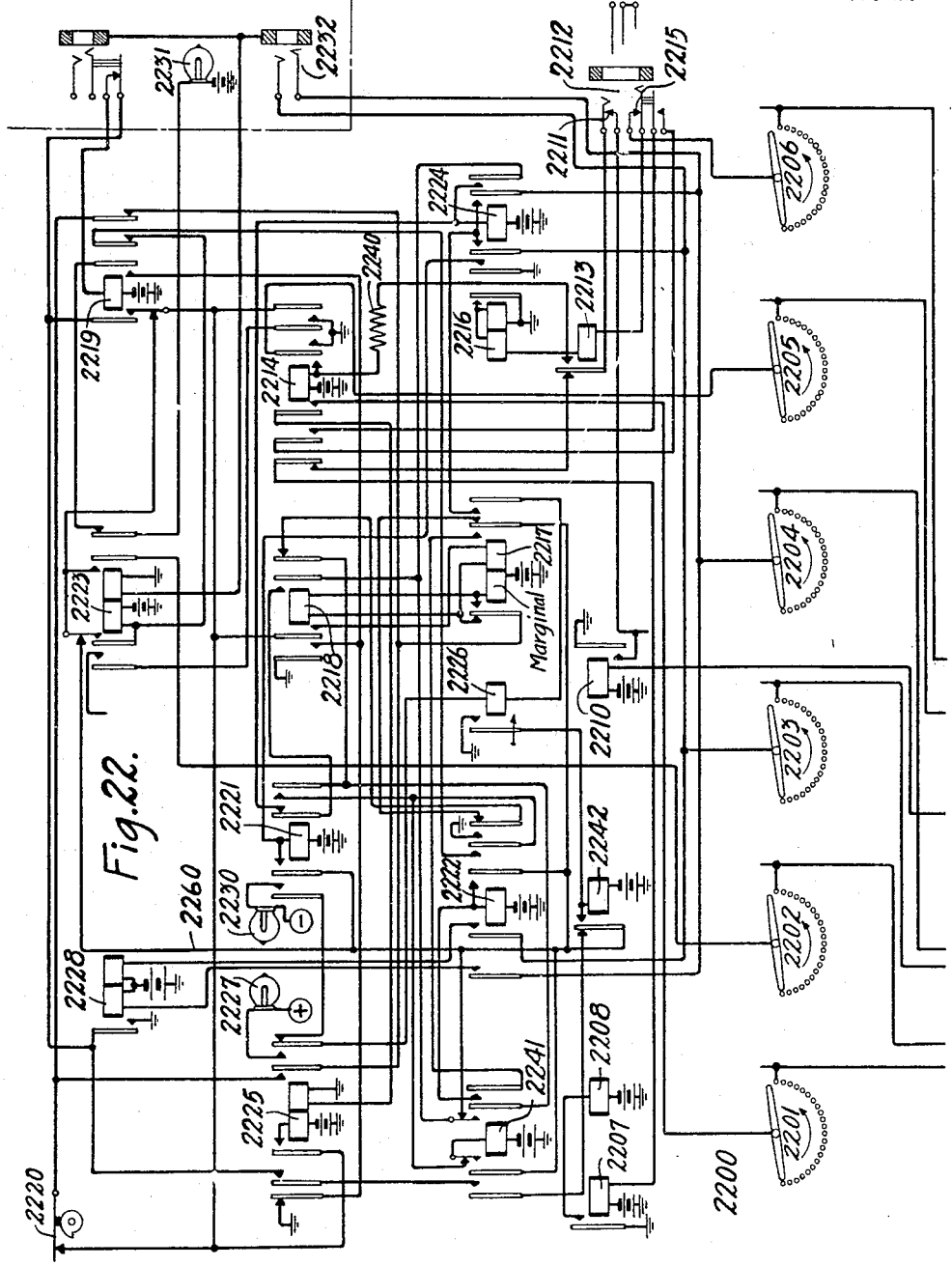

When relay 237 is included in the circuit of relay 2330, the resistance of this circuit is so increased that relay 2330 releases and closes a circuit from battery through the winding of relay 2351, back contact of relay 2330, upper contact of interrupter 2367, left contacts of cam 2350 to ground. When interrupter 2357 closes its upper contact relay 2351 operates and closes a locking circuit for itself through its winding, back contact of relay 2330, left contacts of cam 2352, left contact of relay 2351 to ground over commutator segment 2353. The operation of relay 2351 closes a circuit from battery through the right winding of relay 2317, right contact of relay 2351, lower contact of interrupter 2367, left contacts of cam 2350 to ground. Relay 2317 operates and locks in a circuit over its left winding and inner left front contact to ground at the upper right contact of cam 2336. It also extends this locking ground over the left normal contact of cam 2387 to the winding of relay 2388. In addition it extends the tip and ring conductors over its outer left front contact and inner right front contact respectively to the coin control circuit shown in Fig. 22.

The transfer of the tip and ring conductors from the repeating coil to the coin control circuit opens the circuit of relay 237 and that relay releases. The release of relay 237 opens the energizing circuit of relay 1407 and permits relay 1408 to operate in the locking circuit of relay 1407. With relay 1407 operated and relay 237 deenergized a circuit is closed from battery through the winding of relay 236, conductor 254, outer right front contact of relay 1407, conductor 1419, back contact of relay 237, conductor 244, to ground at the upper left contact of cam 641. Relay 236 operates and locks over its inner right front contact to conductor 244. The operation of relay 236 disconnects relay 237 from the tip conductor and connects the winding of relay 237 to ground as will be traced later. Relay 236 in operating also closes a circuit from battery through the winding of relay 806, middle right front contact of relay 236, upper left contact of cam 606 to grounded conductor 1222. Relay 806 operates and closes a circuit from battery through the winding of sequence switch magnet 600, upper right contact of cam 612, conductor 618, inner left back contact of relay 202, conductor 203, left contacts of cam 810, upper contact of cam 923, outer right front contact of relay 806 to ground. Sequence switch 600 is advanced to position 16 in this circuit.

*Operation of coin circuit.*

The operation of relay 2388 as above described closes a circuit from ground over the inner right back contact of relay 2389, outer right front contact of relay 2388, winding of relay 2210 to battery. The operation of relay 2210 closes a circuit from ground over its right front contact, contact 2211 of jack 2212, back contact of relay 2213, outer left back contact of relay 2214, through the winding of relay 2207 to battery. Relay 2207 operates and closes an obvious circuit for magnet 2208 which starts switch 2200 and other idle coin circuits hunting for the district. The operation of relay 2388 also connects battery through resistance 2390 over its left front contact, outer right contact of relay 2389 to the terminal of brush 2206 and of the brushes of other coin circuits, corresponding to the district selector of Fig. 23. When switch 2200 brings brush 2206 into contact with this terminal, the circuit is further extended over contact 2215 of jack 2212, winding of relay 2213, windings of relay 2216 to ground. Relay 2216 closes a shunt around its high resistance winding permitting relay 2213 to operate and open the circuit of relay 2207 which in turn opens the circuit of magnet 2208 and brings the switch to rest with its brushes engaging the conductors leading to the district selector of Fig. 23.

The operation of relay 2213 also closes a circuit from battery through the winding of relay 2214, resistance 2240, front contact of relay 2213, contact 2211 of jack 2212 to ground at the front contact of relay 2210. Relay 2214 operates and locks over its inner right front contact, brush 2205 and its corresponding contact, winding of relay 2389 to ground at the inner right contact of relay 2388. Relay 2389 operates and opens the circuit of start relay 2210. Since relay 2210 is common to the group of coin control circuits, the release of this relay brings any other hunting coin switches to rest. The operation of relay 2389 also opens the circuit of relays 2213 and 2216 causing them to release. It also connects ground over its left front contact to the upper left contact of cam 2301, but since sequence switch 2300 is already in position 17 this circuit is ineffective.

The operation of relay 2214 closes a circuit from battery through the left winding of relay 2217, winding of relay 2218, left back contact of relay 2217, outer right back contact of relay 2219, interrupter 2220, outer right front contact of relay 2214 to ground. Relay 2217 is marginal and hence does not operate in this circuit but relay 2218 does. The operation of relay 2218 closes a circuit from battery through the left winding of relay 2217, winding of relay 2218, right winding of relay 2217, inner left front contact of relay 2218, outer right front contact of relay 2214 to ground. This circuit is ineffective as long as interrupter 2220 remains closed since the right winding of relay 2217 is shunted by the circuit through the interrupter. When interrupter 2220 opens its contact this circuit is effective and the current therein is sufficient to cause the operation of relay 2217. Relay 2217 in operating closes a circuit from battery through its left winding and inner left front contact, outer right back contact of relay 2219, contact of interrupter 2220 to ground at the outer right front contact of relay 2214. When interrupter 2220 next closes its contact this circuit is effective to hold relay 2217 operated but shunts relay 2218 so that that relay releases. When the interrupter 2220 next opens its contact relay 2217 also releases and the relay pair is ready for another cycle of operation under the control of interrupter 2220.

The operation of relay 2218 closes a circuit from battery, through the winding of relay 2224, right back contact of relay 2221, inner right front contact of relay 2218, right normal contact of relay 2241, conductor 2260, left normal contact of relay 2223, left normal contact of relay 2219 to ground at the outer right front contact of relay 2214. Relay 2224 locks over its outer right front contact, right normal contact of relay 2241 to ground over conductor 2260. The operation of relay 2224 also closes a circuit from battery through the winding of relay 2221 to ground at the outer right front contact of relay 2224. Relay 2221 locks over its inner left front contact, to ground over conductor 2260.

The operation of relay 2224 also connects the tip and ring conductors from the district together and over the outer right front contact of relay 2217, through the winding of relay 2226, right back contact of relay 2225, outer left front contact of relay 2221, through lamp 2230 to negative coin refund battery. This circuit is maintained during the time that elapses between the opening of the contacts of interrupter 2220 since relay 2217 operates on one opening of interrupter 2220 and releases on the next opening of that interrupter.

*Test of coin control current.*

The correctness of the polarity of this coin circuit is checked by means of polarized relay 237. With sequence switch 600 in position 16 the ring conductor 2036 is extended over the right contact of relay 240, left alternate contact of relay 236, conductor 822, resistance 821, upper contacts of cam 820, conductor 289, resistance 238, winding of relay 237, conductor 255, upper contacts of cam 826, left front contact of relay 806, conductor 234, upper right contact of cam 638, to ground. If the current in this circuit is of the right direction relay 237 will operate and in operating will extend the tip conductor 1117 over the upper contacts of cam 620, conductor 621, upper contact of cam 314, conductor 315, winding of relay 712, outer left front contact of relay 236, conductor 253, upper right and lower left contacts of cam 636, conductor 654, front contact of relay 237, conductor 244, upper left contact of cam 641 to ground. Relay 712 operates in this circuit and opens the locking circuit of relays 1407 and 1408 which release. Relay 712 locks in a circuit from coin battery as previously traced through the winding of relay 712, front contact of relay 712, conductor 713, lower left contact of cam 606 to grounded conductor 1222. When coin battery is disconnected at the coin circuit relay 712 releases and closes a circuit for advancing sequence switch 600 from position 16 to position 17 which may be traced from battery through the winding of magnet 600, lower left contact of cam 642, left back contact of relay 727, conductor 728, lower contact of cam 316, conductor 317, left back contact of relay 1407, conductor 1413, back contact of relay 712, conductor 713, lower left contact of cam 606 to grounded conductor 1222. When sequence switch 600 reaches position 17 the tip and ring conductors are opened.

With both ring and tip conductors connected to ground, relay 2226 operates and closes an obvious circuit for relay 2242. Relay 2242 operates and locks over conductor 2260 to ground. With both relays 2218 and 2217 released, as previously described, a circuit is closed from battery through the winding and left normal contact of relay 2241, right front contact of relay 2221, right back contact of relay 2218, outer left back contact of relay 2222, right back contact of relay 2217, conductor 2260 to ground. Relay 2241 operates and locks over its inner left alternate contact to grounded conductor 2260. The operation of relay 2241 transfers the locking circuit of relay 2224 to the right back contact of relay 2218 and thence to the outer left back contact of relay 2222, right back contact of relay 2217 and thence as previously traced to ground thus making relay 2224 dependent on relay 2218.

The next closure of the contact of interrupter 2220 operates relay 2218 as previously described and releases relay 2224. The previously described locking circuit of relays 2218 and 2217 through the windings of relay 2217 is again closed and as before relay 2217 operates only when interrupter 2220 opens its contact. The release of relay 2224 removes coin refund battery from the tip and ring conductors and permits the release of relay 237. When relay 2217 does operate due to the opening of the contact of interrupter 2220, a circuit is closed from battery through the winding of relay 2222, outer right front contact of relay 2241, inner right front contact of relay 2217, to ground over conductor 2260 as previously traced. Relay 2222 locks to ground over conductor 2260. The operation of relay 2222 connects battery through the windings of relay 2228, left front contacts of relay 2222, to the tip and ring conductors. The operation of relay 237, due to the application of coin refund current thereto, opens the locking circuit of relay 236 and that relay releases. The release of relay 236 disconnects ground from relay 237. Therefore the circuit of relay 2228 is not completed and that relay will not operate.

When interrupter 2220 again closes its contact holding relay 2217 and shunting relay 2218, the release of relay 2218 closes a circuit from battery through the left winding of relay 2223, middle right back contact of relay 2219, outer right front contact of relay 2222, right front contact of relay 2221, right back contact of relay 2218, outer left front contact of relay 2222 to ground. Relay 2223 operating closes a locking circuit for itself over its left alternate contact, left normal contact of relay 2219 to ground at the outer right front contact of relay 2214. The opening of the normal contact of relay 2223 opens the locking circuits of relays 2221, 2241, 2222 and 2242. These relays all release.

The subsequent opening of the contact of interrupter 2220 causes the release of relay 2217. Relay 2223 in operating also connects ground from the outer right front contact of relay 2214 over the normal contact of relay 2219, right front contact of relay 2223, brush 2202 and its corresponding contact, right winding of relay 2387 to battery. Relay 2387 operates and locks over its inner left front contact and over the locking ground of relay 2317. Relay 2387 in operating opens the circuit of relay 2388 which relay releases opening the locking circuit of relay 2314. The release of relay 2314 completes the release of the coin circuit.

Restoration of selector.

The operation of relay 2387 also closes a circuit from battery through the winding of relay 2302, lower right and upper left contacts of cam 2368, to ground at the inner right contact of relay 2387. Relay 2302 operates and locks over its inner right front contact, upper left contact of relay 2308 to ground over commutator strip 2353. The operation of relay 2302 next closes a circuit from battery through the line finder downdrive magnet 2372, lower left contact of cam 2364, to ground at the outer left front contact of relay 2302. The line finder is restored in this circuit. The operation of relay 2302 also closes a circuit from battery through the winding of sequence switch magnet 2300, upper left contact of relay 2311, outer left front contact of relay 2302 to ground, advancing sequence switch 2300 to position 18.

In position 18 a circuit is closed for district selector downdrive magnet 2369, over the upper right and lower left contacts of cam 2313, lower contacts of relay 2350 to ground, in which circuit the district selector is restored to normal. When the district selector reaches normal a circuit is closed from battery through the winding of sequence switch magnet 2300, upper right contact of cam 2328, normal commutator segment 2370, brush 2371, upper left contact of cam 2339 to ground, advancing sequence switch 2300 to position 1. The locking circuit of relay 2302 is maintained as long as the line finder is off-normal and the circuit of downdrive magnet 2372 is maintained in position 1 of sequence switch 2300 to insure the complete restoration of the line finder. The operation of relay 2387 also disconnects battery from sleeve brush 2326 permitting the release of relay 1111.

When the district selector sequence switch reaches position 1, battery through resistance 2373 is connected over the lower contact of cam 2324 and contact 2399 of jack 2374 to conductor 2366. It will be noted that conductor 2366 is connected over conductor 1935, brush 1921 and its corresponding contact, conductor 1020, upper left and lower right contacts of cam 1019, resistance 1521 to ground at the left back contact of relay 1519 thus preventing the selection of the district by a link circuit.

When the district selector sequence switch reaches position 1 a circuit is closed from battery through the right winding of relay 2314, lower right contact of cam 2313, lower left contact of cam 2312, conductor 2375, conductor 1937, brush 1924 and its corresponding contact, upper contacts of cam 1013, conductor 1033, right back contact of relay 212, middle left front contact of relay 200, conductor 256, right contacts of cam 827, conductor 828, winding of relay 257 to ground. The operation of relay 257 closes a circuit from battery through the winding of relay 232, front contact of relay 257 to ground. The operation of relay 232 closes a circuit from battery through the winding of sequence switch magnet 600, upper right contact of cam 647, conductor 648, right back contact of relay 247, right alternate contact of relay 232, conductor 249, lower left contact of cam 823 to ground. Sequence switch 600 advances to position 18 in this circuit. Relay 2314 also operates in the above traced circuit of relay 257 and closes the usual circuit for advancing sequence switch 2300 to position 2.

Advance of test class sequence switch.

With sequence switch 600 in position 18 a circuit is closed from battery through the winding of relay 804, upper contact of cam 831, conductor 832, lower right contact of cam 631 to grounded conductor 1222. Relay 804 operates and locks over its left front contact to conductor 832. It closes a circuit from battery through the winding of relay 829, winding of sequence switch magnet 800, right contacts of cam 929, lower left contact of cam 830, inner right back contact of relay 803, to ground at the inner right front contact of relay 804. Sequence switch 800 advances to position 2 in this circuit. When it reaches position 2 a circuit is closed from battery over the upper contact of cam 811, winding of relay 803, lower right contact of cam 831, conductor 832, lower right contact of cam 631 to grounded conductor 1222. Relay 803 locks over its inner left front contact to conductor 832. As soon as sequence switch 800 reaches position 2 relay 829 and magnet 800 release. With relay 804 operated, as soon as relay 829 releases, a circuit is closed from battery through the winding of sequence switch magnet 600, lower left contact of cam 647, conductor 655, left back contact of relay 829, outer left front contact of relay 803, outer left front contact of relay 804 to ground. Sequence switch 600 advances to position 1 in this circuit.

*Test call No. 2—Completed call to free line.*

The test apparatus is now in condition to impose a second set of test conditions upon the district selector and these conditions simulate a call to an outgoing line for which no charge is made, which will cause the district selector sequence switch to be set in position 13 for talking. When sequence switch 600 leaves position 18½ the locking circuits of relays 803 and 804 open and these relays release. A circuit is thereupon closed as previously traced for relay 1300, which reoperates relay 1212 as previously described. Relay 1212 closes a circuit for relay 1304 and relay 1304 locks through the right winding of relay 2101 as previously described. Relays 1304, 1407 and 1408 are operated as before. Relay 1305 operates relay 1109 and that relay in turn operates relays 1110 and 1106. Relay 1110 in operating again closes the circuit of relay 2302 and starts the line finder hunting for the test line. The subsequent operation of the district selector in finding the line finder test line and in selecting the district selector test line is the same as described in the first test except that with sequence switch 800 in position 2 the counting relay circuit for talking selection brings the district selector to rest in position 13. As before when sequence switch 900 reaches position 9, sequence switch 600 is advanced from position 1 to position 2. Switch 600 is advanced to position 3 when switch 900 reaches position 18 and to position 4 under the control of relay 808 as previously described.

With sequence switch 600 in position 4 the circuit of relay 2330 is established as previously described. However, the circuit for operating the timing relays 721, 722 723 is opened with sequence switch 800 in position 2 and these relays do not operate. With sequence switch 800 in position 2, sequence switch 600 is advanced directly through positions 4 and 5 by means of a circuit over the lower left contact of cam 627, conductor 657 to ground at the upper left contact of cam 815. With sequence switch 600 in position 6 an operate test of relay 2330 and a polarity non-operate test of relay 2361 are made at the same time. The circuit of relay 2330 in this case extends from battery, through the lower left winding of repeating coil 2360, upper left contact of cam 2329, winding of relay 2330, right back contact of relay 2317, brush 2331, terminal 2332, conductor 2036, right back contact of relay 208, conductor 623, upper contact of cam 622, conductor 207, resistances 206, 205 and 204, conductor 621, upper contacts of cam 620, conductor 1117, terminal 2333, brush 2334, left back contact of relay 2317, upper left contact of cam 2335, upper left winding of repeating coil 2360 to ground. Relays 218, 208 and 226 are operated as before, relay 218 closing a circuit for relay 2361 which may be traced from battery over the left contact of cam 811, conductor 819, outer right front contact of relay 218, resistance 221, left back contact of relay 222, conductor 245, left contact of cam 614, conductor 615, terminal 2396, brush 2357, upper left and lower right contacts of cam 2358, upper right winding of repeating coil 2360, upper contacts of cam 2348, winding of relay 2361, lower right winding of repeating coil 2360, upper left and lower right contacts of cam 2356, brush 2355, terminal 2397, conductor 616, left contact of cam 617, conductor 630, right back contact of relay 222, conductor 223, upper contact of relay 631 to grounded conductor 1222. Relays 208 and 226 increase and decrease the resistance in the circuit of relay 2330. As in the previous case the circuit of relay 2361 closed by relay 218 does not supply current in the right direction to operate relay 2361. The operation of relay 226 closes a circuit from ground at the outer right front contact of relay 226, inner right back contact of relay 214, right back contact of relay 211, conductor 634, upper contact of cam 633, conductor 228, winding of relay 222, conductor 819, to battery at the left contact of cam 811. Relay 222 operates in this circuit and extends the circuit of relay 2361 over its left front contact, conductor 230, resistance 414, conductor 424, lower left contact of cam 903, to ground instead of to battery as in the former circuit. It also extends the circuit of relay 2361 over its right front contact to battery through resistance 229 and the inner right front contact of relay 212. Relay 2361 operates in this circuit and connects ground to conductor 2375 over the upper right contact of cam 2336 and the front contact of relay 2361. This ground completes a circuit which may be traced over conductor 1937, brush 1924 and its corresponding contact, upper contacts of cam 1013, conductor 1023, outer right front contact of relay 212, outer left back contact of relay 214, winding of relay 211, middle left front contact of relay 212, conductor 227 to battery through the non-inductive winding of relay 1504. Relay 211 operates and advances sequence switch 600 to position 7 in a circuit over the upper right contact of cam 642, conductor 643, inner left front contact of relay 208, outer right front contact of relay 222, right back contact of relay 214, right front contact of relay 211, outer left front contact of relay 222 to ground.

The advance of sequence switch 600 from position 6 to position 7 opens the circuit of relay 222 and that relay releases opening the circuit of relay 2361. The release of relay 2361 opens the circuit of relay 211 and that relay releases. Relay 222 is thereupon reoperated in a circuit from battery over the left contact of cam 811, conductor 819, winding of relay 222, conductor 228, upper contact of cam 633, conductor 634, right back contact of relay 211, inner left back contact of relay 214, outer right front contact of relay 226 to ground. The operation of relay 222 again closes the operating circuit of relay 2361 extending to ground at this time over the inner left front contact of relay 222, upper left contact of cam 629 to grounded conductor 1222. Relay 2361 reoperates and again closes a circuit for relay 211. Relay 2361 remains operated at this time long enough to bring about the operation of relay 2351. This is brought about by means of operating relay 2302 in a circuit from battery through the winding of that relay, contact of interrupter 2362, lower right contact of cam 2347, lower right contact of cam 2308, front contact of relay 2361, to ground at the upper left contact of cam 2336. Relay 2302 operates and locks to its energizing circuit independent of the interrupter.

The operation of relay 2302 closes a circuit from battery through the winding of relay 2359, contact of interrupter 2363, right contact of cam 2364 to ground at the outer left front contact of relay 2302. Relay 2359 locks over its inner right front contact, to ground at the lower left contact of cam 2336. Relay 2359 in operating closes a circuit from ground over its outer right front contact, conductor 2378, conductor 1939, brush 1922 and its corresponding contact, lower contacts of cam 1017, conductor 1031, outer right front contact of relay 200, winding of relay 251 to battery. Relay 251 operates and closes a circuit from battery through the winding of relay 252, inner left front contact of relay 251, conductor 244, to ground at the upper left contact of cam 641. Relay 252 locks over its outer left front contact directly to conductor 244. With relays 252 and 211 operated, a circuit is closed from battery through the winding of sequence switch magnet 600, upper left contact of cam 647, conductor 648, right back contact of relay 247, middle right front contact of relay 252, right front contact of relay 211 to ground at the outer left front contact of relay 222. Sequence switch 600 advances to position 8 in this circuit.

When sequence switch 600 leaves position 7 the circuit of relay 222 is opened and the circuit of relay 2361 is also opened. The release of relay 2361 opens the circuit of relay 211 and that relay releases closing a circuit from battery through the winding of sequence switch magnet 600, lower right contact of cam 633, conductor 634, right back contact of relay 211, inner left back contact of relay 214, outer right front contact of relay 226 to ground, advancing sequence switch 600 to position 9. Sequence switch 600 is then advanced to position 13 by means of a circuit from battery through its winding, lower left contact of cam 612, conductor 649, outer left back contact of relay 202, conductor 643, upper left contact of cam 638 to ground. It is then advanced out of position 13 by means of a circuit over the lower right contact of cam 627, conductor 650, left front contact of relay 251, conductor 258, left contacts of cam 824, to ground at the lower left contact of cam 909. Sequence switch 600 is advanced out of position 14 over the back contact of relay 727 as described for the previous test. Relay 2330 is also released by the operation of relays 218, 208 and 226 as in the previous test and sequence switch 600 advanced to position 16.

The release of relay 2330 causes the operation of relay 2317 and the selection of the district by a coin control circuit as described in connection with the previous test. The locking circuit of relay 2359 is opened when sequence switch 2300 passes from position 13 to position 14 and that relay releases. The locking circuit of relay 2302 was, of course, opened when relay 2361 released. The release of relay 2359 indicates to the coin control circuit that no charge is to be made. The further restoration of the district selector is the same as previously described as is the advance of sequence switch 600 to position 18.

With sequence switch 600 in position 18 a circuit is closed from battery over the upper contact of cam 811, winding of relay 803, lower right contact of cam 831, conductor 832, lower right contact of cam 631, to grounded conductor 1222. Relay 803, operates and locks as before and closes a circuit from battery through the winding of relay 829 and sequence switch 800, right contacts of cam 929, lower right contact of cam 830, inner right back contact of relay 804, inner right front contact of relay 803 to ground. Sequence switch 800 is advanced to position 3 in this circuit. When sequence switch 800 reaches position 3 relay 804 is operated in the circuit previously traced for that relay. With relays 804 and 803 operated and relay 829 released the previously traced circuit for advancing sequence switch 600 to position 1 is again closed.

*Test call No. 3—Call to busy line.*

The circuit is now in condition to impose the test conditions for the third test which is that of a call to a busy line. The district selector and line finder are operated as in the previous test to find the line finder test line and to select the district selector test line. With sequence switch 800 in position 3 the counting relay circuit for talking selection extends to the No. 1 counting relay so that the district selector comes to rest in position 14 which is the charge position. Sequence switch 600 is advanced out of position 1 by the arrival of switch 900 in position 9. Sequence switch 600 is advanced from position 1 to position 4 in the manner previously described. In position 4 relay 222 is operated in a circuit from battery over the left contact of cam 811, conductor 819, winding of relay 222, upper contact of cam 633, lower contacts of cam 601, conductor 656, lower right contact of cam 823 to ground. The operation of relay 222 closes a circuit from battery over the left contacts of cam 801, conductor 833, inner right front contact of relay 222, contact of interrupter 260, conductor 261, upper contact of cam 617, conductor 616, terminal 2397, brush 2355, lower right and upper left contacts of cam 2356, lower right winding of repeating coil 2360, winding of relay 2361, upper contacts of cam 2348, upper right winding of repeating coil 2360, lower right and upper left contacts of cam 2368, brush 2357, terminal 2396, conductor 615, upper contact of cam 614, conductor 262, contact of interrupter 259, inner left front contact of relay 222, conductor 230, resistance 414, conductor 424, lower left contact of cam 903 to ground. An inspection of the interrupters 259 and 260 will show that their vibrating contacts are connected to conductors 615 and 616 and their opposite contacts to battery and ground. They are so mounted as to make their corresponding contacts at the same time. Therefore the operation of these interrupters reverses the connection of battery and ground to relay 2361 as takes place when a final selector makes connection with a busy line.

The length of time during which the busy interruptions are simulated is under the control of the timing relays 723, 722, 721. These relays are operated as previously described. As before, after one cycle of operations the circuit is closed for advancing sequence switch 600 out of position 4 and after the completion of the second cycle of operations for advancing it out of position 5.

Due to the alternation of the current through relay 2361, this relay should not close its front contact long enough to permit the operation of relays 2302 and 2359. If, due to faulty adjustment the relay does remain operated so that relays 2302 and 2359 operate, relays 251 and 252 will be operated as previously described. With relay 252 operated and sequence switch 600 in either position 4 or position 5 so that sequence switch 900 is still in position 18, a circuit is closed from battery through relay 714, over the circuit previously described to conductor 717, through the lamp 264, outer right front contact of relay 252, upper contacts of cam 927, outer right front contact of relay 251, conductor 263, to ground at the lower right contact of cam 815. Relay 2330 is held operated during this test of relay 2361 and when sequence switch 600 reaches position 6 the tests previously described are carried out.

With the district selector sequence switch in position 14 relay 2359 is operated as described for the last test. However, when the coin circuit advances sequence switch 2300 to position 17, the locking circuit of relay 2359 is not opened and ground is not disconnected from conductor 2378. With relay 2359 operated, as soon as the coin control circuit finds the district selector, a circuit is closed from battery through resistance 2365, outer left front contact of relay 2359, lower left and upper right contacts of cam 2318, brush 2201 and its corresponding contact, inner left front contact of relay 2214, right winding of relay 2225 to ground. Relay 2225 locks through its left winding and inner left front contact, to ground at the outer right front contact of relay 2214. The operation of relay 2225 extends the circuit of relay 2226 over its outer right front contact to positive coin collect battery. Otherwise the operation of the coin control circuit is the same as previously described. Since the coin control circuit applies positive coin collect battery to the tip and ring conductors at this time, the circuit is arranged to include relays 237 and 712 in the opposite conductors to those in which they were contained during previous tests. Relay 237 is connected with conductor 2036 in a circuit from conductor 2036, over the outer right back contact of relay 240, inner left front contact of relay 236, conductor 822, resistance 821, lower right and upper left contacts of cam 826, conductor 255, winding of relay 237, resistance 238, conductor 239, upper left and lower right contacts of cam 820, left front contact of relay 806, conductor 234, to ground at the upper right contact of cam 638. Conductor 1117 is extended over the upper contacts of cam 610, conductor 621, upper contact of cam 314, conductor 315, winding of relay 712, outer left front contact of relay 236, conductor 253, upper right and lower left contacts of cam 636, conductor 654, front contact of relay 237, conductor 244 to ground. The operation of these relays causes the advance of the sequence switch 600 out of position 16.

When the district selector sequence switch 2300 is advanced to position 18 the circuit of relay 251 is opened and that relay releases but relay 252 remains locked to conductor 244. When sequence switch 2300 reaches position 1 relay 257 is operated as before, in turn operating relay 232. With relays 232 and 252 operated and relay 251 released, a circuit is closed from battery through the winding of sequence switch magnet 600. Upper left contact of cam 642, middle left front contact of relay 232, inner left front of relay 252, left back contact of relay 251 to ground over conductor 244. Sequence switch 600 advances to position 18 in this circuit. The advance of sequence switch 800 to position 4 and the advance of sequence switch 600 to position 1 take place as previously described.

Test call No. 4—Unanswered call.

With sequence switch 800 in position 4 the call simulated is that of a charge call which is not answered. With sequence switch 800 in position 4 no circuit is closed for the timing relays 721, 722 and 723. The circuit of relay 2330 is established as previously described. The circuit for relay 2361 is not established since the circuit of relay 222 is not closed. Sequence switch 600 is advanced through positions 4 and 5 by means of a circuit over the lower left contact of cam 627, conductor 657, upper left contact of cam 815 to ground.

Relays 218, 208 and 226 apply the usual test to relay 2330 and operate relay 209 whereupon sequence switch 600 is advanced out of position 6 by means of a circuit over the upper right contact of cam 642, conductor 643, inner left front contact of relay 208, left contacts of cam 816, right back contact of relay 211, inner left back contact of relay 214, outer right front contact of relay 226 to ground. It is advanced out of position 7 into position 9 by means of a circuit over the upper left contact of cam 627, conductor 644, to ground at the upper right contact of cam 823, and it is advanced from position 9 to position 13 by means of a circuit over the lower left contact of cam 642, conductor 649, outer left back contact of relay 202, conductor 643, upper left contact of cam 638 to ground. Since on a call which is not answered relay 2361 is not operated no circuit will be closed for relay 2359 and ground will not be connected to conductor 2378. If, therefore, the district selector is operated correctly and relays 251 and 252 have not operated, sequence switch 600 will be advanced out of position 13 in a circuit extending from battery through its winding, lower right contact of cam 627, conductor 650, right contacts of cam 824, conductor 825, inner left back contact of relay 252, inner left back contact of relay 251 to ground over conductor 244. Sequence switch 600 is advanced out of position 14 in the usual manner. The operation of relays 236 and 806 advance sequence switch 600 out of position 15 in the usual manner. The application of coin refund battery advances sequence switch 600 to position 17. The operation of relay 232 advances sequence switch 600 to position 18 and test class sequence switch 800 is advanced to position 5 in the manner previously described after which sequence switch 600 is advanced to position 1.

Test calls Nos. 5 and 6—Party registration—Automatic advance of test class switch.

The test conditions imposed with sequence switch 800 in positions 5 and 6 are only applicable to district selectors serving two party lines since these conditions apply particularly to discrimination between the two parties. In testing a coin district one would therefore ordinarily not depress keys 704 and 705 which correspond to these tests. However if one is making a routine test of all the district selectors included in the office, it may not be convenient to alter the keys depressed in the midst of the test and means are provided for automatically skipping positions 5 and 6 of sequence switch 800 when testing other than two party districts. The circuit for passing switch 800 through position 5 may be traced from battery through the winding of relay 829, winding of sequence switch magnet 800, right contacts of cam 829, upper left contact of cam 858, conductor 659, lower contacts of cam 320, conductor 321, inner lower left normal contact of key 1802, conductor 1856, left back contact of relay 1102, conductor 1225, lower right contact of cam 605, to grounded conductor 1222. Sequence switch 800 is advanced through position 5 in this circuit. The circuit for advancing sequence switch 800 out of position 6 extends over the lower left contact of cam 860, conductor 651, lower contacts of cam 322, to conductor 321. Sequence switch 800 therefore moves directly to position 7.

Test call No. 7—Overflow.

The test conditions imposed in position 7 of sequence switch 800 are those which send the district selector to overflow. As soon as sequence switch 800 reaches position 7 a circuit is closed from battery through the winding of relay 428, conductor 429, right contacts of cam 835 to ground. Relay 806 is also operated as previously described. The joint operation of relays 806 and 428 closes a circuit from battery through the right winding of relay 419, outer left front contact of relay 428, middle right front contact of relay 806 to ground at the upper right contact of cam 909. Relay 806 locks as in the other cases.

The operation of relay 806 grounds the sleeve conductors of the first and second trunks. The operation of relay 428 grounds the sleeve conductor of the test trunk and the remaining trunks in the test group. Therefore when the district selector hunts for an idle outgoing trunk it moves to the overflow terminals. Since the sleeve conductor of the overflow set is not grounded, relay 2314 which has been held operated to the busy sleeve terminals releases and advances sequence switch 2300 to position 9 in the usual manner. With sequence switch 2300 in position 9 a circuit is closed from battery through the winding of relay 2359, upper contacts of cam 2312 to ground over the overflow commutator segment 2337. With sequence switch 2300 in position 9 relay 2351 is operated over conductor 2315 as previously described. The operation of relay 2351 causes the operation of relay 2314 as before. The operation of relay 2314 advances sequence switch 2300 to position 10. With sequence switch 2300 in position 10 and relay 2359 operated ground is connected to conductor 2378 over the outer right front contact of relay 2359 and battery is connected to conductor 2379 through resistance 2365, outer left contact of relay 2359, resistance 2382 and the right contacts of cam 2311. This connection of battery and ground to the fundamental circuit is the reverse of that from a trunk.

In the meantime sequence switch 900 has been advanced to position 9 and the trunk testing circuit established. The reversal of battery and ground therefore causes the operation of both relays 524 and 416. The operation of relay 416 causes the operation and locking of relay 418 as usual. Relay 524 in operating closes a locking circuit for itself from battery through its right winding and front contact, lower left contact of cam 930, to ground. It also closes a circuit from this ground on cam 930 over its front contact, inner left back contact of relay 522, left normal contact and winding of relay 427 to battery. Relay 427 operates and locks over its outer left front contact, conductor 719, upper left contact of cam 909 to ground. The operation of relay 427 closes a circuit from battery through the winding of sequence switch magnet 900, lower left contact of cam 920, inner right front contact of relay 427, outer left front contact of relay 419 to ground. Sequence switch 900 advances to position 15 in this circuit and then to position 16 under control of its master cam.

With sequence switch 900 in position 16 the resistance in the circuit of relay 2351 is increased so that that relay releases, in turn releasing relay 2314. When relay 2314 releases sequence switch 2300 is advanced to position 12. The advance of sequence switch 2300 opens the circuit of relay 412 and that relay releases advancing sequence switch 900 to position 17 in the usual manner.

With sequence switch 2300 in position 12 and sequence switch 900 in position 17, the fundamental circuit is established for talking selection as previously described. In this case the counting relay circuit extends from ground over the lower right contact of cam 919, front contact of relay 525, lower right contact of cam 918, outer right front contact of relay 427, conductor 430, back contact of relay 513, winding of relay 512, conductor 905, upper contact of cam 904 to battery. Sequence switch 2300 is advanced to position 16 whereupon the fundamental circuit is opened and relay 2314 releases and advances sequence switch 2300 to position 17. The completion of talking selection also advances sequence switch 900 to position 18 as previously described.

Sequence switch 600 is advanced to position 4 in the usual manner. It is advanced through positions 4 and 5 in a circuit over the lower left contact of cam 627, conductor 657, to ground at the upper left contact of cam 815. In position 6 the preliminary disconnect test of relay 2330 is made but no test can be made of relay 2361 since the district selector is not standing on the test line.

Sequence switch 600 is advanced out of position 6 after this test by a circuit over the upper right contact of cam 642, conductor 643, inner left front contact of relay 208, left contacts of cam 816, right back contact of relay 211, inner left back contact of relay 214, outer right front contact of relay 226 to ground. With sequence switch 800 in position 7 sequence switch 600 is advanced through positions 7 and 8 in a circuit over the upper left contact of cam 627, conductor 644, upper right contact of cam 823 to ground. Position 9 is passed by means of a circuit over the back contact of relay 202 if the district selector is operated correctly and the sequence switch is advanced to position 13 as usual.

With the district selector sequence switch 2300 in position 17 the coin control circuit is associated therewith and the coin refund operation is performed in the manner previously described. Since sequence switch 2300 is advanced through position 14 during talking selection, relay 2359 did not have time to operate and therefore will be released at this time and no ground will be connected to conductor 2378. Therefore relays 251 and 252 will be in released condition and the circuit for advancing sequence switch 600 out of position 13 extends over the right contacts of cam 824, conductor 825, left back contact of relay 252, left back contact of relay 251 to grounded conductor 244. Sequence switch 600 passes through position 14 by means of a circuit over the back contact of relay 727, and in position 15 makes the release test as in the previous cases. Sequence switch 800 is advanced to position 8 and sequence switch 600 to normal in the usual way following the restoration of the district.

*Test call No. 8—Abandoned call—Early.*

The eighth test simulates a call abandoned before district group selection is completed. With sequence switch 800 in position 8 relay 426 is operated. The operation of the line finder in finding the test line and the brush selection takes place in the usual manner. When sequence switch 900 is advanced out of position 5 at the completion of brush selection a circuit is completed from ground over the inner right contact of relay 426, lower right contact of cam 933, winding of relay 403 to battery. Relay 403 locks over its left front contact, conductor 719 to ground at the upper left contact of cam 909. The operation of relay 403 opens the circuit of relay 402 and also opens the fundamental circuit. This relay also closes a circuit from battery through the winding of relay 431, outer right front contact of relay 403, conductor 404, middle left front contact of relay 1416, to conductor 2382, lower left contact of cam 2329, winding of relay 2330 and thence as previously traced in the case of relay 402 through relay 1106 to conductor 2375 and ground. Relay 431 operates and closes a circuit from battery through the winding of sequence switch magnet 900, lower right contact of cam 920, outer left front contact of relay 431 to ground. Sequence switch 900 advances to position 7 in this circuit. In position 7 a circuit is closed from battery through the wnding of relay 400, left back contact of relay 422, left contact of cam 914, left back contact of relay 402, right back contact of relay 522, conductor 1225, to ground. Relay 400 operates and locks to grounded conductor 719. Relays 400 and 426 connect ground to conductor 2315 from the upper right contact of cam 903, outer left contact of relay 400, left front contact of relay 426, resistances 432, and 406, conductor 1417, outer right contact of relay 1416, and thence to conductor 2315. Relay 2317 is connected to conductor 2315 over the lower left contact of cam 2316 at this time and the values of resistances 432 and 406 are such as to permit the operation of relay 2317. If relay 2317 operates it opens the tip and ring conductors extending from the line finder test line to the sender sequence switch 900.

The operation of relay 2317 therefore opens the circuit of relay 431 and that relay releases. A circuit is thereupon closed upon battery through the winding of sequence switch magnet 900, upper right contact of cam 911, left back contact of relay 431, outer right front contact of relay 400, conductor 405, left front contact of relay 1223, conductor 1406, lower left contact of cam 1034 to ground. Sequence switch 900 is advanced to position 16 in this circuit.

Sequence switch 900 is advanced out of position 16 in a circuit over the upper left contact of cam 911, conductor 421, inner right front contact of relay 403, back contact of relay 412, lower right contact of cam 926, upper left contact of cam 906, to ground over the back contact of relay 519. Sequence switch 900 is advanced out of position 17 by means of a circuit over the upper right contact of cam 911, back contact of relay 431, outer right front contact of relay 400 to ground over conductor 405 as previously traced.

The operation of relay 2317 initiates the operation of the coin control circuit as previously described. When the coin circuit finds the district and relay 2389 operates, a circuit is closed for relay 2302 over the upper contacts of cam 2301 to ground at the left front contact of relay 2389. The operation of relay 2302 advances sequence switch 2300 to position 7 in a circuit over the upper left contact of cam 2311 to ground at the outer left front contact of relay 2302. Relay 2302 in operating locks over its inner right front contact, lower left contact of cam 2308, back contact of relay 2320 to ground over commutator strip 2321. When sequence switch 2300 reaches position 7, relay 2302 being operated, a circuit is closed from battery through winding of downdrive magnet 2369 of the district selector, lower left contact of cam 2311, to ground at the outer left front contact of relay 2302. When the selector reaches normal a circuit is closed from battery through the winding of sequence switch magnet 2300, upper right contact of cam 2328, normal commutator segment 2370, brush 2371 to ground at the upper left contact of cam 2339. Sequence switch 2300 advances to position 8 in this circuit. Relay 2302 releases when sequence switch 2300 leaves position 7¼ and, since relay 2314 is not operated, a circuit is closed from battery through the winding of sequence switch magnet 2300, right contacts of cam 2342, left back contact of relay 2314, to ground at the left back contact of relay 2302. This advances sequence switch 2300 to position 9. Sequence switch 2300 is then advanced to position 17 over the same circuit which advanced it to position 8. The selector remains in position 17 until the operation of relay 2387 following the successful operation of the coin control circuit permits the release of the district circuit.

The operation of sequence switch 600 is as follows. It is advanced out of position 1 by the operation of relay 400, the circuit extending over the lower right contact of cam 612, conductor 613, inner right front contact of relay 400, conductor 401 and 802, upper contact of cam 605 to ground. It is advanced out of position 2 in the usual manner. Since this test simulates an abandoned call no test is to be made on relay 2330 and the circuit of relay 218 is not completed in position 8 of sequence switch 800. However, when sequence switch 2300 passes through positions 13+15 ground is connected over the left back contact of relay 2302, left back contact of relay 2317, lower contacts of cam 2342 to conductor 2379 and from thence to conductor 1520, middle left front contact of relay 400, left back contact of relay 434, winding of relay 433 to battery. Relay 433 is operated in this circuit and closes a locking circuit for itself through the winding of relay 434, inner left front contact of relay 433 to grounded conductor 719 in which circuit relay 434 operates when sequence switch 2300 leaves position 15. The operation of relay 434 closes a circuit from battery through the winding of sequence switch magnet 600, upper right contact of cam 642, conductor 643, outer right front contact of relay 434 to ground, advancing sequence switch 600 to position 4. In the case of a completed call relay 2314 is operated as switch 2300 passes through positions 13+15 and relays 433 and 434 are not operated.

Sequence switch 600 is passed through positions 4 and 5 in the same manner as in test 2 above described. It is advanced out of position 6 by the circuit which advanced it out of position 3. It is then moved from position 7 to position 13 by means of a circuit over the upper left contact of cam 647, upper left contact of cam 916 to ground, sequence switch 900 still being in position 18 since relay 218 was not operated. The advance of switch 600 from position 13 depends on the non-operated condition of relays 251 and 252 as in test 2. It is then advanced from position 14 to position 17 over the same circuit as advanced it to position 13. The test for coin battery then advances the sequence switch 600 from position 17 to position 18. With sequence switch 600 in position 18 relay 803 is operated as previously described. A circuit is thereupon closed from battery, winding of sequence switch magnet 900, lower left contact of cam 902, lower right contact of cam 830, inner right back contact of relay 804, right front contact of relay 803 to ground advancing sequence switch 900 to position 1. With sequence switch 900 in position 1, the circuit for advancing sequence 800 to position 9 is closed in the usual manner.

*Test call No. 9—Abandoned call—Late.*

When sequence switch 800 is in position 9, the test call simulates one abandoned after district group selection. The selection of the line finder test line and district selector test line takes place in the usual manner. As soon as sequence switch 800 reaches position 9 a circuit was closed from battery through the winding of relay 422, lower right contact of cam 836 to ground. Therefore when sequence switch 900 reaches position 9 and trunk test is made, a circuit is closed from battery through the winding of sequence switch magnet 900, lower right contact of cam 911, inner left and right front contacts of relay 422, front contact of relay 808, inner right front contact of relay 418, to ground, advancing sequence switch 900 out of position 9 and into position 16. When sequence switch 900 passes through positions 13 and 14 a circuit is closed from battery through the winding of relay 403, upper right contact of cam 933, right front contact of relay 422, right front contact of relay 808, inner left front contact of relay 418 to ground. Relay 403 locks to grounded conductor 719. The operation of relay 403 opens the fundamental circuit and the circuit of relay 402. As in the previous test the operation of relay 403 substitutes relay 431 for relay 402. The release of relay 402 closes a circuit from battery through the winding of relay 400, outer left front contact of relay 422, front contact of relay 431, left contact of cam 914, left back contact of relay 402, right back contact of relay 522, to grounded conductor 1225.

The operation of relay 400 as previously described connects ground over the upper right contact of cam 903, outer left front contact of relay 400, left back contact of relay 426, resistance 406, conductor 1417, and thence to conductor 2315 operating relay 2317 which initiates the association of the coin control circuit with the district and the release of the district. As sequence switch 2300 passes through positions 13+15, ground is connected to conductor 2379, as previously described. Relays 433 and 434 operate as before. The operation of relay 434 connects ground over its inner right front contact, to the winding of relay 226, operating that relay. Since relay 412 has not been operated, sequence switch 900 is advanced out of position 16 by means of a circuit over the upper left contact of cam 911, conductor 421, inner right front contact of relay 403, back contact of relay 412, lower left contact of cam 926, upper left contact of cam 906, over back contact of relay 519 to ground. The operation of relay 2317 opens the circuit of relay 431 and that relay releases so that sequence switch 900 is advanced from position 17 to position 18 by means of a circuit over the upper right contact of cam 911, left back contact of relay 431, outer right front contact of relay 400, conductor 405, left front contact of relay 1223, conductor 1406, to ground at the lower left contact of cam 1034.

Sequence switch 600 is advanced out of position 1 by means of a circuit over the lower right contact of cam 612, conductor 613, lower right contact of cam 917 to ground. The further advance of sequence switch 600 to position 18 is the same as described in test 8.

With sequence switch 600 in position 18 and switch 800 in position 9, relay 804 is operated as previously described closing a circuit from battery, through the winding of sequence switch magnet 900, lower left contact of cam 902, lower left contact of cam 830, inner right back contact of relay 803, inner right front contact of relay 804 to ground. Sequence switch 900 advances to position 1 in this circuit, whereupon a circuit is closed from battery through relay 829, sequence switch magnet 800, left contact of cam 929, lower left contact of cam 830, inner right back contact of relay 803, right front contact of relay 804 to ground advancing sequence switch 800 out of position 9, into position 18. With sequence switches 800 and 600 in position 18 a circuit is closed from battery through the winding of relay 1519, inner lower right normal contact of key 709, lower left and upper right contacts of cam 838, lower right contact of cam 662 to ground. Relay 1519 operates and locks over its inner right front contact, to ground over the lower left contact of cam 1034. The operation of relay 1519 closes a circuit from battery, through the winding of sequence switch magnet 1000, which has been standing throughout the test in position 8, lower right contact of cam 1010, left front contact of relay 1519, advancing sequence switch 1000 to position 9. The advance of sequence switch 1000 from position 8 removes ground from conductor 2366, freeing the district selector for service.

With sequence switch 1000 in position 9, test meter 1421 is operated in a circuit extending over the lower contacts of cam 1032, lower left contact of cam 815 to ground. The operation of this meter registers a complete test and also closes a circuit from battery through the winding of sequence switch magnet 1000, upper right contact of cam 1036, right back contact of relay 1119, conductor 1120, strapped terminals of brush 1735, front contact of meter 1421 to ground. Sequence switch 1000 is then advanced to position 10 which is a second normal position. Each time it reaches position 10 or 1 circuits are closed for advancing sequence switch 600 and 800 to position 1. The circuit of sequence switch 600 extends over the lower left contact of cam 647, conductor 655, lower right contact of cam 1026 to ground, and the circuit of sequence switch 800 extends over the lower right contact of cam 837, upper left contact of cam 1026 to ground.

*Connection with second selector.*

When sequence switch 1000 reaches position 10, relays 1200 and 1201 and 1202 are reoperated as previously described. Sequence switch 1000 is then advanced out of position 10 in a circuit which extends over the lower right contact of cam 1002, conductor 1035, inner left contact of relay 1202, inner left contact of relay 1201, inner right contact of relay 1200, conductor 1226, lower left contact of cam 318 to ground. Sequence switch 1000 is advanced out of position 11 in a circuit over the lower left contact of cam 1002, left back contact of relay 1500, lower right and upper left contacts of cam 1003, conductor 1004, lower right normal contact of key 1801, conductor 1830, lower left contact of cam 1005 to ground. It is advanced out of position 12 over the same circuit as advanced it out of position 10 and out of position 13 over a circuit over the upper right contact of cam 1002, left back contact of relay 1507, upper contacts of cam 1103, conductor 1004, lower right normal contact of key 1801, conductor 1830, to ground at the lower left contact of cam 1005. It is then advanced out of position 14 by means of a circuit over the upper left contact of cam 1010, back contact of relay 303 to ground at the left contact of cam 318.

With sequence switch 1000 in position 14 relay 1209 is operated as previously described. The previously traced circuits for magnet 1927 of the connector switch and magnet 1907 of the locating selector are closed in position 15 of switch 1000. The circuit of relay 1504 is also established, as well as the shunt around that relay over the back contacts of the stepping magnets of the connector switch 1920 and the locating selector 1900. Magnets 1927 and 1907 operate and advance their switches to the next district selector permitting relay 1504 to operate and advance sequence switch 1000 to position 16. In position 16 the second district selector is tested for busy condition. The sequence switch 1000 advances to position 17 in the manner previously described. This district is then submitted to the above described series of test conditions.

*Advance of group selectors.*

When the connector switch 1920 is advanced to normal the operation will be the same as just described until sequence switch 1000 reaches position 16. With the connector switch 1920 normal a circuit will be closed from ground through resistance 1121, right normal contact of relay 1122, winding of relay 1123, conductor 1124, group selector brush 1736 and its first off-normal contact, connector brush 1921 and its normal contact, conductor 1020, upper contacts of cam 1019, conductor 1834, inner upper right normal contact of key 1802, conductor 1018, outer left front contact of relay 1501, outer left back contact of relay 1510, upper contacts of cam 1017, winding of relay 1508 to battery. Relay 1508 does not operate but relay 1123 does. The operation of relay 1123 closes a circuit from battery through the left winding of relay 1102, left back contact of relay 1122, front contact of relay 1123, conductor 1406 to ground at the lower left contact of cam 1034. Relay 1102 operates and locks through its right winding and right front contact, middle left front contact of relay 1501 to ground at the upper right contact of cam 1026. Relay 1102 operated closes a circuit from battery through the winding of relay 1507, conductor 1103, left front contact of relay 1102 to ground. The operation of relay 1507 closes a circuit from battery through the winding of locating selector stepping magnet 1907 and its back contact, strapped terminals of brush 1901, outer left front contact of relay 1507 to ground. The locating selector is advanced to normal in this circuit provided it is not already there. With the locating selector normal, district class sequence switch 300 is restored to normal over a circuit extending from ground at the outer left front contact of relay 1507, brush 1901 and its normal contact, conductor 302, upper left contact of cam 308, winding of sequence switch magnet 300 to battery. When sequence switch 300 reaches position 1 the circuit just traced from ground to conductor 302 is extended over the right contacts of cam 301, conductor 1011, lower left contact of cam 1010, winding of sequence switch magnet 1000 to battery, advancing sequence switch 1000 to position 1. Sequence switch 1000 is then advanced through positions 1 and 2 as previously described and from position 3 to position 4 in the circuit just described.

A branch from the locking circuit of relay 1102, previously traced, extends over conductor 1522, lower right contact of cam 318 to ground holding relays 1102 and 1507 operated until the class sequence switch is again advanced out of position 1. Since relay 1507 is operated, the previously traced circuit for advancing sequence switch 1000 out of position 4 is open and the sequence switch remains in this position until the group selectors 1710, 1730, 1610 and 1630 have been advanced to their next set of terminals which connect with the proper start circuit etc. for the districts associated with the second connector switch. The class sequence switch 300 is reset in position 5 of switch 1000 and advances sequence switch 1000 to position 6 where the second connector is advanced into connection with its first district, after which that district and other districts associated with that connector are tested.

*Advance of master selector.*

When all the districts associated with the first group switches are tested sequence switch 1000 passes through a cycle of operations advancing the last connector switch to normal. It is then advanced through a cycle to restore the group switches to normal in the manner in which the group switches are advanced from terminal to terminal. When sequence switch 1000 reaches position 5 after the restoration of the group switches relay 1206 is operated in a circuit over its left winding, conductor 1215, brush 1916 of the master selector and its first terminal, brush 1615 of group selector 1610 which is in its normal position, conductor 1641, upper contact of cam 306, conductor 307, right normal contact of relay 1206, upper left contact of cam 1034 to ground. Relay 1206 operates and locks in a circuit through its right winding and inner right front contact, middle left front contact of relay 1501 to ground at the upper right contact of cam 1026. The operation of relay 1206 closes a circuit from battery through the winding of sequence switch magnet 1000, upper left contact of cam 1002, conductor 1027, outer right front contact of relay 1206, conductor 1207, to ground at the upper left contact of cam 1034. Sequence switch 1000 is advanced to position 6 in this circuit. The operation of relay 1206 operates relays 1216 and 1217 as before, relay 1216 locking to ground at the lower left contact of cam 605 as long as switch 600 remains in position 1 holding relay 1217 operated. Sequence switch 1000 is advanced from position 6 to position 9 under the control of relay 1507 as in the case of advancing the group selectors from terminal to terminal. It is then advanced from position 9 to position 10 as previously described.

With sequence switch 1000 in position 10 relays 1200, 1201 and 1202 are operated as previously described. A circuit is thereupon closed from battery through the right winding of relay 1500, upper contacts of cam 1009, outer left front contacts of relays 1202, 1201 and 1200, brush 1614 of group selector 1610, and its normal terminal, first off-normal terminal of brush 1915 to ground. The operation of relay 1500 closes a circuit from battery through the winding of sequence switch magnet 1000, lower right contact of cam 1002, outer right front contact of relay 1500 to ground at the outer left back contact of relay 1503. Sequence switch 1000 advances to position 11 in this circuit. With sequence switch 1000 in position 11 the circuit of master selector stepping magnet 1917 is closed over the left front contact of relay 1500, lower right and upper left contacts of cam 1003, conductor 1004, lower right normal contact of key 1801, conductor 1830 to ground at the lower left contact of cam 1005. The usual circuit for relay 1504 is closed as well as the shunt around its winding, over the back contact of magnet 1917. The operation of magnet 1917 steps master selector 1910 to its second off-normal terminal and permits the operation of relay 1504 to advance sequence switch 1000 to position 12.

Sequence switch 1000 is advanced out of position 12 in the circuit previously traced over cam 301 which is closed with sequence switch 300 in position 1. In position 13 a circuit is closed over the second off-normal terminal of master selector brush 1913 to a relay similar to relay 1203 which controls the operating circuits of the stepping magnets of the second group selectors. These group selectors are therefore stepped to their first off-normal terminals and sequence switch 1000 advances to position 14 by relay 1504.

With sequence switch 1000 in position 14 class sequence switch 300 is reset in accordance with the class of district connected to the first terminal of the second group switches and switch 1000 advances to position 15. In position 15 the connector associated with the first off-normal terminals of the second group selectors is advanced to its first off-normal terminals and the locating selector is started on another revolution. The selected district is tested with sequence switch 1000 in position 16, and the further operation is the same as described.

End of test.

Group selectors 1600, 1620, 1700 and 1720 have been wired to show the last group selectors. The advance of the last group selector to normal is the same as the advance of the first group selector to normal. Spare terminals are passed by means of obvious circuits for the stepping magnets in the case of all the selectors. When sequence switch 1000 reaches position 5, following the advance of the last group selectors to normal, a circuit is closed from battery through the left winding of relay 1206, conductor 1215, brush 1916 of the master selector and its 21st terminal, winding of relay 1125, conductor 1830 to ground at the lower left contact of cam 1005. Relay 1125 operates in this circuit but relay 1206 does not. The operation of relay 1125 closes a circuit from battery through the winding of relay 1503, left contacts of cam 1037, front contact of relay 1125, normal contact of the last group selector, conductor 1641, upper contact of cam 306, conductor 307, right contact of relay 1206, conductor 1207, upper left contact of cam 1034 to ground. Relay 1503 operates and locks over its outer right front contact, normal contact of key 1523, middle left front contact of relay 1501 to ground at the upper right contact of cam 1026. The operation of relay 1503 also closes a circuit from ground through lamp 1524, through the alarm circuit 1312 to battery, lighting lamp 1524 and sounding an alarm to inform the attendant that the cycle of operations has been completed.

The attendant operates key 1523 retiring the lamp and alarm by releasing relay 1503. The operation of relay 1503 advances sequence switch 1000 out of position 5 in a circuit over the upper left contact of cam 1010, middle right front contact of relay 1503 to ground. With sequence switch 1000 in position 6 the former operating circuit for relay 1504 is closed but since the group selectors are normal no shunt circuit is closed around its winding and it is operated directly, advancing sequence switch 1000 to position 7. With the group selectors normal relay 1123 is operated as previously described and the operation of that relay and relay 1507 advances sequence switch 1000 out of position 7 and into position 1. Relay 1500 is reoperated and the master selector advanced to normal in the same manner as above described. This circuit is now ready to start another cycle of tests, which will take place immediately if start key 1800 is left operated.

Miscellaneous tests and apparatus.

The test of two party districts is substantially the same as those of other districts but includes means for simulating the second or grounded party and means for simulating a grounded line to test the ability of the district selector to register the correct party and to block the release when a direct ground is present. The correctness of registration by the district selector is tested by the use of relay 714 under the control of relay 729 or relay 730. These tests will not be described in detail.

If only a particular test condition is to be imposed on the districts or only one or two test conditions, only those keys corresponding to the desired tests will be operated. When sequence switch 800 is advanced to the position corresponding to a non-operated key a circuit will be closed for automatically advancing the sequence switch through that position. Assuming that the first test is not to be made and key 701 is normal, this advancing circuit may be traced from battery through the winding of relay 829, winding of sequence switch magnet 800, right contacts of cam 929, upper right contact of cam 830, right normal contact of key 701, conductor 321, inner lower left contact of key 1802, conductor 1836, left back contact of relay 1102 to grounded conductor 1225. This circuit will be closed as soon as sequence switch 1000 reaches position 8 so that sequence switch 800 will be in position 2 ready to control the second test conditions as soon as the district selector has been positioned under the control of sequence switch 900. Similar circuits are traceable for passing the sequence switch through the position corresponding to any one of the keys of key set 700.

If it should be desired to restore the test circuit to normal prior to the completion of the test, the return-to-normal key 1802 may be operated. This key becomes effective only at the end of any test, that is with test switch 600 in position 1. The operation of key 1802 operates relays 1100 and 1119 and subsequently relay 1122 is operated under the control of interrupter 1136. The operation of relay 1122 closes a circuit for the stepping magnets of the connector 1920 and locating selector 1900, through the contact of interrupter 1126 whereby the connector and locating selector are restored to normal.

When the connector switch reaches normal the class sequence switch 300 and sequence switch 1000 are advanced to normal as in the case of a regular test. With the connector switch in normal position the group selectors are returned to normal through the return-to-normal keys and contacts of relays 1200, 1201 and 1202. A low resistance winding of relay 1100 is included in this restoring circuit in order to protect the contacts of key 1802 should that key be inadvertently restored while the group selector magnets are operating. It also serves to hold the restoring circuit until the switches have reached normal. With the group selectors normal master selector 1910 is also restored to normal under the control of return-to-normal key 1802.

If it is desired not to wait for busy selectors but to pass directly to the next selector, key 1525 will be operated closing a local circuit for relay 1306. If the district is busy relay 1510 will be operated as previously described. Relay 1510 in operating closes a circuit for relay 403. With relay 1306 operated the operation of relay 403 closes a circuit from battery through relay 1519, inner right front contact of relay 403, left front contact of relay 1306, contact of interrupter 1320, inner right back contact of relay 1301, left back contact of relay 1216, back contact of relay 1517 to ground at the upper contact of cam 1023. Relay 1519 operates the test busy meter 1526 which in turn advances sequence switch 1000 to position 9 to perform another cycle and to select the next district selector.

Manual make busy key 1527 is supplied for the purpose of passing the test circuit by selectors which remain busy for undue lengths of time. The operation of this key causes the operation of relay 1513. The operation of relay 1513 operates relay 1209 and relays 1200, 1201 and 1202. The operation of these relays advances the connector switch 1920 and the locating selector 1900 to the next district selector.

When the test circuit fails to advance due to trouble in the district or the test circuit itself, the operation of key 731 causes the advance of the test circuit to the next district. The operation of key 731 causes the operation of relay 732 which in turn closes a circuit for relay 711. Relay 711 locks and when key 731 is restored advances test class sequence switch 800 to position 18. The arrival of switch 800 in position 18 advances switch 900 to position 1 and switch 600 to position 17. When the district selector returns to normal, switch 600 is advanced to normal and sequence switch 1000 advances to control selection of the next district as in the regular test.

Switches 1810 and 1820 are used for measuring the time during which a selector is busy or during which a test should be completed respectively. Relay 1309 which controls the busy timing switch 1810 is operated through the normal contact of brush 1814, as soon as the start key is operated. It closes a locking circuit for itself over the back contact of relay 1302. The operation of relay 1309 closes a circuit from battery through the winding of stepping magnet 1815, brush 1813, and its strapped terminals, inner right front contact of relay 1309, inner left back contact of relay 1302 to ground through interrupter 1303. The busy timing switch 1810 is advanced under the control of interrupter 1303 until relay 1302 is operated or until it reaches its ninth off-normal terminal at which time the circuit of magnet 1815 is opened and lamp 1837 lighted and an alarm sounded. The circuit for operating relay 1302 which controls the trouble timing switch is closed through brush 1824 and a normal terminal thereof, conductor 1835 to ground at the inner left front contact of relay 1217. It will be remembered that this relay is operated when the test circuit seizes a district selector and is reoperated due to the operation of relay 1216 each time that test switch 600 passes through position 1. Relay 1302 locks to ground over the lower left contact of cam 627, so that it is reoperated and relocked each time that sequence switch 600 passes through position 1. The operation of relay 1302 opens the locking circuit of relay 1309 and the energizing circuit for magnet 1815; closes an operating circuit for magnet 1825 to interrupter 1303 and prepares a circuit for trouble meter 1308, should switch 1820 advance to the trouble position before switch 600 passes through position 1. Key 1313 permits the restoration of either the busy switch or the trouble switch following an alarm.

Repeat key 709 is provided for causing the test circuit to retest the same district. This is brought about by the opening of the circuit by which the connector stepper and locating selector are normally advanced to the next terminal. Since this circuit is also in shunt of the winding of relay 1504, relay 1504 is permitted to operate and advance sequence switch 1000 through the positions corresponding to the selection of the district. This key also provided circuits for operating either the repeat single test meter 733 or the repeat multiple test meter 734. The choice of these meters depends upon the operation of relay 735 which is a differential relay. If only a single key is operated this relay remains deenergized, but if more than one key is operated, it operates to transfer the circuit from the single test meter to the multiple test meter.

In order to test a particular district selector, the particular circuit key 1801 may be operated and start key 1800. The operation of this key connects interrupter contacts of dial 1314 to ground and the winding of relay 1315. The off-normal contacts of dial 1314 are connected by key 1801 to ground and the winding of master selector stepping magnet 1917 with sequence switch 1000 in position 2. The operation of the dial causes the intermittent release of relay 1315 and that relay over its contact completes the circuit of stepping magnet 1917 advancing master selector 1910 to the desired terminals. Following the operation of the dial, key 1316 is operated, operating relay 1317 which locks to grounded conductor 1830 over the contact of key 1801. Key 1316 is then released and a circuit is thereupon closed for relay 1504 which advances sequence switch 1000 to position 3. Sequence switch 1000 is advanced out of position 3 in the usual manner. With sequence switch 1000 in position 4 the off-normal contact of the dial closes a circuit for relay 1203 which circuit is completed through the back contact of relay 1315. The intermittent operation of relay 1203 under the control of the interrupter contact of dial 1314 advances the group selectors to their desired terminals. Key 1316 is again operated and released following this operation of the dial and sequence switch 1000 is advanced to position 5 where class switch 300 is set and the switch advanced to position 6 in the usual manner. With sequence switch 1000 in position 6 the operation of the dial causes the intermittent operation of relay 1209 which advances the connector and locating selector to the desired terminals. The operation of key 1316 advances sequence switch 1000 to position 7 in which the district selector is tested in the usual manner. If this district is the only one to be tested at the present time, start key 1800 will be restored at some time during the test. If it is not restored the test circuit will continue to test the remainder of the selectors.

What is claimed is:

1. In a testing system for testing selector switches adapted to operate under a variety of conditions, means for associating said testing system with the selector to be tested, means for imposing a plurality of test conditions on the selector to be tested and means for rendering any predetermined number of said testing conditions effective.

2. In a testing system for testing selector switches adapted to operate under a variety of conditions, means for associating said testing system with the selector to be tested, means for successively imposing a plurality of test conditions on the selector to be tested and means for rendering any predetermined number of said test conditions effective.

3. In a testing system for testing selector switches of various types adapted to operate under a variety of conditions, means for associating said testing system with the selector to be tested, means for successively imposing a plurality of test conditions on a selector to be tested certain of said test conditions being applicable only to a particular type of selector, means for rendering any combination of said test conditions effective and means for automatically rendering said test conditions ineffective which are not applicable to the selector under test.

4. In a testing system for testing selector switches adapted to operate under a variety of conditions, means for associating said testing system with the selector to be tested, a sequence switch for successively rendering said test conditions effective and means for causing said sequence switch to render any predetermined number of the said tests effective.

5. In a testing system for testing selector switches adapted to operate under a variety of conditions, means for associating said testing system with the selector to be tested, a sequence switch for successively rendering said test conditions effective, a plurality of keys, and means under the control of said keys for causing said sequence switch to render any predetermined number of the said tests effective.

6. In a testing system for testing selector switches adapted to operate under a variety of conditions, means for associating said testing system with the selector to be tested, a sequence switch for successively rendering said test conditions effective, a plurality of keys each corresponding to a particular test condition and means under the control of said keys for causing said sequence switch to render only those conditions effective which correspond to operated keys.

7. In a testing system for testing selector switches adapted to operate under a variety of conditions, means for associating said testing system with the selector to be tested, a switch for imposing a plurality of test conditions on the selector to be tested, a sequence switch for rendering a different set of test conditions effective in its various positions, a plurality of keys, means under the control of said keys in their non-operated position for advancing said sequence switch from position to position and means under the control of said keys in their operated position to arrest said sequence switch while said first switch imposes corresponding conditions upon said selector.

8. In a testing system for testing selector switches of various types adapted to operate under a variety of conditions, means for associating said testing system with the selector to be tested, a switch for imposing a plurality of test conditions on the selector to be tested, a sequence switch for rendering a different set of test conditions effective in its various positions, a plurality of keys, means under the control of said keys in their non-operated position for advancing said sequence switch from position to position, means under the control of said keys in their operated position to arrest said sequence switch while said first switch imposes corresponding conditions upon said selector, and means independent of said keys for causing said switch to pass through the positions corresponding to test conditions inapplicable to the selector under test.

9. In a testing system for testing selector switches, means for testing a control relay of the selector switch under test comprising means to establish a counting relay circuit under the control of an interrupter, means to establish a second counting relay circuit under the control of said relay, means under the control of each of said counting relay circuits for opening the other counting relay circuit, means for establishing a circuit for said relay including the minimum resistance to prevent the operation of said relay, means governed by the interrupter controlled counting relay circuit to advance the test and means governed by the relay controlled counting relay circuit to block the test.

In witness whereof, I hereunto subscribe my name this 1st day of December A. D., 1925.

ROBERT E. PEOPLES.